United States Patent
Kim

(10) Patent No.: US 12,182,527 B2
(45) Date of Patent: Dec. 31, 2024

(54) TRANSLATING METHOD USING VISUALLY REPRESENTED ELEMENTS, AND DEVICE THEREFOR

(71) Applicant: Hyun Jin Kim, Seoul (KR)

(72) Inventor: Hyun Jin Kim, Seoul (KR)

( * ) Notice: Subject to any disclaimer, the term of this patent is extended or adjusted under 35 U.S.C. 154(b) by 486 days.

(21) Appl. No.: 17/484,990

(22) Filed: Sep. 24, 2021

(65) Prior Publication Data

US 2022/0012437 A1    Jan. 13, 2022

Related U.S. Application Data

(63) Continuation of application No. PCT/KR2020/004053, filed on Mar. 25, 2020.

(30) Foreign Application Priority Data

| Mar. 25, 2019 | (KR) | ........................ 10-2019-0033379 |
| Mar. 26, 2019 | (KR) | ........................ 10-2019-0034245 |
| Mar. 25, 2020 | (KR) | ........................ 10-2020-0036138 |

(51) Int. Cl.
*G06F 40/58* (2020.01)
*G06F 40/268* (2020.01)

(52) U.S. Cl.
CPC ............ *G06F 40/58* (2020.01); *G06F 40/268* (2020.01)

(58) Field of Classification Search
CPC ................................................ G06F 40/00–58
See application file for complete search history.

(56) References Cited

U.S. PATENT DOCUMENTS

| 9,984,071 B2 | 5/2018 | Mesheryakov et al. |
| 2012/0296635 A1 * | 11/2012 | Brockett ............... G06F 40/166 704/9 |

(Continued)

FOREIGN PATENT DOCUMENTS

| KR | 10-2001-0037309 A | 5/2001 |
| KR | 10-0303171 B1 | 11/2001 |

(Continued)

OTHER PUBLICATIONS

International Search Report issued in PCT/KR2020/004053; mailed Jul. 1, 2020.

*Primary Examiner* — Hai Phan
*Assistant Examiner* — Alexander Joongie Kim
(74) *Attorney, Agent, or Firm* — Studebaker & Brackett PC

(57) ABSTRACT

A translating method using visually represented elements, and device therefor is provided. According to an embodiment, a translation method performed by a computing device, may include acquiring data of a first sentence in a first language, the first sentence including a first morpheme of a first type and a second morpheme of a second type different from the first type, generating a first graph representing the first sentence, a first node of the first graph corresponding to the first morpheme of the first type of the first sentence, a first edge of the first graph corresponding to the second morpheme of the second type of the first sentence, and each node and each edge of the first graph being concatenated to each other so that the first sentence is completed when representations corresponding to each node and each edge of the first graph are concatenated while traversing the first graph in a first order, replacing the representations of the first language corresponding to each node and each edge of the first graph with representations of a second language, acquiring a second sentence of the (Continued)

second language by concatenating the representations of the second language corresponding to each node and each edge of the first graph while traversing the first graph in a second order at least in part different from the first order, and outputting the second sentence as a translation result of the first sentence into the second language.

18 Claims, 58 Drawing Sheets

(56) References Cited

U.S. PATENT DOCUMENTS

| | | | |
|---|---|---|---|
| 2013/0054224 | A1 | 2/2013 | Jiang et al. |
| 2013/0191109 | A1* | 7/2013 | Anisimovich .......... G06F 40/40 704/4 |
| 2018/0366013 | A1* | 12/2018 | Arvindam ............. G06F 40/237 |

FOREIGN PATENT DOCUMENTS

| | | |
|---|---|---|
| KR | 10-0697106 B1 | 3/2007 |
| KR | 10-0734964 B1 | 7/2007 |
| KR | 10-2010-0019596 A | 2/2010 |
| KR | 10-2011-0062084 A | 6/2011 |
| KR | 10-2012-0062275 A | 6/2012 |
| KR | 10-2016-0114668 A | 10/2016 |
| KR | 10-2017-0010843 A | 2/2017 |
| KR | 10-1769981 B1 | 8/2017 |
| KR | 10-2018-010943 A | 9/2018 |
| KR | 10-1914916 B1 | 11/2018 |

* cited by examiner

FIG. 20

| | | | |
|---|---|---|---|
| KOREAN (MALE) | GREAT (MALE) | 황제 | A (MALE) |
| KOREAN (FEMALE) | GREAT (FEMALE) | 여제 | A (FEMALE) |
| ENGLISH (MALE) | A great(MALE) | Emperor | A (MALE) |
| ENGLISH (FEMALE) | A great(FEMALE) | Empress | A (FEMALE) |
| FRENCH (MALE) | Un grand | Empereur | A (MALE) |
| FRENCH (FEMALE) | Une grande | Impératrice | A (FEMALE) |

| 1 | I CAT TOUCH |
| 2 | I TOUCH CAT |
| 3 | CAT I TOUCH |
| 4 | CAT TOUCH I |
| 5 | TOUCH I CAT |
| 6 | TOUCH CAT I |

| 1 | CAT BY ME TOUCHED |
| 2 | CAT TOUCHED BY ME |
| 3 | BY ME CAT TOUCHED |
| 4 | BY ME TOUCHED BY ME |
| 5 | TOUCHED CAT BY ME |
| 6 | TOUCHED BY ME CAT |

TRANSLATING METHOD USING VISUALLY REPRESENTED ELEMENTS, AND DEVICE THEREFOR

CROSS-REFERENCE TO RELATED APPLICATIONS

This application is a Continuation of International Application No. PCT/KR2020/004053 filed on Mar. 25, 2020, which claims benefit of priority to Korean Patent Application Nos. 10-2019-0033379 filed on Mar. 25, 2019, 10-2019-0034245 filed on Mar. 26, 2019 and 10-2020-0036138 filed on Mar. 25, 2020, the entire content of which are incorporated herein by reference

TECHNICAL FIELD

The present invention relates to a translation method and apparatus using a visible representation component, and more particularly, to a translation method and apparatus for visually displaying a sentence component and performing translation using the same.

BACKGROUND ART

A sentence is composed of various sentence components such as words, a word order, and a structure. However, there is a limit to building a database with various sentences because sentence components that make up sentences are different for each language.

In particular, machine translations performed by computers in recent years mainly include statistical-based machine translation and artificial neural network machine translation. Since the statistical-based machine translation and the artificial neural network machine translation utilize deep learning, computers learns by itself based on input training data. Therefore, a large amount of training data is essential for high-accuracy machine translation, and a long learning time is required to process the large amount of training data.

In addition, computers display only translation results to users but do not display information on a translation process and a translation method. Since the translation process is not visually displayed, users may not confirm that translation has been performed correctly, and users may not know which sentence components of sentences need to be corrected, even when the users are dissatisfied with the translation results. Therefore, there is a need to provide technologies for solving this problem.

DISCLOSURE

Technical Problem

A technical problem to be solved by the present invention provides a method and apparatus for visually identifying a relationship between a word order of a sentence and a sentence component by displaying a sentence component as a node and an edge.

Another technical problem to be solved by the present invention is to provide a method and an apparatus for visually understanding a meaning of a sentence component, which is not displayed in a sentence, in the sentence.

Still another technical problem to be solved by the present invention provides a method and apparatus for providing an accurate translation result by receiving a user's feedback on a translation result displayed by visualizing a sentence component.

Yet another technical problem to be solved by the present invention provides a method and apparatus for enabling a user to easily confirm a translated meaning and correct the contents by graphically representing a translation result through a visible representation component.

Yet another technical problem to be solved by the present invention provides a method and apparatus for easily confirming whether an ambiguous representation is translated into a correct meaning by graphically representing a translated meaning in a translation of the ambiguous representation, which is prone to translation errors, and correcting the mistranslation.

Objects of the present disclosure are not limited to the above-described objects. That is, other objects that are not described may be obviously understood by those skilled in the art from the following description.

Technical Solution

According to an embodiment, a translation method performed by a computing device, may include acquiring data of a first sentence in a first language, the first sentence including a first morpheme of a first type and a second morpheme of a second type different from the first type, generating a first graph representing the first sentence, a first node of the first graph corresponding to the first morpheme of the first type of the first sentence, a first edge of the first graph corresponding to the second morpheme of the second type of the first sentence, and each node and each edge of the first graph being concatenated to each other so that the first sentence is completed when representations corresponding to each node and each edge of the first graph are concatenated while traversing the first graph in a first order, replacing the representations of the first language corresponding to each node and each edge of the first graph with representations of a second language, acquiring a second sentence of the second language by concatenating the representations of the second language corresponding to each node and each edge of the first graph while traversing the first graph in a second order at least in part different from the first order, and outputting the second sentence as a translation result of the first sentence into the second language.

According to an embodiment, wherein the generating of the first graph may include changing any one or more of a source and a destination of the first edge in response to a previously designated user input for the first edge of the first graph.

According to an embodiment, wherein the generating of the first graph may include segmenting the first node in response to a previously designated user input for the first node of the first graph.

According to an embodiment, wherein the generating of the first graph may include segmenting the first node and replacing the segmented first node with two or more new nodes in response to the previously designated user input for the first node of the first graph.

According to an embodiment, wherein the generating of the first graph may include merging the first node with another node in response to a previously designated user input for the first node of the first graph.

According to an embodiment, wherein the generating of the first graph may include merging the first node with the first edge and replacing the merged first node with a new node in response to a previously designated user input for any one of the first edge and the first node of the first graph.

According to an embodiment, wherein the generating of the first graph may include generating the first graph including a self-loop edge or a connected edge corresponding to the second morpheme as a determination result by determining whether the second morpheme is an adjective, a determiner, a verb, or a preposition, and the self-loop edge is an edge where a node of a destination and a node of a source are the same, and the connected edge is an edge that concatenates different nodes.

According to an embodiment, wherein the acquiring of the second sentence of the second language may include acquiring the second sentence of the second language by concatenating the representations of the second language corresponding to each node and each edge of the first graph while traversing the first graph in the second order that is at least in part different from the first order and designated using a previous users translation record.

According to an embodiment, wherein the acquiring of the second sentence of the second language may include acquiring the second sentence of the second language by concatenating the representations of the second language corresponding to each node and each edge of the first graph while traversing the first graph in a third order that is at least in part different from the second order in response to receiving a previously designated user input.

According to an embodiment, a translation method performed by a computing device, may include generating first tag information of the first word including the meaning of the first word expressed in a first language, and obtaining data of a fourth sentence that is a translation target sentence including the first word. in response, generating third tag information of the first word using the data of the fourth sentence, wherein the third tag information of the first word may include first tag information of the first word, and replacing the fourth sentence with an expression of a second language using third tag information of the first word.

In an embodiment, wherein generating of the third tag information of the first word from the data of the fourth sentence may include in response to obtaining data of a third sentence including the first word, the third generating second tag information of the first word by using the data of the sentence, wherein the second tag information of the first word may include first tag information of the first word. In an embodiment, the generating of the third tag information of the first word from the data of the fourth sentence may include in response to obtaining data of a fourth sentence that is a translation target sentence including the first word and replacing the fourth sentence with an expression of a second language using third tag information of the first word, wherein generating third tag information of the first word by using the data of the fourth sentence, wherein the third tag information of the first word may include second tag information of the first word.

In an embodiment, wherein generating of the first tag information of the first word may include generating the first tag information further including information related to an attribute of the first word existing only in the first language.

According to an embodiment, a translation method performed by a computing device, may include acquiring input information, translating the input information to generate output information, and corresponding to the output information generating additional information including a graphic element, and changing the graphic element in response to a user operation on the graphic element, wherein modifying the output information to correspond to the change of the graphic element.

In an embodiment, wherein generating of the additional information may include checking whether the input information includes an ambiguous expression, determining the meaning of the ambiguous expression as any one of a plurality of meanings corresponding to the ambiguous expression, and allowing the graphic element to express the determined meaning.

In an embodiment, wherein determining of the meaning of the ambiguous expression may include identifying a first part including the ambiguous expression in the input information and a second part adjacent to the first part, and a first graphic element expressing the ambiguous expression as a first meaning among the plurality of meanings and determining the meaning of the ambiguous expression as the first meaning by comparing the second part and a corresponding second graphic element.

In an embodiment, wherein modifying the output information may include receiving a user input for replacing at least a portion of the graphic element with another graphic element, changing the graphic element in response to the user input, and modifying the output information to correspond to the change of the graphic element.

In an embodiment, wherein modifying the output information may include receiving a user input for adding another graphic element to the graphic element, changing the graphic element in response to the user input, and modifying the output information to correspond to the change of the graphic element.

In an embodiment, the method further may comprise visually associating a first part of the output information with a first graphic element of the graphic element, wherein the first graphic element represents a linguistic meaning of the first part, and the first portion and the first graphic element may be highlighted or displayed in the same color.

In an embodiment, wherein the first portion may include a plurality of words or phrases, and the first graphic element may include a plurality of graphic elements each representing linguistic meanings of the plurality of words or phrases.

In an embodiment, each pair of the plurality of words or phrases and the plurality of graphic elements corresponding to each other may be highlighted or displayed in sequence.

BRIEF DESCRIPTION OF THE DRAWINGS

FIG. 20 is a diagram for describing a method of visualizing and translating a sentence including a word including a tag based on gender according to an embodiment of the present invention.

DETAILED DESCRIPTION

Figure 1:
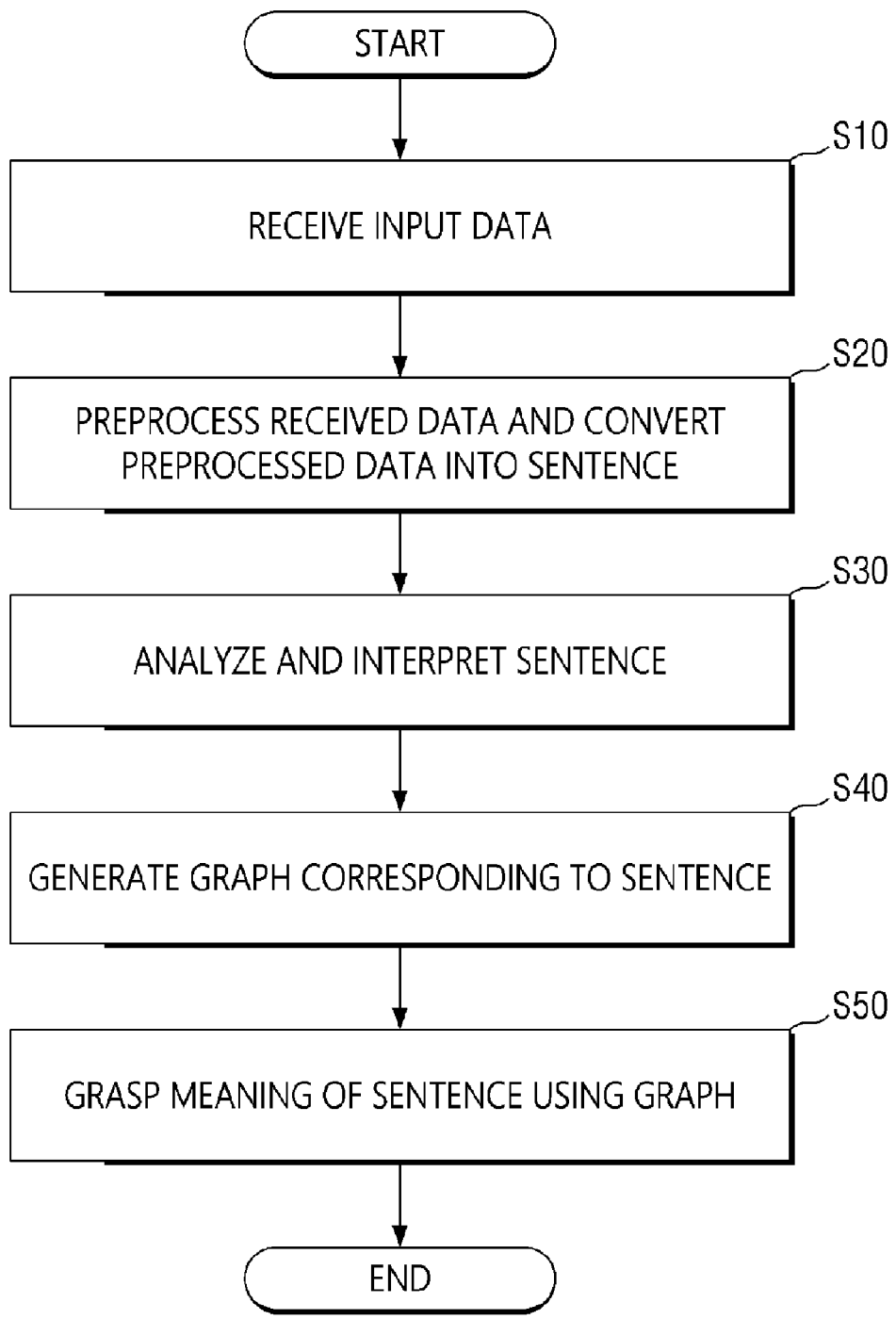
FIG. 1 is a flowchart of a method of understanding a meaning of input data using a graph according to an embodiment of the present invention.

Hereinafter, embodiments of the present disclosure will be described with reference to the attached drawings. Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments may be provided so that this disclosure will be thorough and complete and will fully convey the concept of the disclosure to those skilled in the art, and the present disclosure will be defined by the appended claims.

Unless otherwise defined, all terms used in the present specification (including technical and scientific terms) may be used in a sense that can be commonly understood by those skilled in the art. In addition, the terms defined in the commonly used dictionaries may not be ideally or excessively interpreted unless they are specifically defined clearly. The terminology used herein may be for the purpose of describing embodiments and may not be intended to be limiting of the disclosure. In this specification, the singular also includes the plural unless specifically stated otherwise in the phrase.

Hereinafter, some embodiments of the present invention will be described with reference to the accompanying drawings.

Various types of data (e.g., images, photos, texts, sounds, or raw data) may be each pre-processed and acquired as a text-type sentence. In particular, since the text-type sentence is represented in a specific language, in order for a user to understand the sentence, it is necessary to translate the plurality of sentences into a language desired by the user.

However, when an unnatural or erroneous translation result is generated in the conventional machine translation in which no human is involved, there is a limitation in that a user has no choice but to correct the translation result or use the unnatural sentence as it is.

This is because the existing translation technology does not display any information on a method and process by which a sentence is translated, and thus, even when an unnatural or erroneous translation result is derived, a user may not give feedback on the translation process.

When the sentence translation method according to some embodiments of the present invention is used, since a user confirms a process, from which translation is derived, and easily corrects a cause of mistranslation in the translation process, a more complete translation may be performed.

1. Method of Visualizing and Translating Sentence Components and a Relationship Between Sentence Components In this section, various embodiments related to a method of visualizing sentence components a relationship between the sentence components as a visible representation component and performing translation using this are disclosed. Hereinafter, related embodiments will be described in detail with reference to FIGS. 1 to 47.

FIG. 1 is a flowchart illustrating a method of understanding the meaning of sentences corresponding to various types of input data using the input data.

In operation S10, various types of input data may be received. The types of input data may be, for example, images, photos, texts, sounds, and various types of raw data.

In operation S20, various types of input data may be pre-processed and transformed into one or more sentences in the form of text. For example, user's voice data may be transformed into text form using speech to text (STT), and in the case of an image or video, contents of content may be transformed into a text form using object recognition technology.

Afterwards, in operation S30, the sentence in the text form is segmented into small sentence component units such as morpheme, and the meaning of each of the one or more sentences and words may be interpreted.

In operation S40, a graph corresponding to the sentence may be generated.

In operation S50, the contents of the sentence may be understood using the graph corresponding to the sentence. According to some embodiments of the present invention, a sentence corresponding to the graph may be translated into a representation in another language using the graph, and contents corresponding to the graph may be generated, and thus, animations corresponding to contents of sentences corresponding to a plurality of graphs may be generated. In addition, by representing the sentence in the form of the graph, the meaning and configuration of the sentence may be systematically stored in a database, and a machine, not a human, may systematically analyze the meaning of the sentence by building the database with the sentence.

Figure 2:
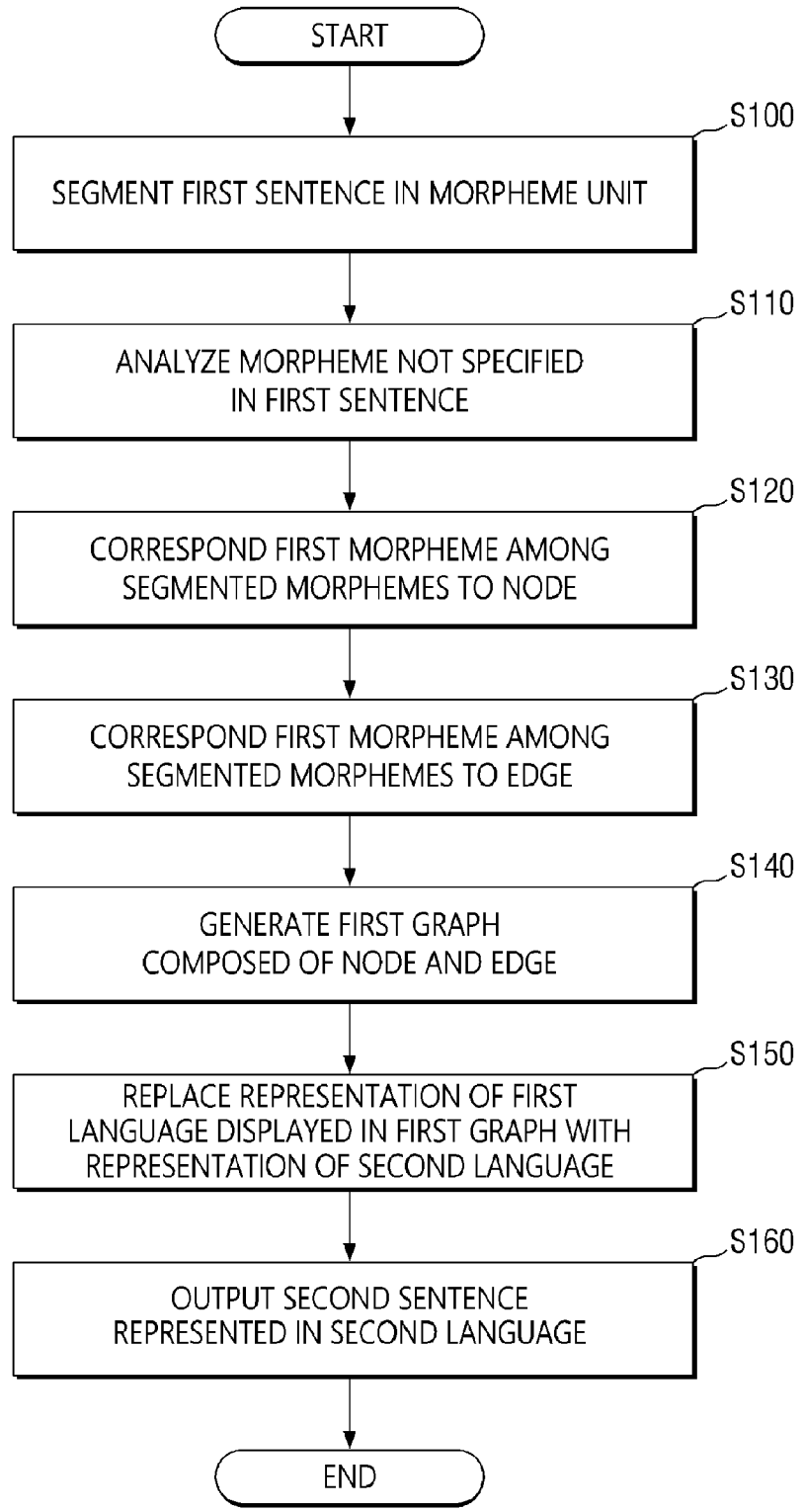
FIG. 2 is a flowchart of a method of visualizing and translating a sentence in a graph according to an embodiment of the present invention.

Hereinafter, a method of visualizing and translating a sentence according to an embodiment of the present invention will be described with reference to FIG. 2.

According to operation S100, an acquired first sentence may be segmented into morpheme units.

The first sentence may be received from an external server or may be an already acquired sentence. Also, the first sentence may be segmented into morpheme units through various technologies. A conventional natural language processing model may be used for the segmentation, or a deep learning-based morpheme analyzer may be used for the segmentation. The morpheme segmentation method is not limited thereto, and various morpheme analysis methods available to those skilled in the art may be used.

For example, when the Korean sentence "나는 너를 사랑한다" (I love you in English)" is acquired, it may be segmented into morpheme units such as "나/는/너/를/사랑한다" in operation S100.

Also, according to some embodiments of the present invention, a sentence may be classified into a noun morpheme and other morphemes that are not nouns. However, it should be noted that this is only an example of a criterion for distinguishing morphemes of a sentence, and sentence components according to some embodiments of the present invention are not necessarily segmented into noun morphemes and non-noun morphemes.

The other morphemes may be again classified into a morpheme that modifies a noun and a morpheme that defines a relationship between nouns. The other morphemes that modify the noun may be, for example, an adjective or a determiner, and the morphemes that define the relationship between the nouns may be a verb or a preposition.

Accordingly, in Korean sentence "나는 너를 사랑한다" (I love you in English)" "나" and "너" may be noun morphemes, "는" and "를" may be morphemes that modify nouns among other morphemes, and "사랑한다 (love)" may be a morpheme that defines the relationship between nouns among other morphemes.

In operation S110, according to a specific language, it may also be analyzed for a morpheme that is not explicitly displayed in a sentence. A morpheme that is not explicitly indicated in a sentence may be, for example, a null-pronoun, an equi-NP deletion, or a zero-copula. However, although not limited thereto, a morpheme that is not explicitly indicated in a sentence includes all omissible words that may occur in various languages.

For example, when the sentence "John wants to go home" is acquired, in operation S110, "John" omitted from the sentence as a subject in meaning of "go" is analyzed, and thus the sentence "John wants (John) to go home" may be acquired by analyzing "John."

A noun morpheme among the morphemes segmented in operation S120 may correspond to a node of a graph. For example, in the sentence "I love you," the pronouns "I" and "You" may correspond to nodes of the graph. However, as described above, it should be noted that, as a part of speech corresponding to a node, a noun is merely an example, and parts of speech that are not nouns may correspond to a node.

Among the morphemes segmented in operation S130, other morphemes that are not nouns may correspond to edges of the graph. The edge may include a self-loop edge and a connected edge. A description of each edge will be described in detail below with reference to FIG. 9.

For example, in the sentence "John wants to go home," "wants" and "to go" may correspond to edges of the graph.

In operation S140, a graph including nodes and edges corresponding to each morpheme of the sentence may be generated. Accordingly, one first graph may be generated corresponding to the acquired first sentence. A method of generating a graph will be described in detail below with reference to the corresponding drawings.

In operation S150, a representation of a morpheme of a sentence corresponding to a node and edge of the first graph may be replaced with a representation of a language to be translated. According to some embodiments of the present invention, when the representation of the morphemes corresponding to each node and each edge of the graph is replaced from the first language to the second language, it may be translated according to each dictionary meaning and may be translated according to a previous translation record or a meaning of a previously translated sentence. The translation method will be described in detail below with reference to FIGS. 4 to 7.

In operation S160, the sentence of the second language corresponding to the first sentence may be output using a graph corresponding to the morpheme replaced with the representation of the second language in the representation of the first language. The sentence of the second language may be determined according to the order of traversing the graph. The order of traversing the graph may be an order determined based on a past translation record, an order acquired through machine learning, or an order designated by a user. The detailed description will be described in detail in the corresponding drawings below.

Figure 3:
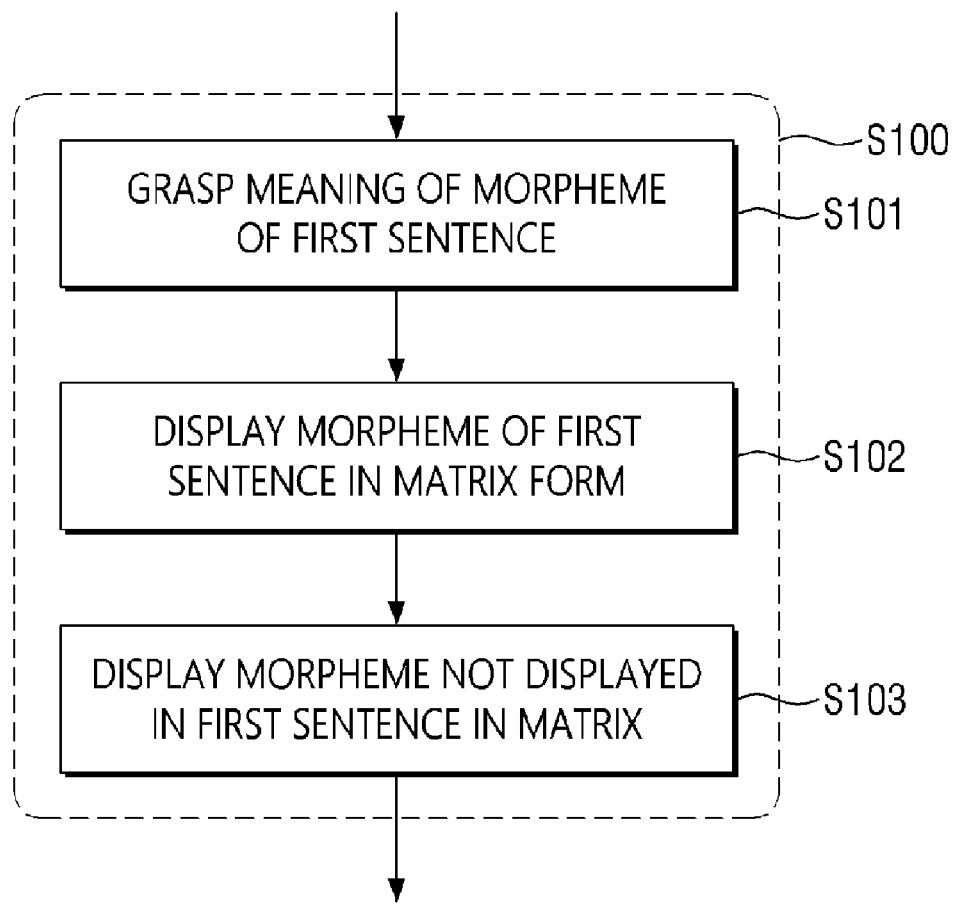
FIG. 3 is a flowchart for describing in detail some operations of FIG. 1.

The operation S100 of FIG. 1 according to another embodiment of the present invention will be described in detail with reference to FIG. 3.

In operation S101, the meaning of the morpheme of the acquired first sentence may be understood. The meaning of the morpheme may be a dictionary meaning or a unique meaning of each morpheme in the corresponding sentence understood using a plurality of sentences. A detailed description thereof will be described below with reference to FIGS. 4 to 7.

In operation S102, the first sentence may be visualized in a matrix form according to some embodiments of the present invention. For example, the first sentence may correspond to a product form of a matrix composed of a noun morpheme and a matrix composed of other morphemes that are not nouns. In addition, in the case of a matrix composed of other morphemes, a diagonal element corresponds to other morpheme for modifying a noun, and a non-diagonal element may correspond to other morphemes for defining a relationship with a noun. However, as described above, the parts of speech corresponding to each matrix element are not limited thereto. A detailed description thereof will be provided below with reference to FIG. 8.

In operation S103, a morpheme that is not displayed in the first sentence may also be displayed as an element of a matrix. Through this, each sentence, matrix, and graph may all correspond.

Figure 4:
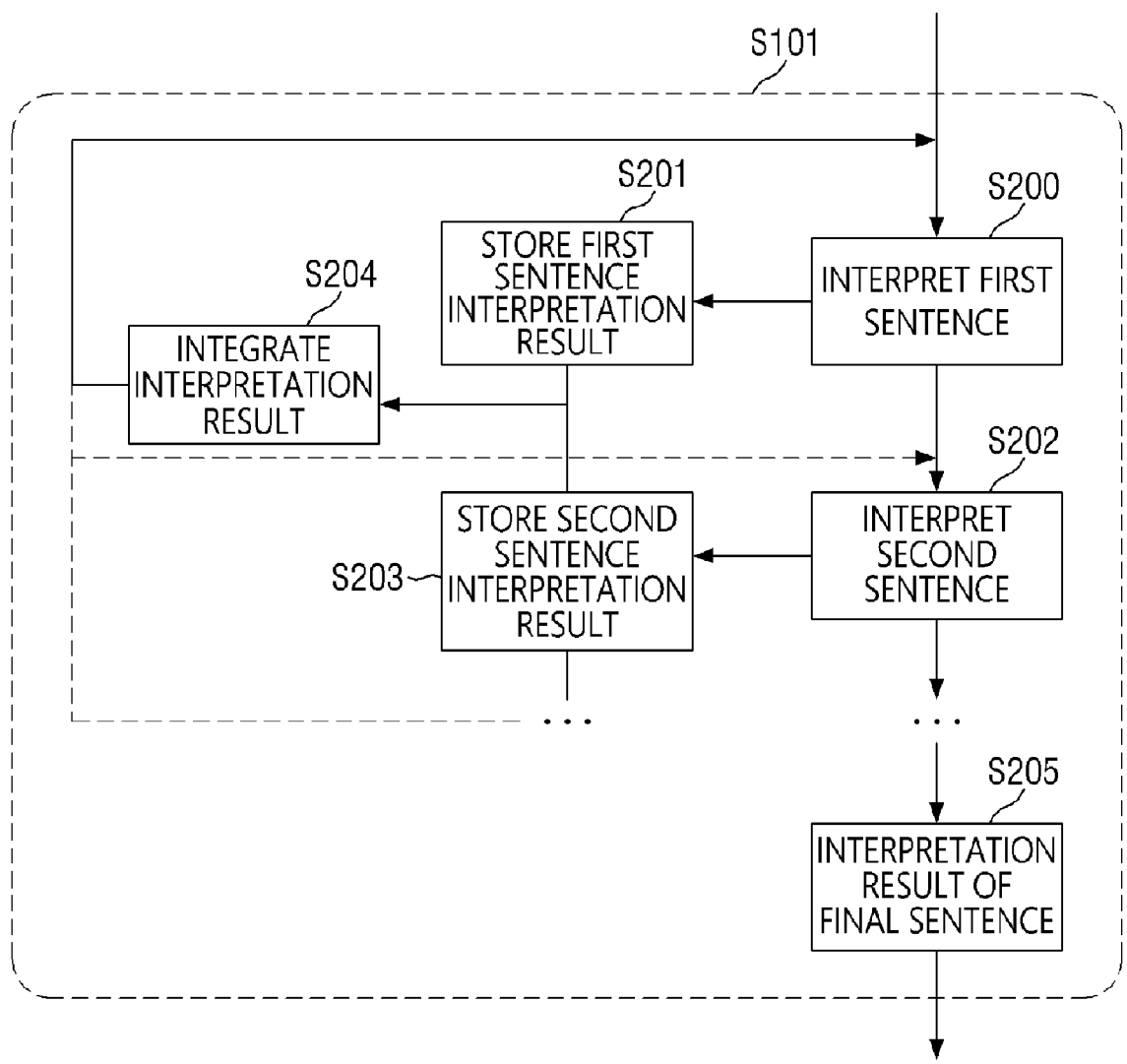
FIG. 4 is a flowchart for describing in detail some operations of FIG. 3.

Hereinafter, a method of interpreting a meaning of a sentence for translation will be described in detail with reference to FIG. 4.

When the translation of a plurality of sentences is performed and when the meaning of a specific sentence is interpreted according to some embodiments of the present invention, the meaning of the specific sentence may be interpreted using the meaning of a previous sentence.

For example, when the first sentence and the second sentence include morpheme having the same or related meaning, the first sentence and the second sentence are reinterpreted. For example, in interpreting the second sentence, the meaning of the first sentence may be used, and when the second sentence includes the same morpheme as the first sentence, the first sentence may be reinterpreted using the meaning of the second sentence.

In this way, by performing the translation of the final sentence using the meaning of a plurality of sentences, it is possible to clearly understand the meaning of a part where a translation error such as a homonym or an ambiguous representation may occur.

Specifically, it is possible to interpret the meaning of the first sentence in operation S200 and store the analysis result of the first sentence in operation S201. Thereafter, it is possible to interpret the meaning of the second sentence in operation S200 and store the analysis result of the second sentence in operation S203.

The first sentence and the second sentence are analyzed again using the analysis results of the first sentence and the second sentence by integrating the interpretation results of the first sentence and the second sentence stored in the operation S201 and the operation S203 in the operation S204.

By repeating these operations, the meaning of the final sentence may be interpreted in operation S205 for a plurality of sentences.

Figure 5:
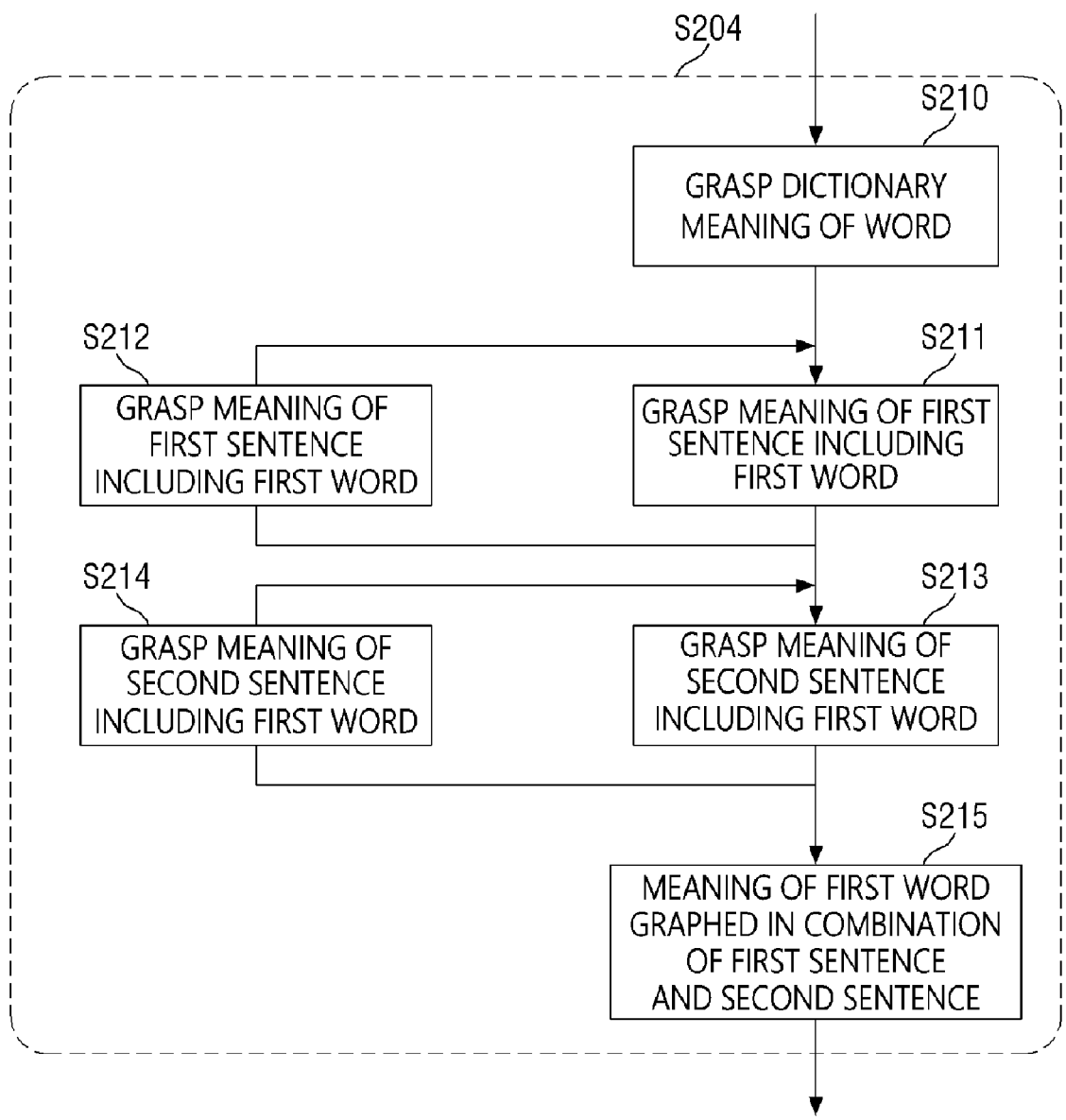
FIG. 5 is a flowchart for describing in detail some operations of FIG. 4.

Hereinafter, a method of interpreting a meaning of a word included in each sentence will be described in more detail with reference to FIG. 5.

First, in order to understand the meaning of the sentence acquired in operation S210, the dictionary meaning of each word is understood.

Then, after determining the meaning of the first sentence including each word in operation S211, the meaning of the corresponding word meaning in the first sentence is stored in operation S212. The meaning of the corresponding word in the first sentence may include information or the like on other words that modify the word or related to the word.

For example, in the sentence "My name is Young-hee," the dictionary meaning of "I" is "myself," but in the above sentence, the meaning of "My" and "name is Young-hee" may be added. The meaning of each word added to each sentence may be stored through separate tagging.

In operation S213, after the meaning of each word in the second sentence is interpreted, tag information including the information acquired in the second sentence in operation S214 may be added.

According to some embodiments of the present invention, in the case of a word commonly included in a plurality of sentences, tag information including information acquired from each sentence may be added to each word in the order of acquiring the plurality of sentences.

In operation S215, the meaning of each word may be understood through all ultimately acquired sentences, and the meaning of each sentence including each word may also be understood using each word whose meaning is understood.

Figure 6:
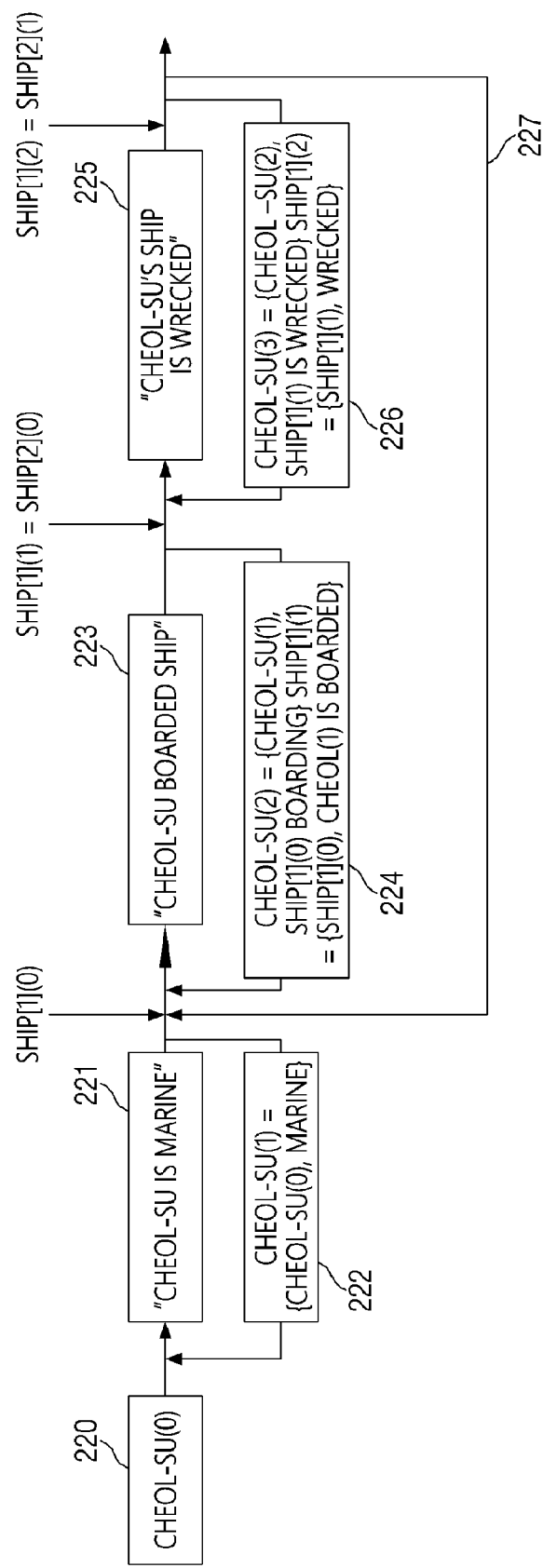
FIGS. 6 and 7 are diagrams for describing a method of interpreting a plurality of sentences including a specific word in common according to an embodiment of the present invention.

Hereinafter, a process of understanding the meaning of each word and the meaning of a sentence will be described in detail with reference to FIGS. 6 and 7. In FIG. 6, before receiving a sentence, the word "Cheol-su" is tagged with information such as "person's name" 220. After the first sentence 221, "Cheol-su is maritime" 221, is acquired, the word "Cheol-su" is further tagged with information "maritime" 222. In addition, when the second sentence 223, "Cheol-su boarded a ship" 223 is acquired, the word "Cheol-su" is further tagged with the degree of "boarding a ship," and the word "ship (배[bae] in Korean)" is tagged with information such as "Cheol-su is boarded" in addition to the dictionary meaning "a structure designed to float and move on water."

When the sentence "Cheol-su's ship is wrecked," which is a next third sentence 225, is acquired, the tagging of information "the ship is wrecked" is further added to the word "Cheol-su," and the word "ship" is further tagged with the information "wrecked." The "ship" included in the second sentence 223 and the "ship" included in the third sentence 225 have the same dictionary meaning and are the same in context, and thus, even when the third sentence 225 is input, the tag information is added by succeeding to the word "ship" to which the existing tagging information is added. Since the "ship" included in the second sentence 223 and the third sentence 225 refers to the same thing, the second sentence may be reinterpreted based on all tagging information on the "ship" including the tagging information added in the third sentence after the input of the third sentence 227.

An example of the tagging information added to the words "Cheol-su" and "ship" as each sentence is sequentially acquired is as follows.

Cheol-su(0)=(Person's name), Cheol-su(1)={Cheol-su (0), Marine}, Cheol-su(2)={Cheol-su(1), Ship[1](0) boarding}, Cheol-su(3)={Cheol-su(2), Ship[1](1) is wrecked}, Ship(0)=(Dictionary meaning: Structure designed to float and move on water), Ship[1](1)={Ship[1](0), Cheol-su(1) is boarded}, Ship[1](2)={Ship[1](1), Wrecked}, Ship[1](1) =Ship[2](0), Ship[1](2)=Ship[2](1).

Figure 7:
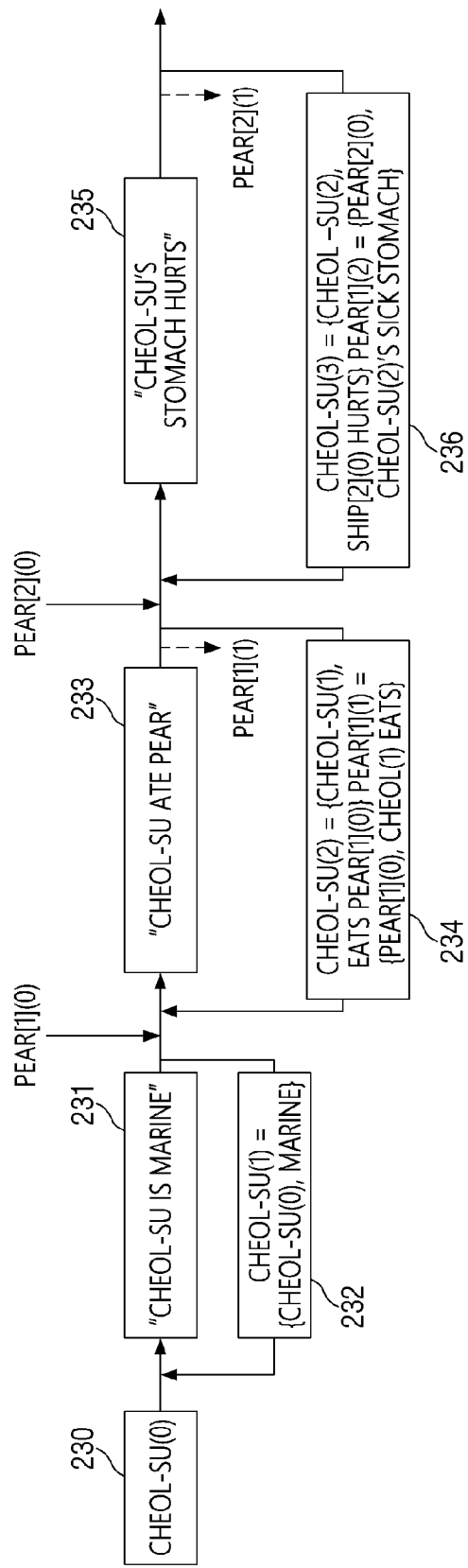

Referring to FIG. 7, unlike FIG. 6, the word "배[bae]," which is a homonym in Korean, is included in the sentence. In this case, the tag information is added to each word.

For example, when the first sentence 231 "Cheol-su is a marine," the second sentence 233 "Cheol-su ate a pear," (wherein pear is 배[bae] in Korean) and the third sentence 235 "Cheol-su's stomach hurts" (wherein pear is 배[bae] in Korean) are acquired, since the word "Cheol-su" 230 is inherited with the same meaning in each sentence, the word "Cheol-su" tagged with the information on the first sentence may have information such as "Cheol-su(1)={marine}" 232, the word "Cheol-su" further tagged with information on the second sentence may have information such as "Cheol-su (2)={Cheol-su(1), eats pear [1](0)}" 234, and the word "Cheol-su" further tagged with information on the third sentence may have "Cheol-su(3)={Cheol-su(2), stomach[2] (0) hurts}" 236.

In this case, the tag information on "pear" in the second sentence may be pear [1](0)=(dictionary meaning: fruit of a pear tree), pear[1](1)={pear[1](0), Cheol-su(1) eats} and the tag information on "stomach" in the third sentence may be stomach[2](0)=(dictionary meaning: an area between a check and buttocks as an area including internal organs such as the stomach, intestines, and kidneys in a body of a human or animal), stomach[2](1)={stomach[2] {0}, stomach where Cheol-su(2) hurts}. That is, in the second sentence "pair," the tag information is added to the pear[1], and in the third sentence "stomach," the tag information is added to the stomach[2].

The translation method according to some embodiments of the present invention enables a clearer and more natural translation of sentences through repeated reinterpretation of a plurality of sentences by managing tags for each word.

Figure 8:
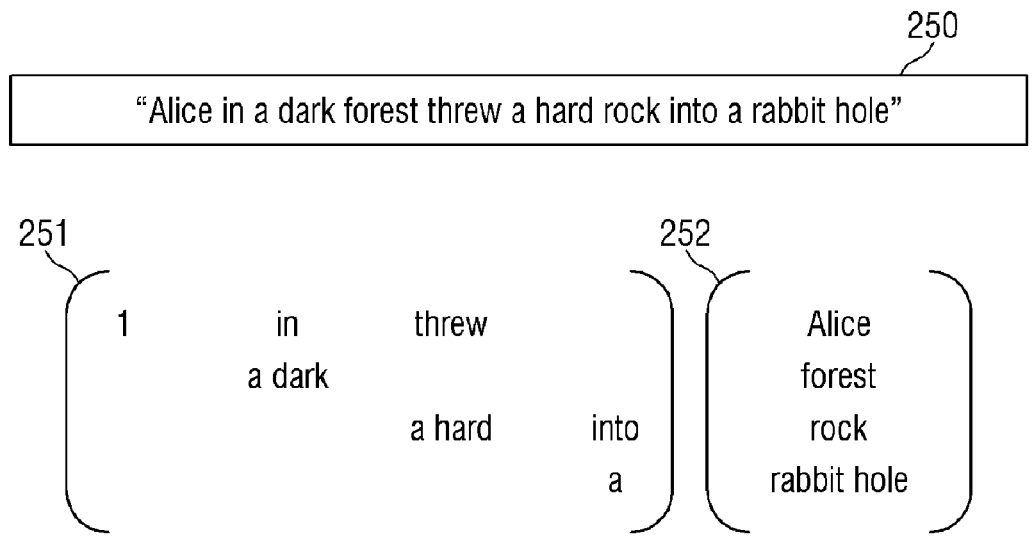
FIG. 8 is a diagram for describing a method of visualizing and translating a sentence in the form of a matrix according to an embodiment of the present invention.

A method of visualizing a sentence in the form of a matrix according to an embodiment of the present invention will be described with reference to FIG. 8.

The sentence "Alice in a dark forest threw a hard rock into a rabbit hole" 250 may be segmented into: "Alice/in/a dark/forest/threw/a hard/rock/into/a/rabbit/hole." When a sentence is transformed into a matrix according to some embodiments of the present invention, the sentence may be transformed into a matrix composed only of a noun morpheme and a matrix composed only of other morphemes that are not nouns. However, it should be noted that, as described above, sentences according to some embodiments of the present invention are not necessarily divided into a noun morpheme and other morpheme.

Therefore, the above sentence may be transformed into a matrix 252 with elements {Alice, forest, rock, rabbit hole} and a matrix 251 with elements {in, a, dark, threw, a, hard, into, a}. Also, the diagonal element of the matrix composed only of other morphemes may be other morphemes that modify the noun morpheme. During the matrix multiplication operation, elements of other morphemes that modify each noun may be located on a diagonal of positions where the elements of other morphemes are multiplied by the element of the corresponding noun morpheme. For example, other morphemes such as a and dark modify forest, and other morphemes such as a and hard modify rock, and therefore, the other morphemes are located on the diagonal of the matrix corresponding to positions (2, 2) and (3, 3) and are located at positions where the other morphemes are multiplied by second and third nouns.

Also, according to another embodiment of the present invention, the sentence represented by the matrix may be transformed into a graph. In this case, each element of the matrix composed only of the noun morpheme may correspond to a node of the graph, and the diagonal elements of the matrix composed only of other morphemes may correspond to a self-edge of the node corresponding to the noun morpheme located in the same row. Also, the other morphemes can be a connected edge of the graph. For example, when the position of other morpheme "threw" in the matrix is (1, 3), the connected edge corresponding to "threw" may be a concatenation between a node corresponding to the first noun morpheme and a node corresponding to the third noun morpheme of the noun morpheme matrix.

Figure 9:
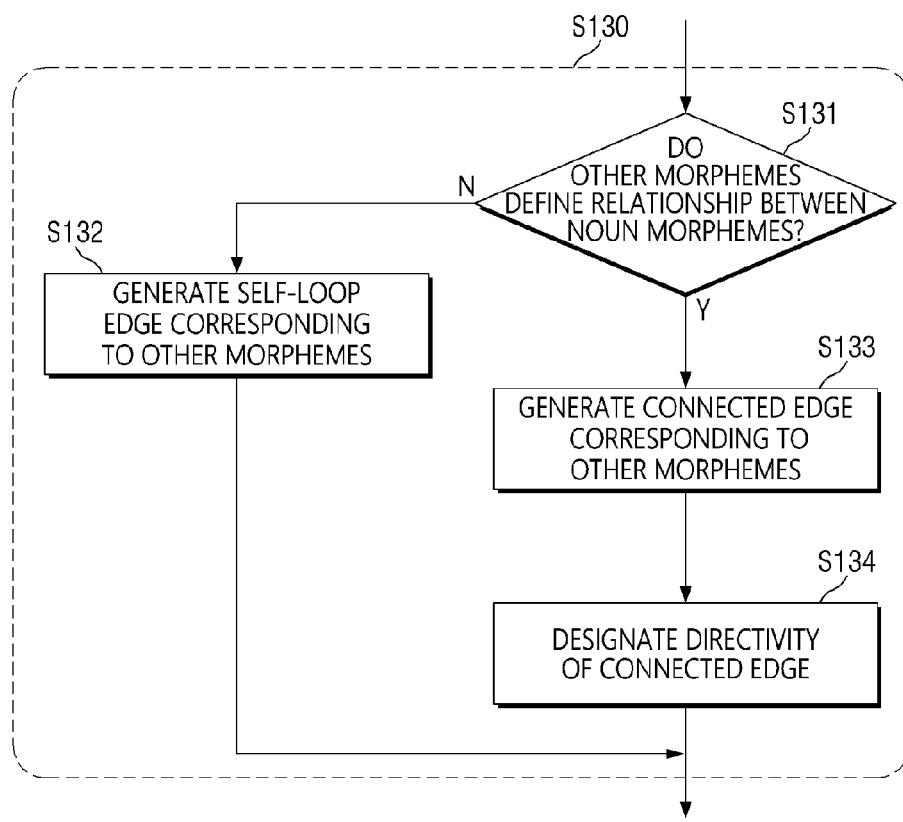
FIGS. 9 and 10 are diagrams for describing in detail some operations of FIG. 2.

Hereinafter, a method in which a self-loop edge and a connected edge are distinguished and generated in a graph will be described in detail with reference to FIG. 9.

When other morphemes that are not nouns are extracted through the analysis of the morpheme of the sentence, it is determined in operation S131 whether the other morphemes define the relationship between noun morphemes.

Another morpheme that defines the relationship between noun morphemes can be, for example, any one of a verb, a preposition, a verb phrase, or a prepositional phrase. However, note that this may appear in different forms for each language.

When other morphemes do not define a relationship between nouns in operation S132, edges corresponding to the other morphemes may be generated as a self-loop edge of a node corresponding to the noun morpheme. Other morphemes that do not define the relationship between nouns may be determiners or adjectives. However, note that this may appear in different forms for each language.

Other morphemes that define the relationship between nouns in operation S133 may correspond to a connected edge concatenating each noun.

In operation S134, the direction of the connected edge may be designated. Depending on the direction of the connected edge, a voice of the corresponding sentence may be determined. For example, when a node corresponding to a noun morpheme corresponding to a subject is a source node of the edge and a node corresponding to a noun morpheme corresponding to an object is a destination node of the edge, the corresponding graph may be an active voice sentence. Conversely, when the node corresponding to the noun morpheme corresponding to the object is the source node of the edge, the corresponding graph may be a passive voice sentence.

The voice of such a sentence may be determined according to a voice of a sentence to be translated, a preferred form may be designated using a user's translation record, or the sentence may be a sentence of a designated form using machine learning.

Figure 10:
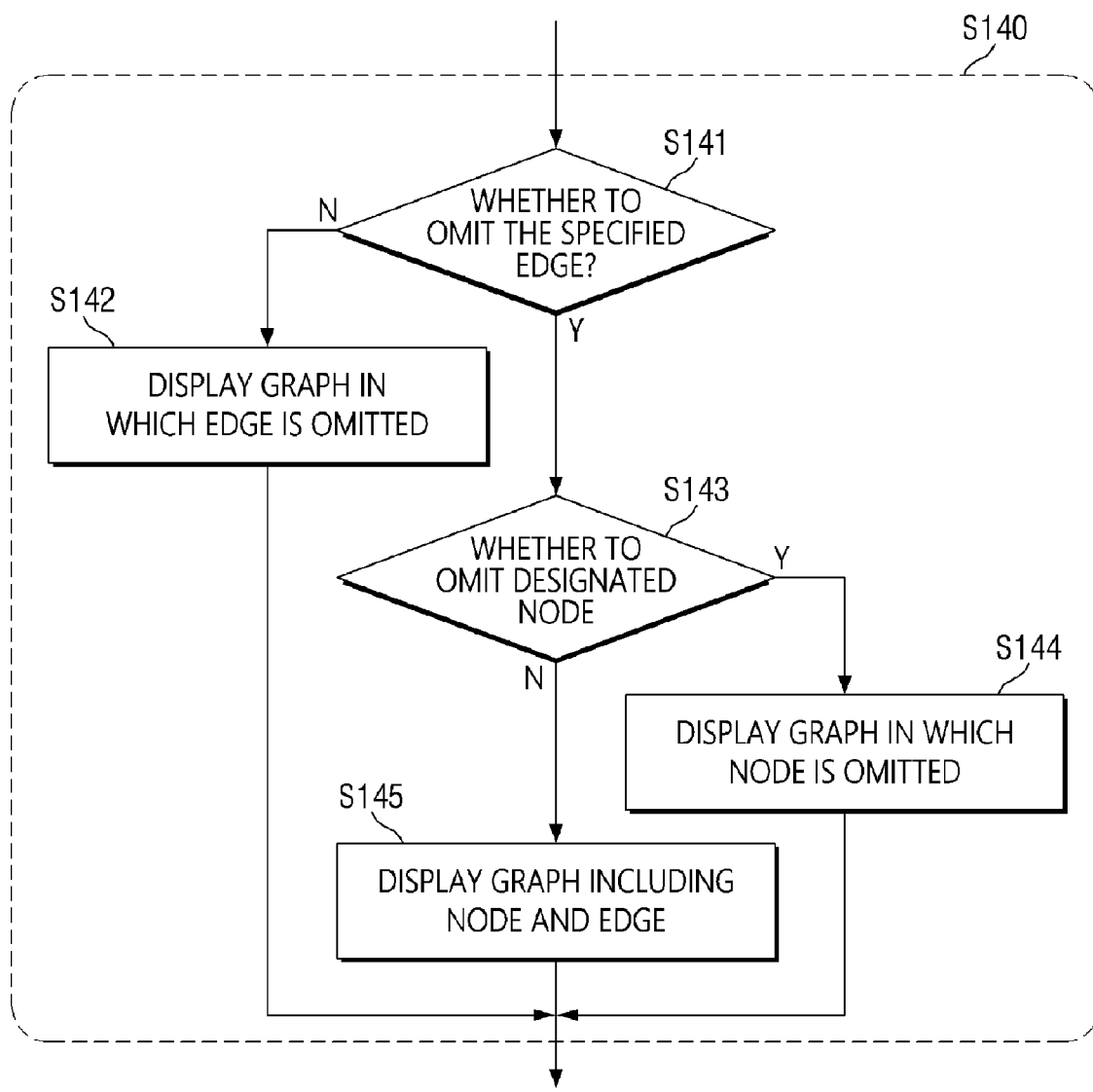

Hereinafter, a method of not displaying a morpheme, which is not explicitly displayed in a sentence, on a graph will be described in detail with reference to FIG. 10.

In operation S141, when other specific morphemes can be omitted from the language of the translated sentence, edges corresponding to the other morphemes may be omitted in operation S142.

Alternatively, in operation S143, when a specific noun morpheme can be omitted from the language of the translated sentence, a node corresponding to the noun morpheme may be omitted in operation S141.

However, it should be noted that the precedence relationship between operation S141 and operation S143 is not limited to the illustrated order, and operation S143 may precede operation S141, and operations S141 and S143 may be performed simultaneously in a parallel order.

Finally, the graph including only the nodes and edges required in operation S145 may be displayed.

A method of visualizing and translating a sentence in the form of a graph including nodes and edges will be described with reference to FIG. 11.

When transforming the English sentence "I gave a book to her" into nodes and edges (300a), "I," "book," and "her" are nouns, and therefore, are transformed into nodes. The "a" modifies "book" and, therefore, may be transformed into the self-loop edge of the node corresponding to "book," and "gave" and "to" define the relationship between "I" and "book" and between "book" and "Her," respectively, and therefore may be transformed into a connected edge.

When representing each word of the sentence by formula in order to transform the words into nodes and edges constituting the graph, the words may be convert into a set representation of {Node("I"), Edge<"I," "book">, Edge<"book," "book">, Node("book"), Edge<"book," "her">, Node("her")}.

Also, according to some embodiments of the present invention, information 301 on the reading order of the graph may be further displayed. Referring to FIG. 11, it can be seen that the reading order for each node is "I," "book," and "her." Accordingly, in the translation method according to some embodiments of the present invention, the order of extracted sentences may be different according to the reading order.

A case in which a sentence including the omitted morpheme is transformed into a graph will be described with reference to FIG. 12.

When the sentence "I gave her a book" is transformed into a graph, the morpheme defining the relationship between the "her" noun morpheme and the "book" noun morpheme is omitted and not explicitly indicated in the sentence. Accordingly, according to some embodiments of the present invention, the omitted morpheme of the sentence may also be displayed on the graph (302). In FIG. 12, an edge corresponding to the omitted morphemes of the sentence is indicated by a dotted line, but the method of displaying the omitted morphemes is not limited thereto.

By displaying an omitted morpheme in a sentence of a specific language on the graph, it is possible to accurately translate a case in which the omitted morpheme is explicitly displayed in a language translated later.

Figure 11:
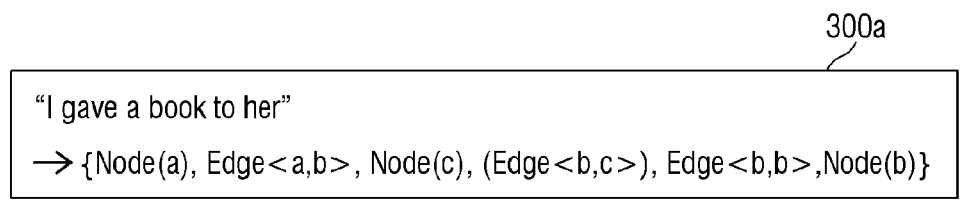
FIG. 11 is a diagram for describing a method of visualizing and translating a sentence in the form of a graph including nodes and edges according to an embodiment of the present invention.
Figure 11:
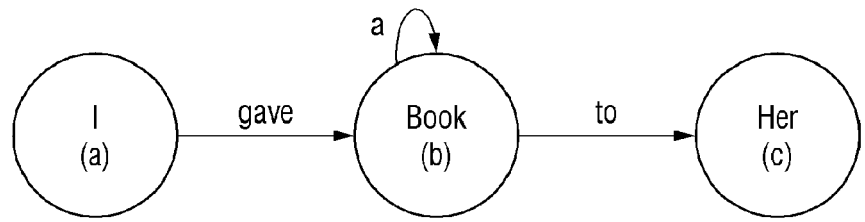
Figure 11:
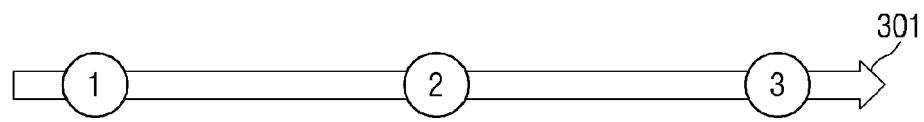
Figure 12:
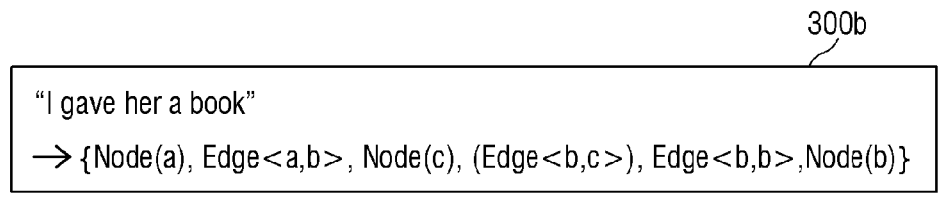
FIGS. 12 to 14 are diagrams for describing a method of visualizing and displaying a sentence including omitted morphemes according to an embodiment of the present invention.
Figure 12:
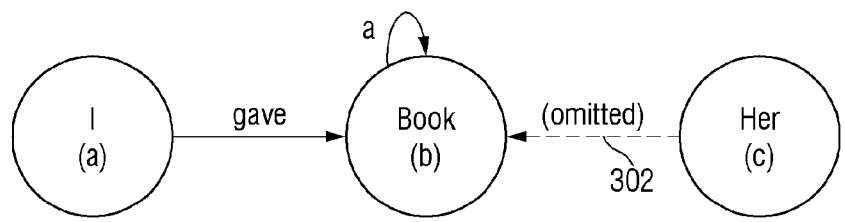
Figure 12:
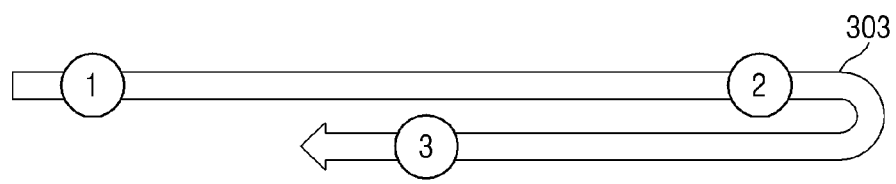

Also, referring to FIG. 12, unlike FIG. 11, sentences having the same meaning as in FIG. 11 but in a different word order may be extracted by interpreting the graph in the order of nodes corresponding to "I," "her," and "book."

Figure 13:
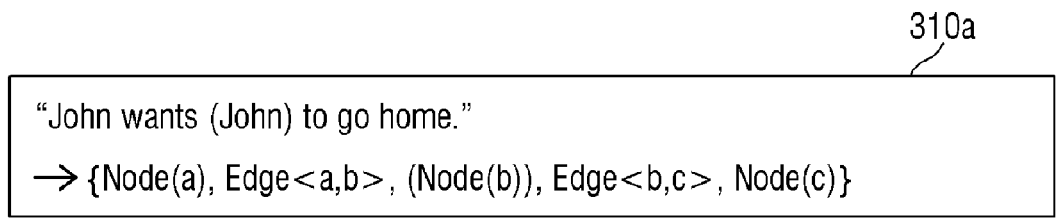
Figure 13:
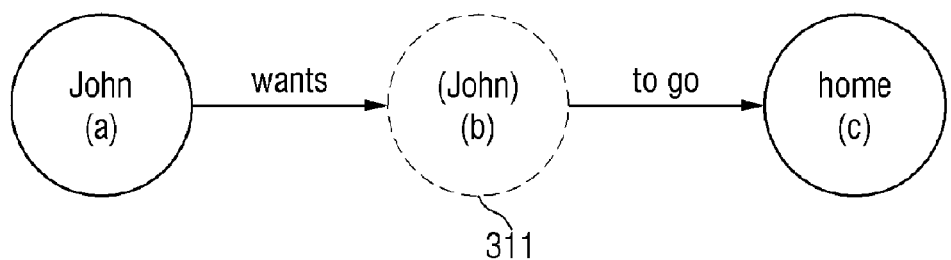
Figure 14:
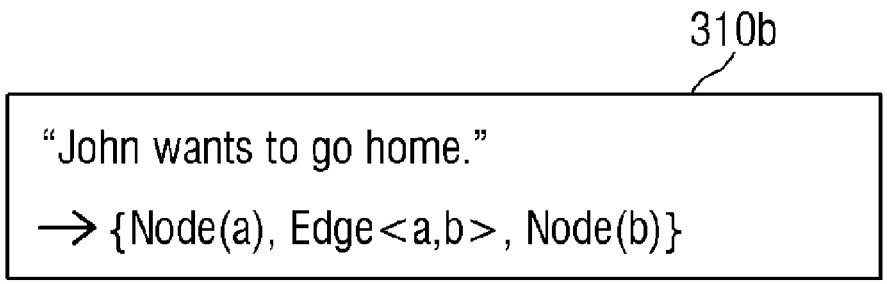
Figure 14:
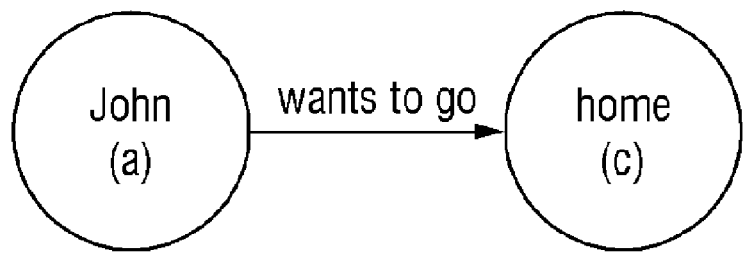

A method of transforming a sentence including an omitted noun morpheme into a graph will be described with reference to FIG. 13.

For example, when the sentence "John wants (John) to go home" is transformed into a graph, the sentence may be represented in the set form such as {Node ("John"), Edge<"John," "(John)">, (Node ("(John)")), Edge<"(John)," "home">, Node ("home")} according to the method described above.

In this time, even when the subject "John" is omitted in the meaning of "to go" from a sentence 310a of "John wants (John) to go home" and is not explicitly displayed in the sentence, a node 311 corresponding to the omitted subject "John" in meaning from the graph may be displayed.

In addition, according to another embodiment of the present invention, the omitted morpheme may not be displayed in a graph. When referring to FIG. 14, when the subject "John" in the meaning of "to go" is not explicitly displayed in the sentence and all the omitted morphemes in the language before and after translation are not explicitly included in the sentence, a node corresponding to the omitted "John" may not be generated for the sake of simplification of the graph.

Hereinafter, a method of interpreting a graph including a plurality of nodes and edges will be described with reference to FIG. 15.

According to another embodiment of the present invention, when interpreting the graph including a plurality of nodes and edges, a separate indication may be added to the subject of the sentence. For example, in the case of the graph of FIG. 15, a mark indicating that "Alice" is the entire subject may be added. In addition, indications 321, 322, and 323 for the analysis order of the graph may be further added. Therefore, when the user interprets the graph as the sentence, the graph can be interpreted as a one-dimensional sentence 320*a* by using the graph interpretation order display starting with the subject displayed on the graph.

Figure 15:
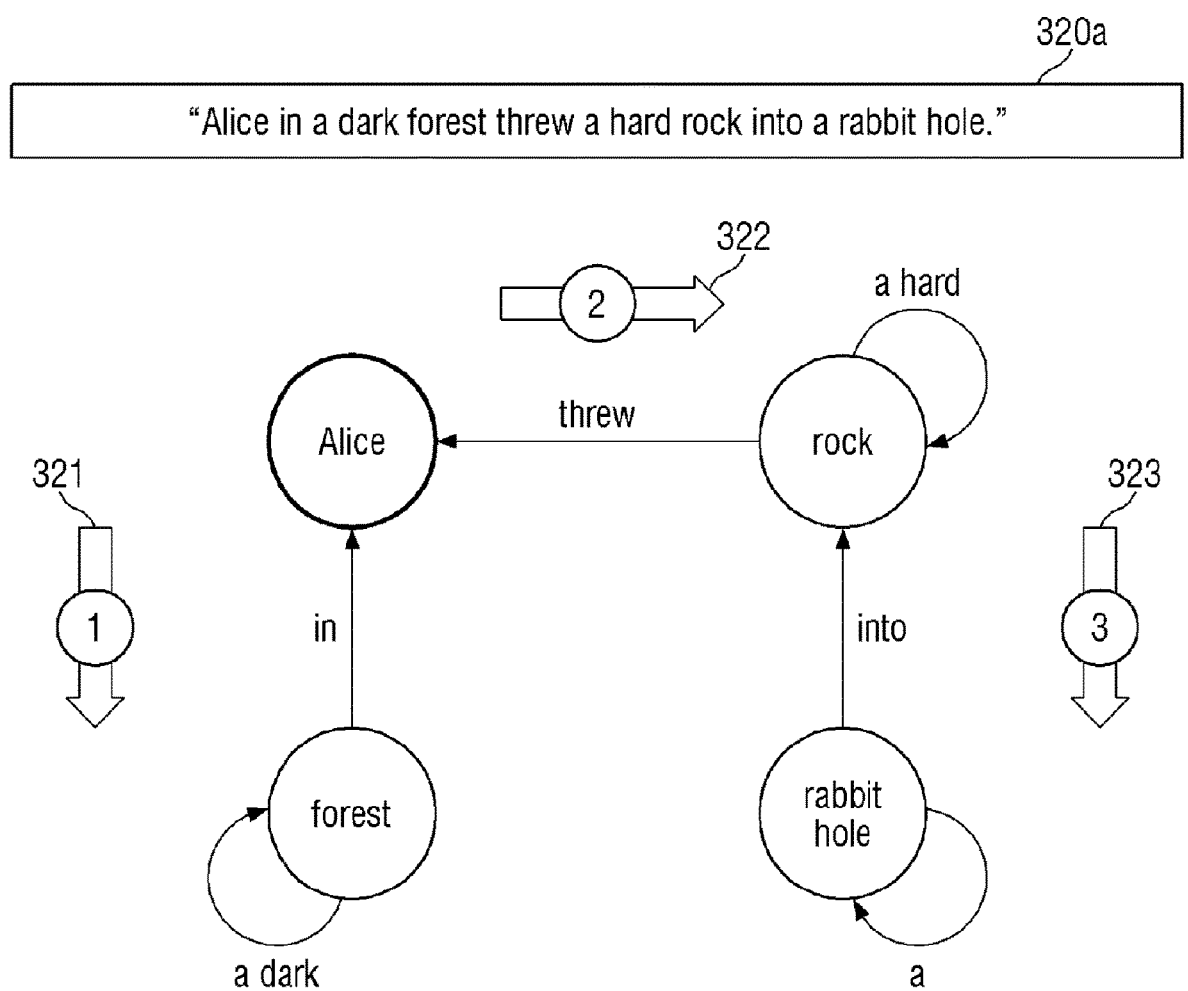
FIG. 15 is a diagram for describing a method of visualizing and translating a sentence to display an order of interpreting a sentence and a morpheme corresponding to an edge on a graph according to an embodiment of the present invention.

In addition, when the sentence "Alice in a dark forest threw a hard rock into a rabbit hole." illustrated in FIG. 15 is translated into another language, the interpretation order 321, 322, and 323 of the displayed graph may be changed. For example, when the above sentence is translated into Korean, it can be translated into "Alice in a dark forest threw a hard rock into a rabbit hole" and may be translated into "Alice threw a hard stone into a rabbit hole in a dark forest." That is, even when the same graph is translated, a plurality of sentences having different orders may be generated. In this case, separate marks 321, 322, and 323 corresponding to the interpretation order of each sentence may be added.

Figure 16:
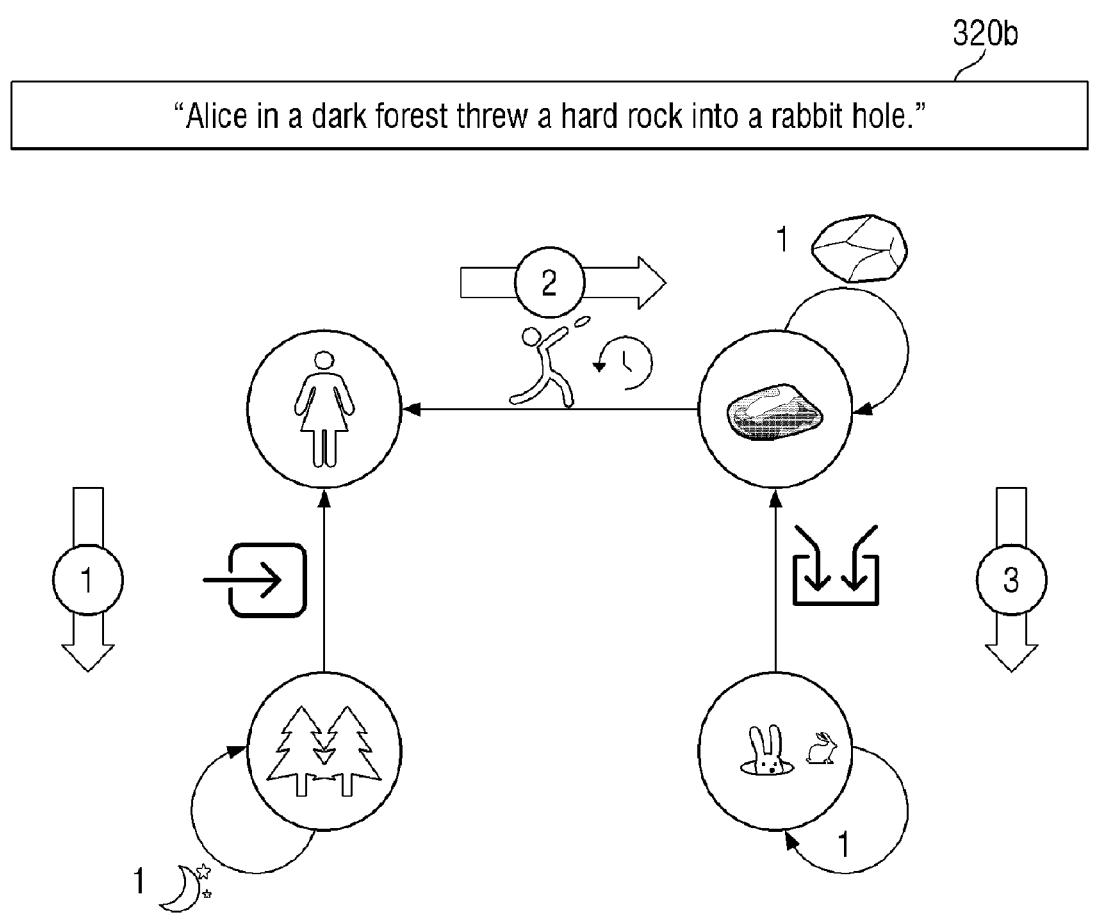
FIG. 16 is a diagram for describing a method of visualizing and translating a sentence in a figure according to an embodiment of the present invention.

Also, referring to FIG. 16, for a user who does not know the language after or before translation, all words corresponding to the graph may be displayed as images such as pictures or photos. Through this, even a user who does not know a specific language may intuitively understand the meaning, the structure, and the relationship of each morpheme of the sentence.

Figure 17:
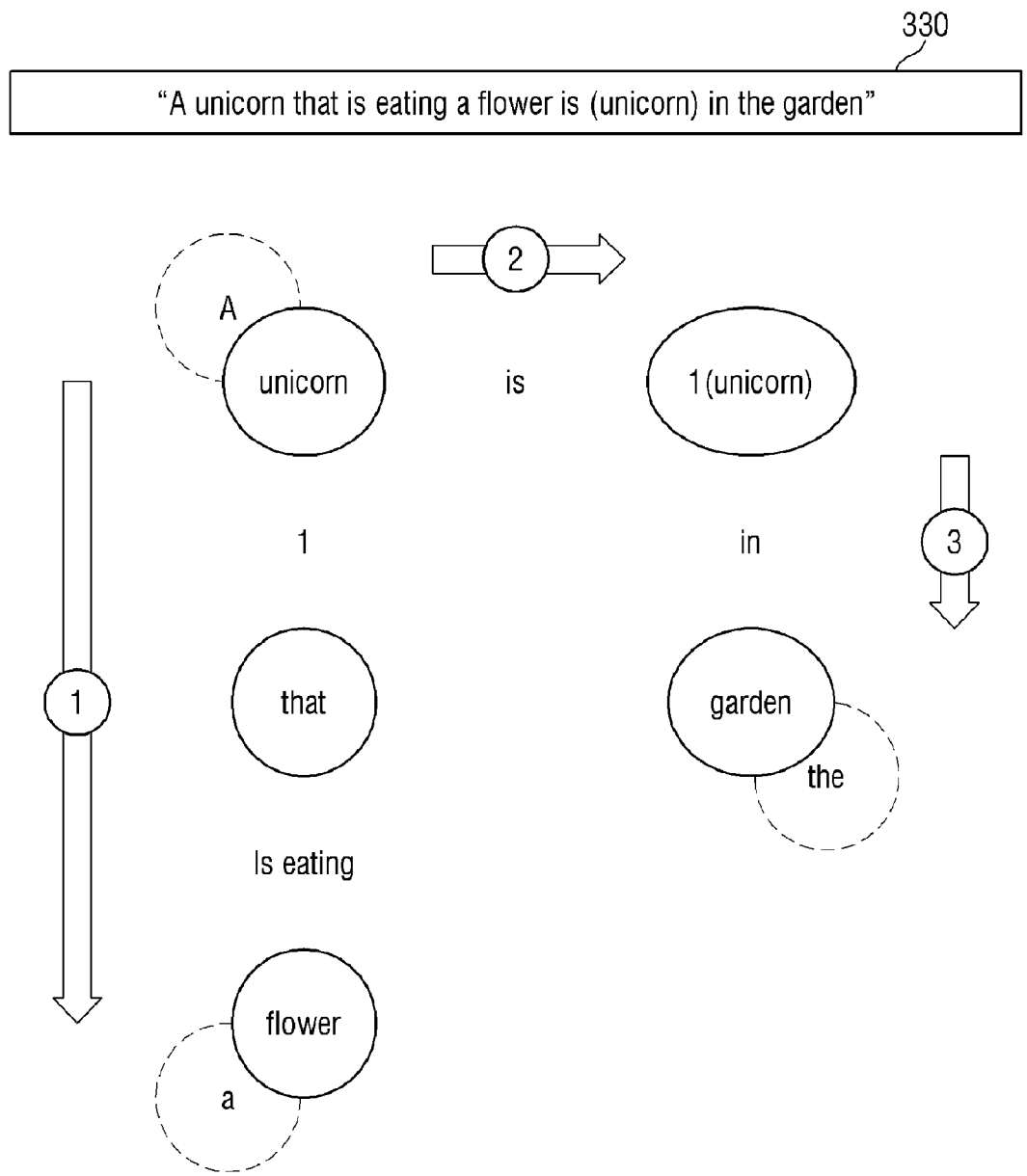
FIG. 17 is a diagram for describing a method of visualizing and translating a sentence so as not to display the morpheme corresponding to an edge on a graph according to an embodiment of the present invention.

Referring to FIG. 17, according to still another embodiment of the present invention, the sentence may be visualized so that the edge of the graph is not displayed.

Since the edge of the graph means the relationship between nouns or a morpheme that modifies a noun, the direction of the edge may vary depending on the voice (e.g., passive voice and active voice) of the sentence to be described below. Accordingly, in some embodiments, when it is important to understand the meaning of the sentence, the edge of the graph may not be displayed. Through this, the user can easily obtain only the information of his or her interest in the interpretation and translation process of the sentence.

Hereinafter, a method of displaying a sentence in a graph in the case of a language in which an honorific word exists according to a class between a speaker and a subject of the sentence will be described with reference to FIG. 18.

For example, strict use of honorific word exists in Korean, but not all words corresponding to each honorific word in Korean exist in English. Therefore, when a sentence in which an honorific word exists is translated into English and then translated back to Korean, the honorific word representation itself may disappear or be translated awkwardly. To prevent this, according to the present embodiment, when a graph corresponding to a sentence is generated, information on a rank between a speaker of the sentence and a subject and an object of the sentence may be further generated.

For example, in the case of the sentence "Deputy Manager Lee delivered coffee to Deputy Director Kim," the speaker of the sentence has a higher rank than Deputy Manager Lee and a lower rank than Deputy Director Kim. Accordingly, when the sentence is transformed into the graph of FIG. 18, information on a rank 340*a* on the relationship between the speaker, Deputy Director Kim, and Deputy Manager Lee is further required.

Figure 18:
FIGS. 18 and 19 are diagrams for describing a method of translating by visualizing a sentence including an honorific word according to an embodiment of the present invention.
Figure 18:
Figure 19:
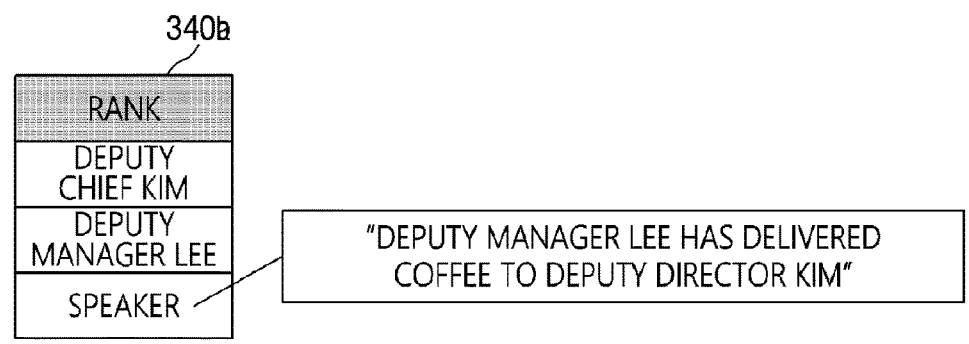
Figure 19:

In particular, in the case of the sentence "Deputy Manager Lee has delivered coffee to Deputy Director Kim" in FIG. 19, which has the same meaning as the sentence in FIG. 18, the speaker's rank is lower than that of Deputy Manager Lee and Deputy Director Kim 340*b*, unlike the sentence in FIG. 18. In this case, through the present embodiment, information on the sentence "Deputy Manager Lee has delivered coffee to Deputy Director Kim" in FIG. 19 and the sentence "Deputy Manager Lee delivered coffee to Deputy Director Kim" in FIG. 18 are generated differently, and thus, more accurate sentence translation is possible.

Hereinafter, a case in which tag information according to gender is further generated for a designated morpheme of a sentence according to another embodiment of the present invention will be described in detail with reference to FIG. 20.

For example, in Korean, the word "great" has the same form when modifying a noun morpheme, meaning female, and a noun morpheme meaning male. However, in French, "Un grand," meaning "great," is used to modify the noun morpheme meaning a male, and "Un grande" is used to modify the noun morpheme meaning a female. In this case, according to the present embodiment, when French is translated into Korean, a tag including information on gender may be added to each word in addition to the translation result of "great." For example, when the translation result is "Great Emperor," it may be displayed as "Great (Male) Emperor" by further adding tag information.

In this case, in a language in which shapes of each word are displayed differently according to gender, a tag including information on the gender may not be added to each word. For example, when the English word "Emperor" means a male emperor and "Empress" means an empress, it is not necessary to add a separate tag including information on gender to the word.

Accordingly, when a word having a different shape according to gender is translated, a tag including information on gender is generated for each of the words, and thus a more accurate result may be extracted in the subsequent translation process.

Figure 21:
FIG. 21 is a diagram for describing a method of visualizing and translating a plurality of active voice sentences having the same meaning according to an embodiment of the present invention.

A case in which a plurality of sentences correspond to one graph will be described with reference to FIG. 21. When a sentence is transformed into a graph according to some embodiments of the present invention, as illustrated in FIG. 21, a plurality of sentences having the same meaning or different word order may correspond to one graph. Therefore, in the case of performing the translation, it is possible to efficiently utilize computing resources because the translation is performed on one corresponding graph without the need to perform the translation on each of the plurality of sentences.

Also, when the word order of the sentences extracted as the translation result is different from the word order intended by the user, a plurality of sentences of various word orders having the same meaning may be further extracted. For the order of the plurality of extracted sentences, a statistical method using a user's previous translation record and multiple users' translation records may be used, and machine learning using a vast translation record may be used.

Figure 22:
FIG. 22 is a diagram for describing a method of visualizing and translating a plurality of passive voice sentences having the same meaning according to an embodiment of the present invention.

Further, even in sentences with the same meaning, the shape of the graph corresponding to each sentence may be different depending on whether the voice of the sentence is passive or active voice. Referring to FIG. 22, even when the sentence has the same meaning as that of FIG. 21, the direction of the edge may be different from the graph of FIG. 21 in the case of the graph corresponding to the sentence of the passive voice. Therefore, the user may modify the voice of the extracted sentence by modifying the direction of the edge of the graph.

Through this, even when the user does not know any one of the languages before or after translation, the user may intuitively understand the meaning and voice of the extracted sentences.

Figure 23:
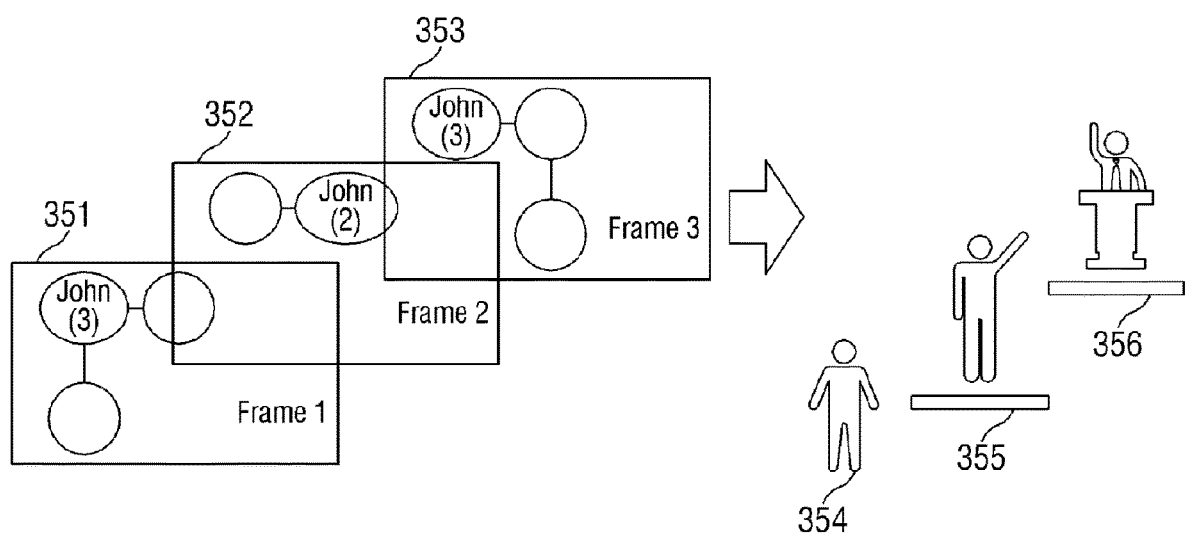
FIG. 23 is a diagram for describing a method of translating each of the plurality of sentences into an image according to an embodiment of the present invention.

Referring to FIG. 23, according to some embodiments of the present invention, graphs 351, 352, and 353 corresponding to a plurality of sentences may be formed as images 354, 355, and 356.

An image corresponding to each graph may be generated, and an animation may be generated using the graph corresponding to a plurality of sentences including the same word. For example, when a plurality of graphs 351, 352, and 353 corresponding to a plurality of sentences including the word "John" are generated, a plurality of images or animations for "John" may be generated by using information related to a node corresponding to "John" in each graph. As described above, when the meaning of a sentence is interpreted according to some embodiments of the present invention, the meaning of a word included in a specific sentence uses not only the corresponding sentence but also uses all the contexts of a plurality of sentences existing before and after the corresponding sentence, and thus, a plurality of sentences including a common word may be replaced with an image or animation having one content.

Hereinafter, a process in which a sentence of a first language transformed into a graph is translated into a sentence of a second language according to another embodiment of the present invention will be described with reference to FIG. 24.

In operation S151, the morpheme of the sentence of the first language corresponding to each node and edge of the graph may be replaced with the representation of the second language to be translated.

When there is a user's correction request feedback for the second sentence of the second language extracted from the graph in operation S152, a third sentence different from the second language may be further extracted in operation S154. The third sentence may have different word order, voice of sentence, translation of word, modification relation of morpheme, and the like according to the type of user feedback.

The translation results for the second sentence extracted in operation S153 or the third sentence extracted in operation S155 may be stored. The information on the extracted sentence and the information on the user's input feedback may be used to be reflected in the subsequent translation process. A detailed description will be given below in the corresponding drawings.

Hereinafter, a process in which a first sentence 400a, which is the representation of the first language, is translated into a second sentence 400b, which is the representation of the second language, will be reviewed in detail with reference to FIGS. 25 and 26.

When "A cat is touched by me," which is the first sentence 400a represented in English, is to be translated into Korean, a graph 401a corresponding to the first sentence may be generated first. Each node and edge of the generated graph may correspond to each word of the first sentence.

Thereafter, words corresponding to nodes and edges of the graph may be translated into Korean. In this case, as described above, information on gender and information on rank may be further stored according to the characteristics of each language.

In order to extract the translated sentence 400b, the graph replaced with Korean may be interpreted in a designated word order. The designated word order may mean that graph interpretation order corresponding to the word order of a sentence according to various criteria such as a word order preferred by a specific user or a word order preferred by most users may be designated using a previous translation record.

For example, since the English sentence "A cat is touched by me" is a passive voice, even when translated into Korean, it can be translated as "고양이는 나에게 만져진다 (A cat by me is touched)" instead of "나는 고양이를 만지다 (I touch a cat)."

Figure 24:
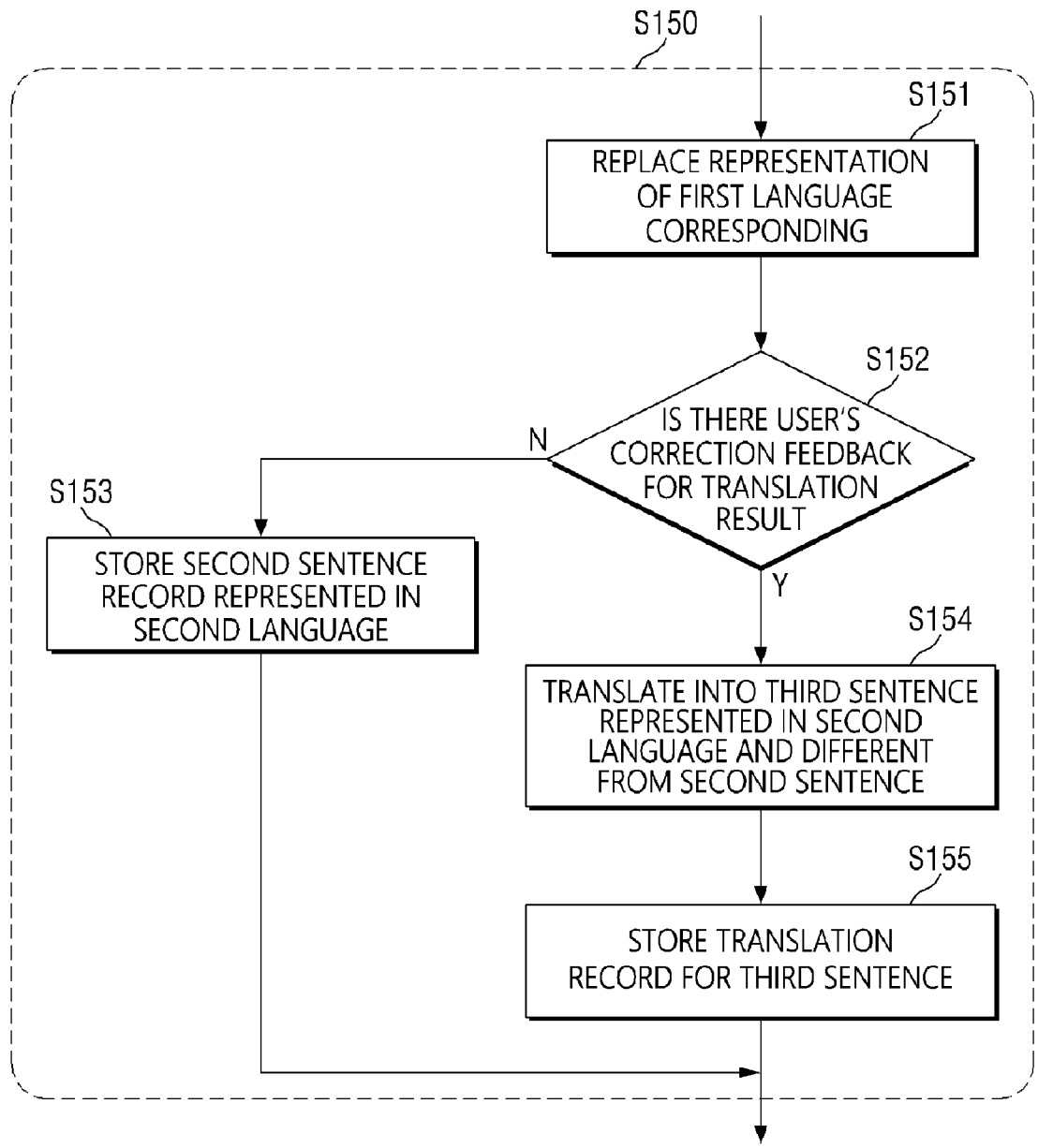
FIG. 24 is a flowchart for describing in detail some operations of FIG. 1.
Figure 25:
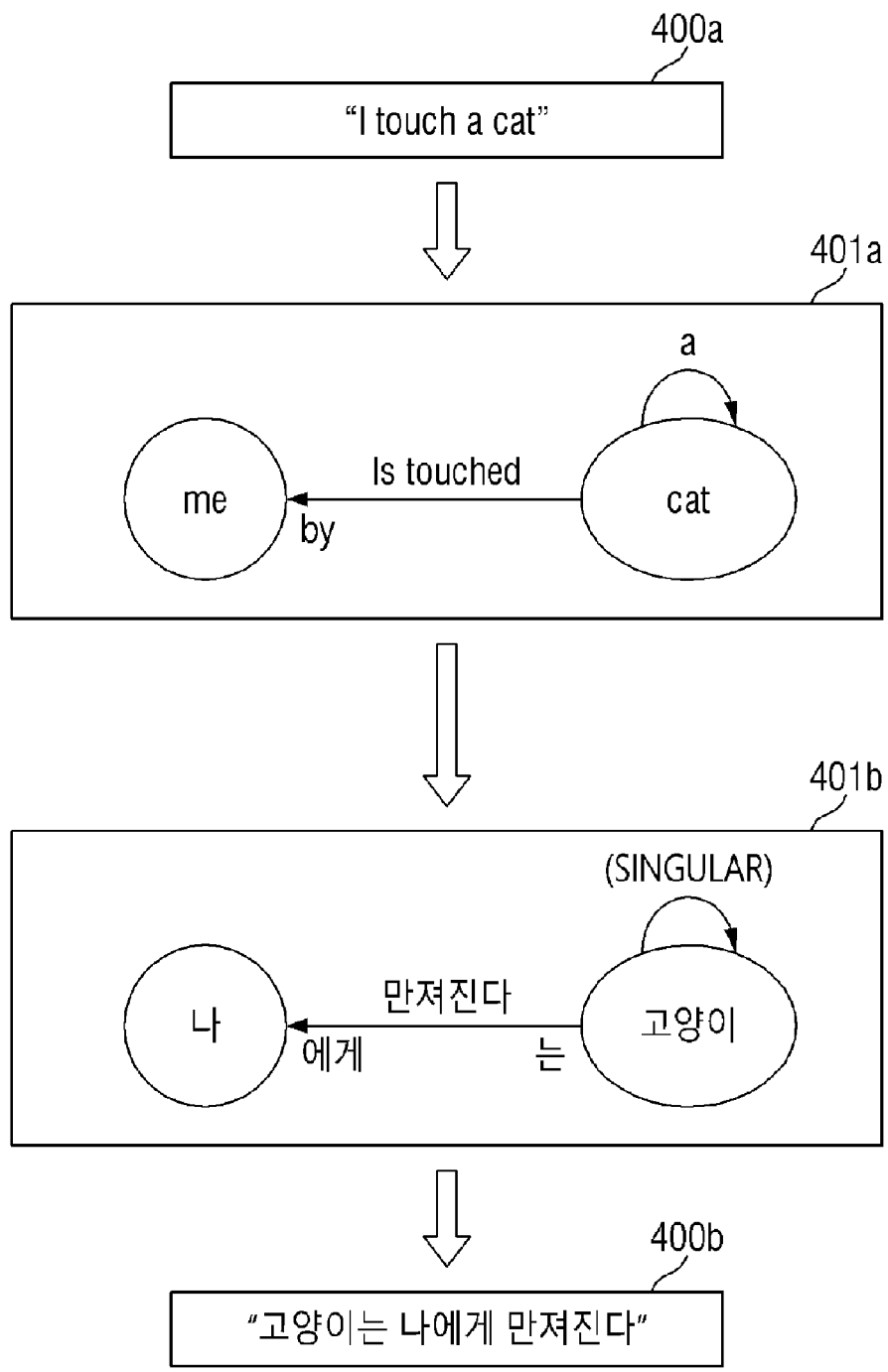
FIG. 25 is a diagram for describing a method of visualizing and translating a visualized passive voice sentence according to an embodiment of the present invention.
Figure 26:
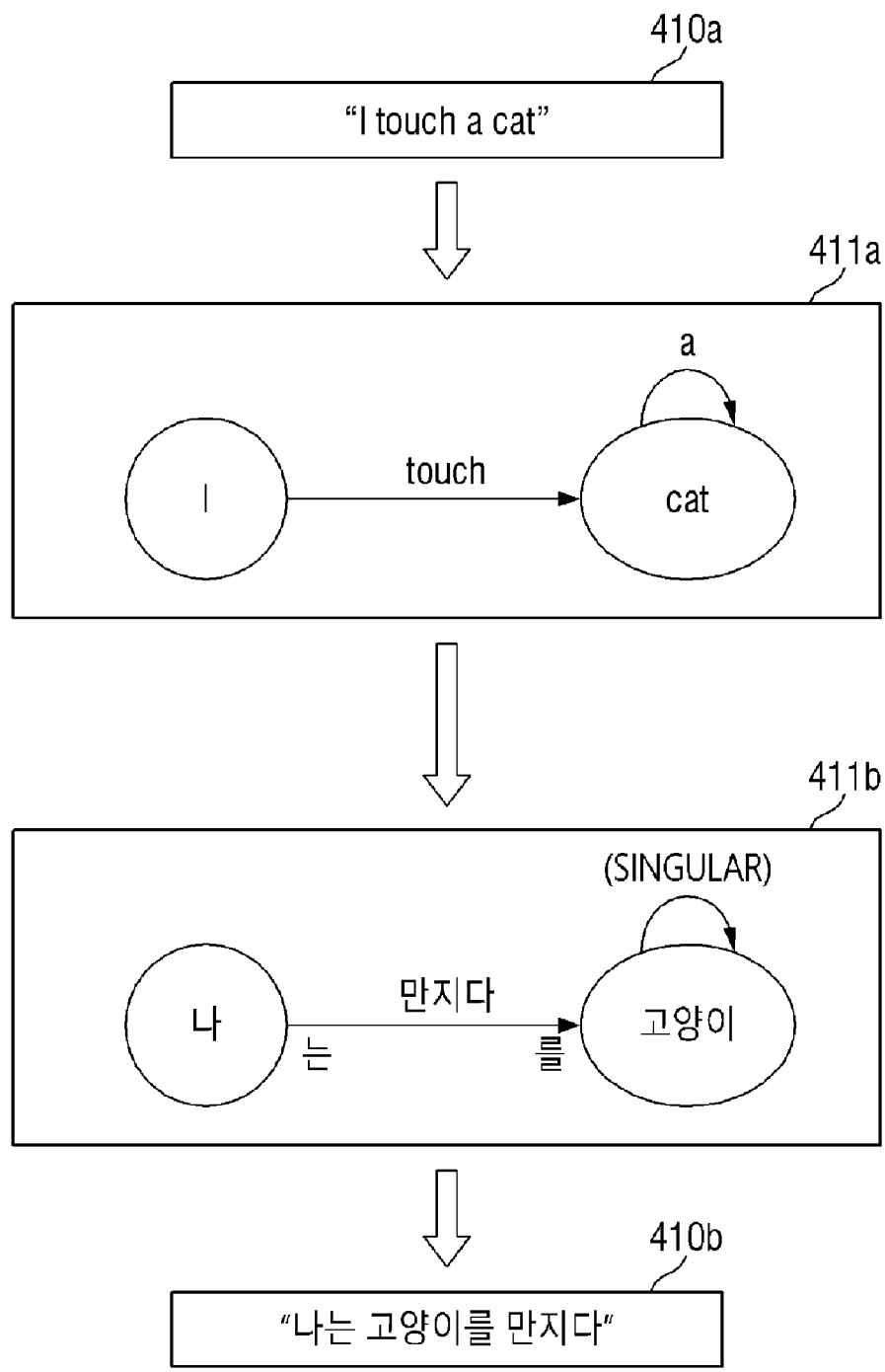
FIG. 26 is a diagram for describing the method of visualizing and translating a visualized passive voice sentence according to the embodiment of the present invention.

On the other hand, in the case of the English sentence "I touch a cat" having an active voice as illustrated in FIG. 25, it may be translated as "나는 고양이를 만진다," unlike in FIG. 24.

Figure 27:
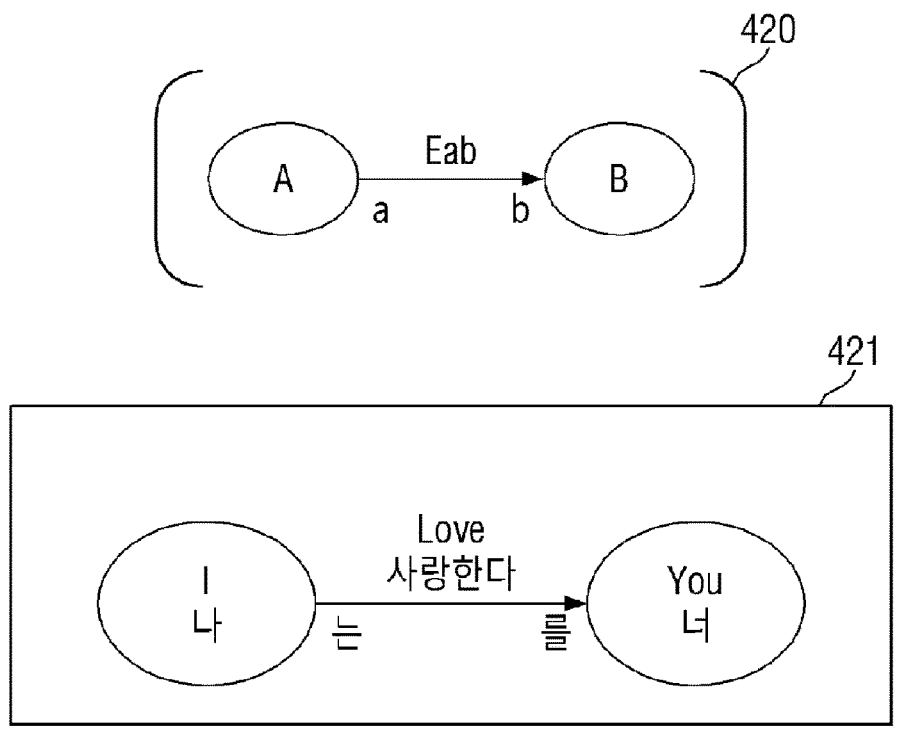
FIG. 27 is a diagram for describing a method of performing translation for each node and each edge using a visualized sentence according to an embodiment of the present invention.

Hereinafter, a method for translating words in sentences corresponding to nodes and edges of the graph will be described in detail with reference to FIG. 27 below.

In the case of a graph 420 including two nodes and one edge concatenating the nodes, the representation of the first language corresponding to each node and edge is replaced with the second language. For example, when the Korean sentence "나는 너를 사랑한다" is translated into an English sentence, each morpheme segmented like "나/는/사랑한다(-active)/너/를" may be translated as "I/-/Love/(-active)/You/-/."

Through this, unlike the case where the entire sentence is translated, the translation is performed on each morpheme, and information on the relationship between each morpheme is separately stored, so more systematic translation performance and translation record management are possible.

Figure 28:
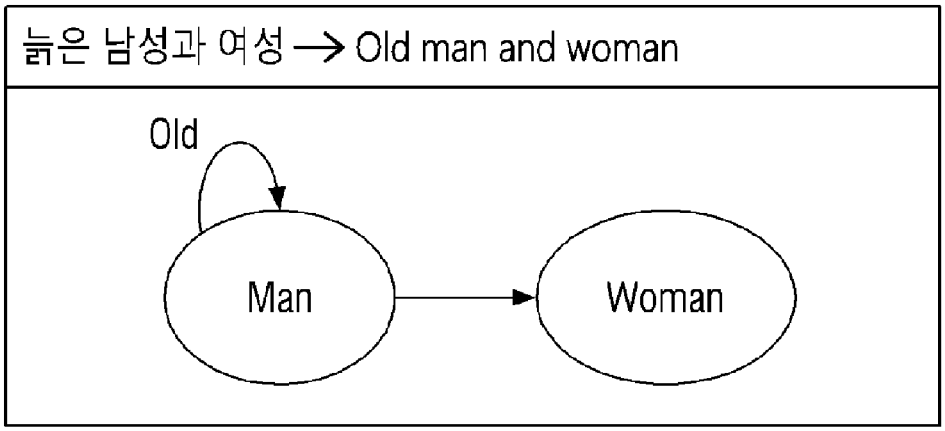
FIG. 28 is a diagram for describing a method of visualizing and translating a sentence including a word or compound word having an ambiguous meaning according to an embodiment of the present invention.
Figure 28:
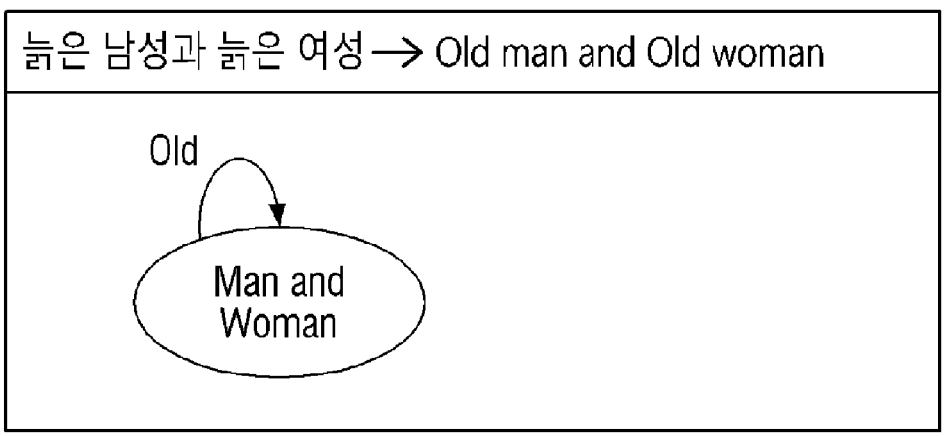
Figure 28:
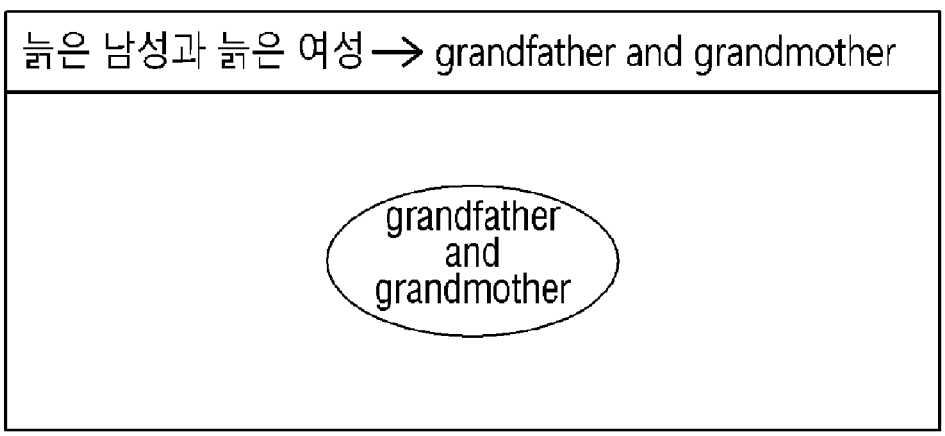

Hereinafter, a method of translating a sentence including a phrase having an ambiguous meaning and a compound word will be described with reference to FIG. 28.

A phrase with an ambiguous meaning occurs when the modification relationship between each word is unclear or when the word to define the relationship is unclear. According to the present embodiment, since the modification relationship between each word is represented in a graph, the meaning of the sentence is not interpreted ambiguously.

For example, when there is the sentence "old man and woman," it may be ambiguous whether the word "old" modifies "male" or "male and female." Therefore, in the case of matching of the sentence and the graph, when "old" modifies "male," a self-loop edge corresponding to "old" is generated to point to a node corresponding to "male," and when "old" modifies both "male and female," a self-loop edge corresponding to "old" is generated to point to a node corresponding to "male and female."

Also, compound words can be generated and removed by merging and separating edges of graphs corresponding to sentences with and from nodes. For example, when it is natural for "old man" to be interpreted as "grandfather" instead of "old man," a self-loop edge corresponding to "old" and a node corresponding to "man" may be merged and replaced with a node of "grandfather." Likewise, it goes without saying that "grandfather" may be segmented into the edge and node corresponding to "old" and "man." Such compound words may use information stored in an existing dictionary database (DB).

Hereinafter, a method of performing translation using a graphical user interface (GUI) including a user interface (UI) for changing a translation result according to another embodiment of the present invention will be described with reference to FIGS. 29 to 41.

Figure 29:
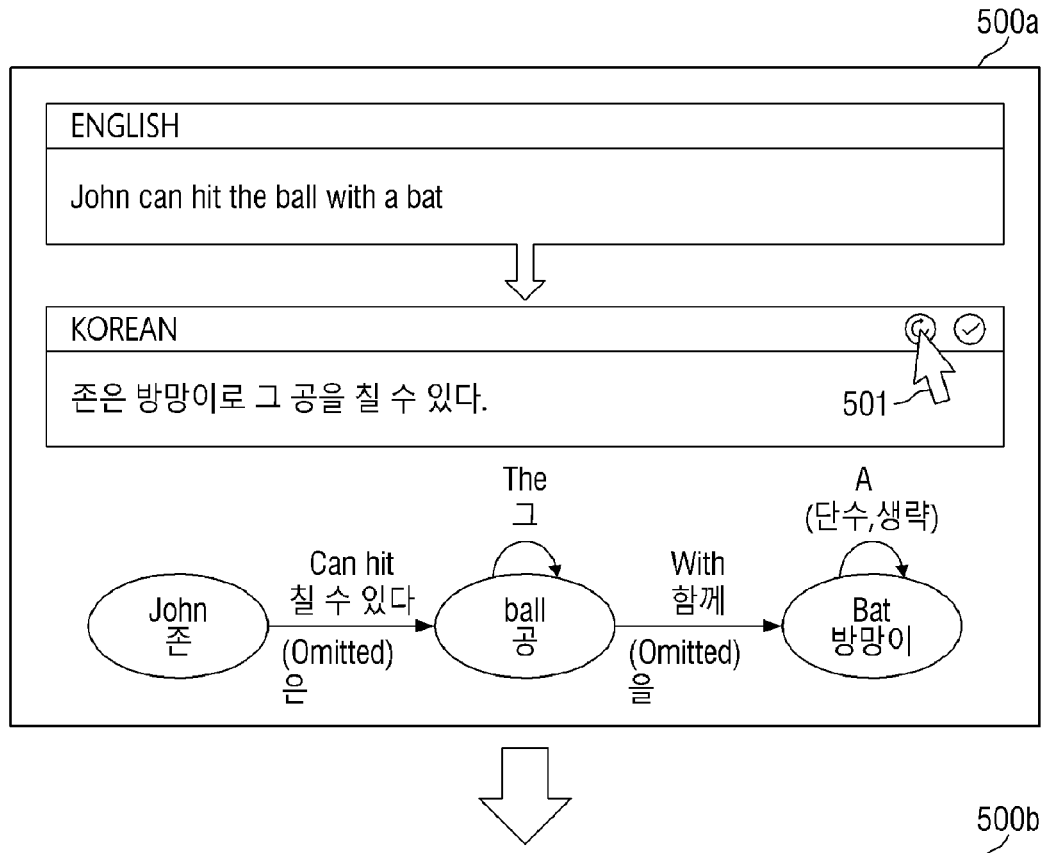
FIGS. 29 and 30 are diagrams for describing a method of visualizing and translating a sentence using a graphical user interface (GUI) including a user interface (UI) capable of changing a translation result according to an embodiment of the present invention.

Referring to FIG. 29, when a user wants to extract sentences having different word orders from the same graph, a new translation result may be acquired through a previously designated user input 501.

For example, when the sentence "John can hit the ball with a bat." is translated into Korean and the sentence "John can hit the ball with a bat" is output (500a), a user may select a previously designated UI 501 to obtain a sentence having a different word order. Through this, the user may obtain the sentence "John can hit the ball with the bat" (500b), and information on the translation record and the users feedback are all recorded. Also, when there is a translation request from the same user for a similar sentence thereafter, the sentence in the word order selected by the user may be preferentially displayed.

In addition, when it is desired to translate the first sentence of the first language into the second sentence of the second language, the graph may display a morpheme corresponding to the first language, a morpheme corresponding to the second language may be displayed, and both the first language and the second language may be displayed. In this way, by displaying the users familiar and unfamiliar languages in correspondence with the graph, the user may confirm whether the translation for each morpheme is correct for the corresponding sentence. In addition, by correcting the components of the graph corresponding to each morpheme, the wrong part of the translation can be easily confirmed and corrected.

Figure 30:
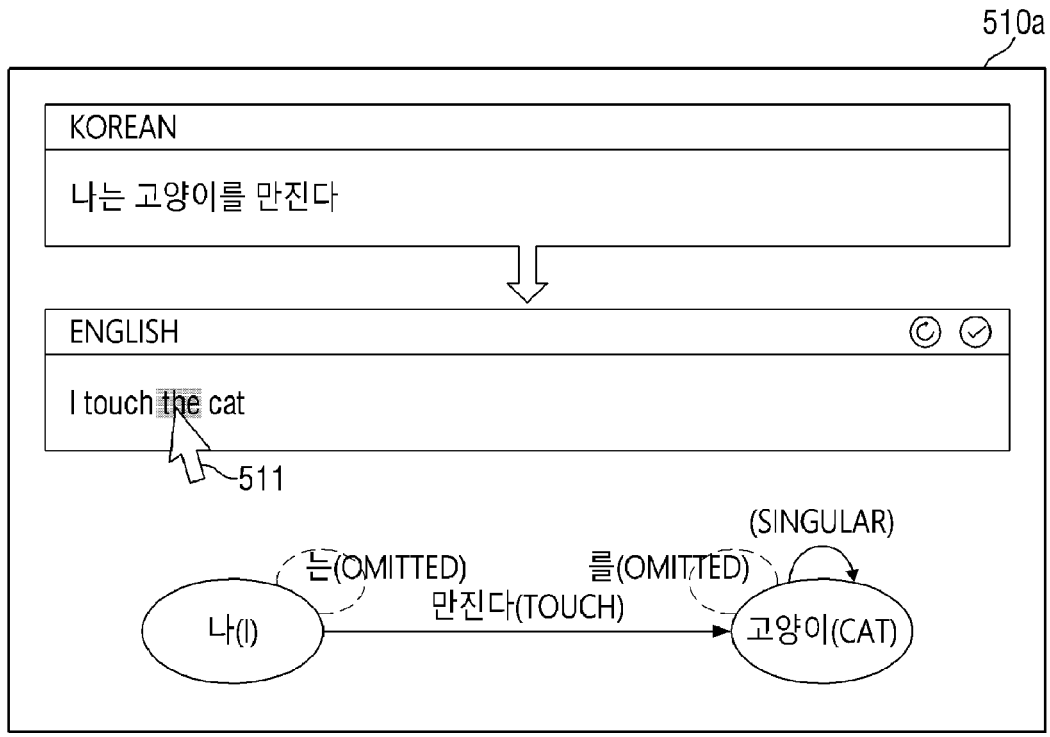

Referring to FIG. 30, when a user wants to correct the interpretation of a specific word in a translated sentence, by making a previously designated input for the specific word, the translation for the corresponding word may be corrected.

For example, when the Korean sentence "나는 고양이를 만진다" is translated into English, the sentence "I touch the cat" may be output (510a). When the user wants to correct or delete the word "the," the interpretation result of the word is changed by making the previously designated input 511 to "the." When the sentence "I touch a cat" different from the sentence is output 510b and the user selects the output sentence as a final translation result 512, in the case where it is ambiguous to represent a singular for a specific word in the English sentence in the next translation, the priority of "a" becomes higher than that of "the."

Figure 31:
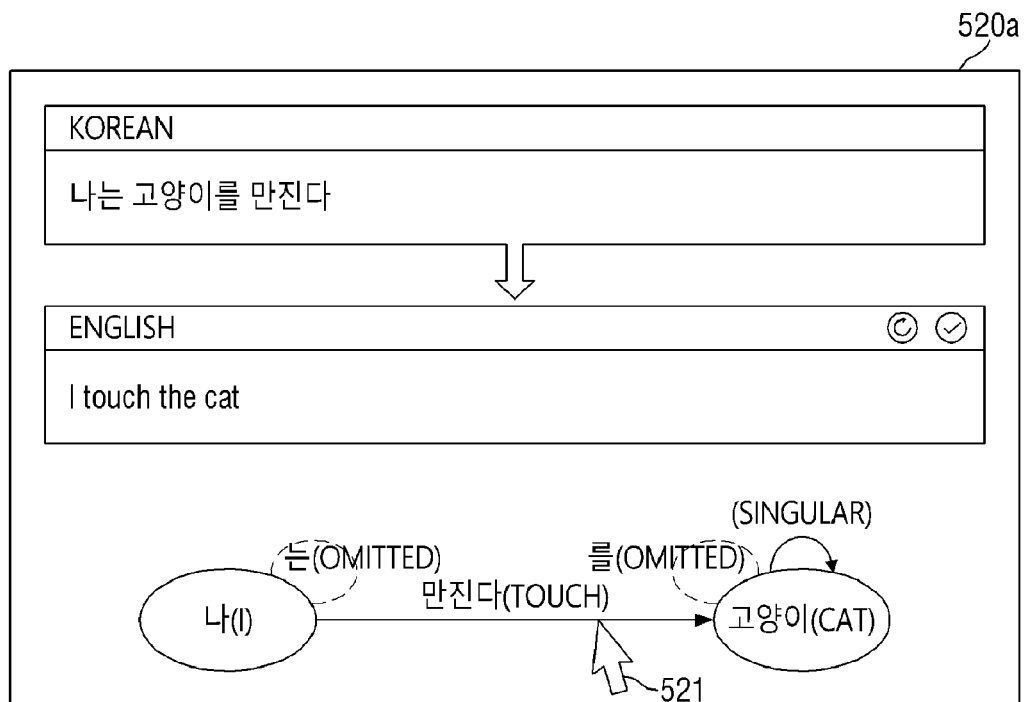
FIG. 31 is a diagram for describing a method of visualizing and translating a sentence using a GUI including a UI for changing a direction of an edge according to an embodiment of the present invention.
Figure 31:
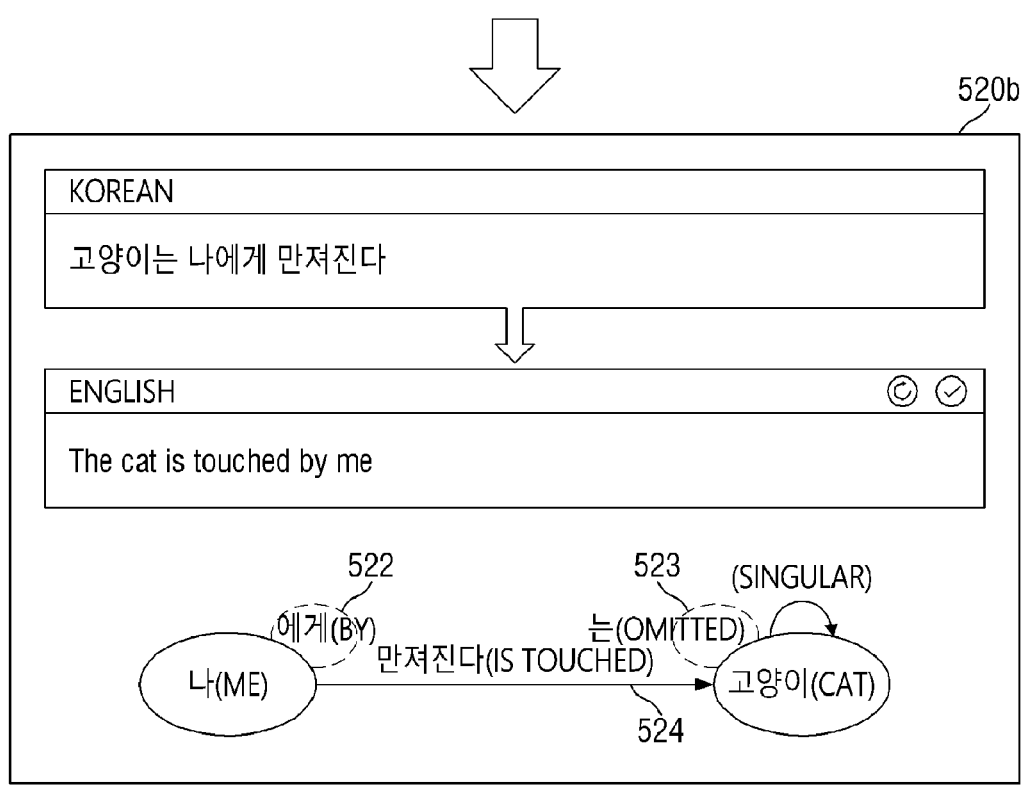

Referring to FIG. 31, in response to a user input for selecting a component 521 of the graph, the corresponding component and the translation result corresponding to the corresponding component may be corrected. For example, when there is the user input to select the edge of the graph, the direction of the corresponding edge may be corrected.

When the direction of the edge is corrected, the modification relation in which other morphemes modifies the noun morpheme or the relationship between the noun morphemes may be corrected. When the direction of the edge is changed, the voice of the sentence may be changed while the direction of the edge corresponding to the other morphemes that define the relationship between the noun morphemes is changed, and the modification relation may be changed. In addition, it is possible to change the structure of a sentence by modifying the source or destination of an edge.

For example, when the sentence "I touch a cat" is interpreted in English (520a), the direction of the edge may be changed by making the designated input 521 to the edge corresponding to the morpheme of "touch" 524 to obtain the passive voice sentence. As the direction of the edge is changed, the English sentence acquired as the translation result is also reacquired from "I touch the cat" to "The cat is touched by me." (520b), and the Korean sentence may be changed to correspond thereto. The Korean sentence is changed, and thus, the user may confirm whether his/her desired translation result is correct. In addition, the representations of other morphemes 522 and 523 that need to be modified by changing the voice of the sentence may be automatically modified.

In addition, according to another embodiment, other morphemes 522 and 523 corresponding to the self-loop edge may be displayed without directivity. In the case of the self-loop edge, since the source and destination are the same, even when the directivity is not displayed on the edge, no different results are derived in translation. Therefore, in order to increase the user's readability of the graph, a dotted line or a specific figure may correspond to other morpheme corresponding to the self-loop edge.

Figure 32:
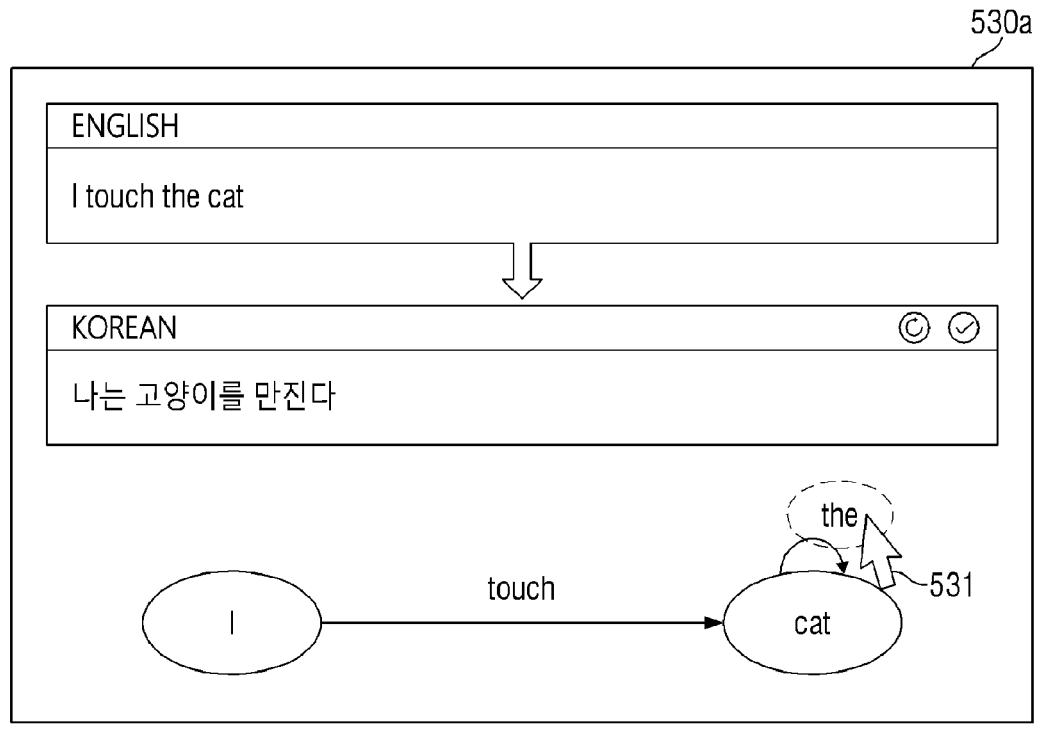
FIG. 32 is a diagram for describing a method of visualizing and translating a sentence using a GUI including a UI for automatically correcting a specific morpheme according to an embodiment of the present invention.
Figure 32:
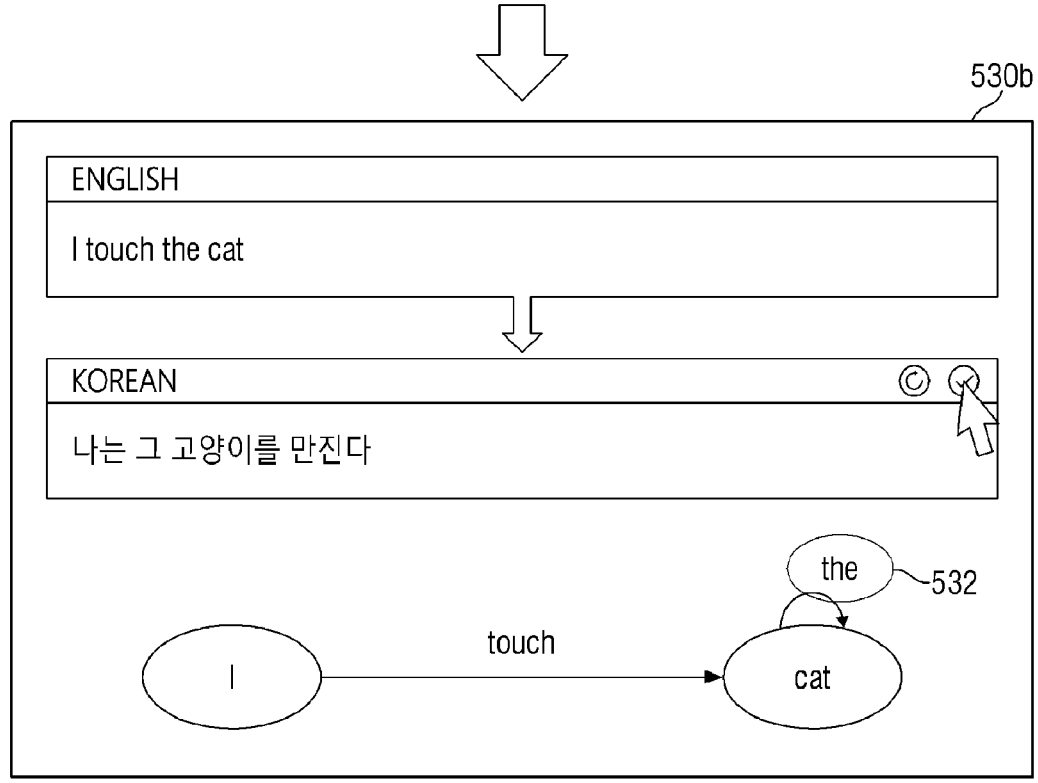

Referring to FIG. 32, the omitted morphemes may be explicitly displayed in response to a user input 531 to the omitted morphemes.

For example, when the user wants to translate the English sentence "I touch the cat" into Korean, when a sentence interpreted as "나는 고양이를 만진다" is acquired (530a), the Korean word corresponding to "the" 531 can be omitted, and thus, automatically omitted. In this case, according to some embodiments of the present invention, even the omitted morphemes are displayed on the graph (532), and thus the user may perform the designated user input to explicitly display the omitted morphemes in the sentence after translation. As a result, the Korean word "the" corresponding to "the" is explicitly displayed in the translation result to obtain the sentence "I the cat touch" (530b).

Figure 33:
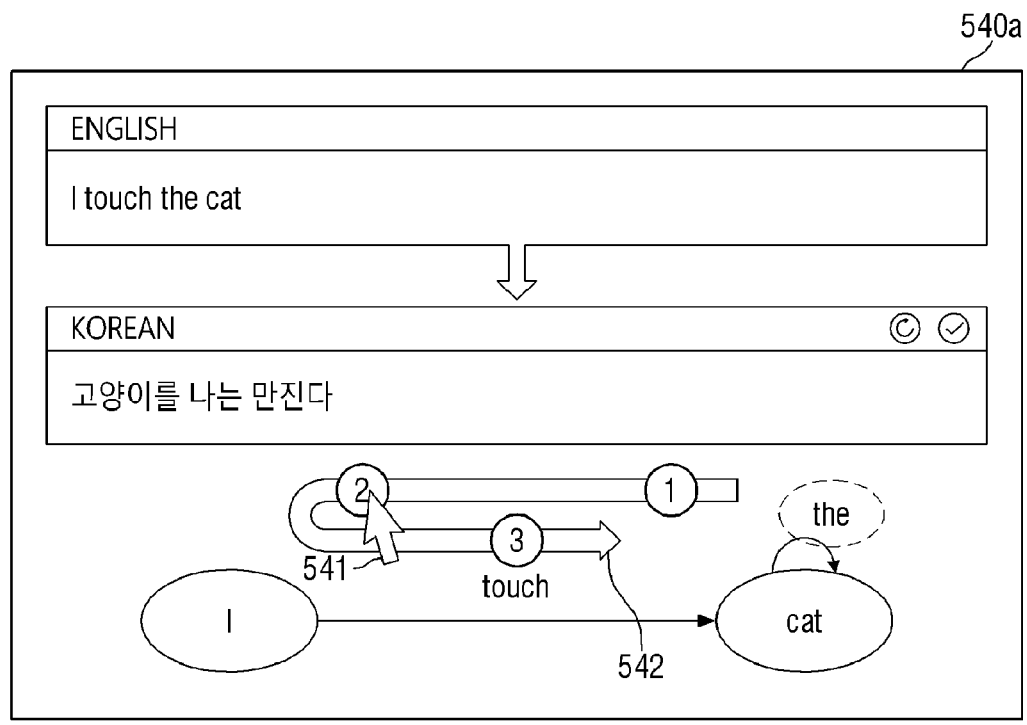
FIG. 33 is a diagram for describing a method of visualizing and translating a sentence using a GUI including a UI for correcting a word order according to an embodiment of the present invention.
Figure 33:
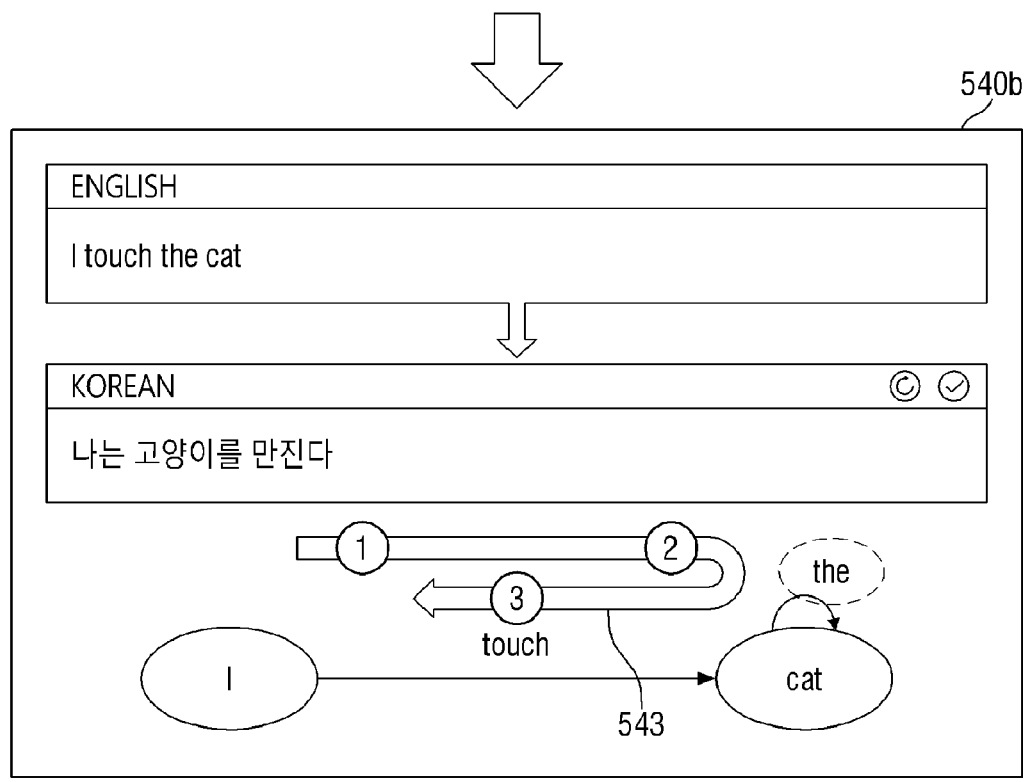

Referring to FIG. 33, in response to a user input 541 for changing a word order 542 of the sentence according to another embodiment of the present invention, the word order of the translated sentence may be changed (543).

For example, when the Korean translation result of "고양이를 나는 만진다" is output for the English sentence "I touch the cat," the node may be selected in the order in which the user wants to interpret to obtain a sentence of a word order such as "고양이를 나는 만진다". However, it should be noted that the user input for the method of changing the word order is not limited thereto.

Figure 34:
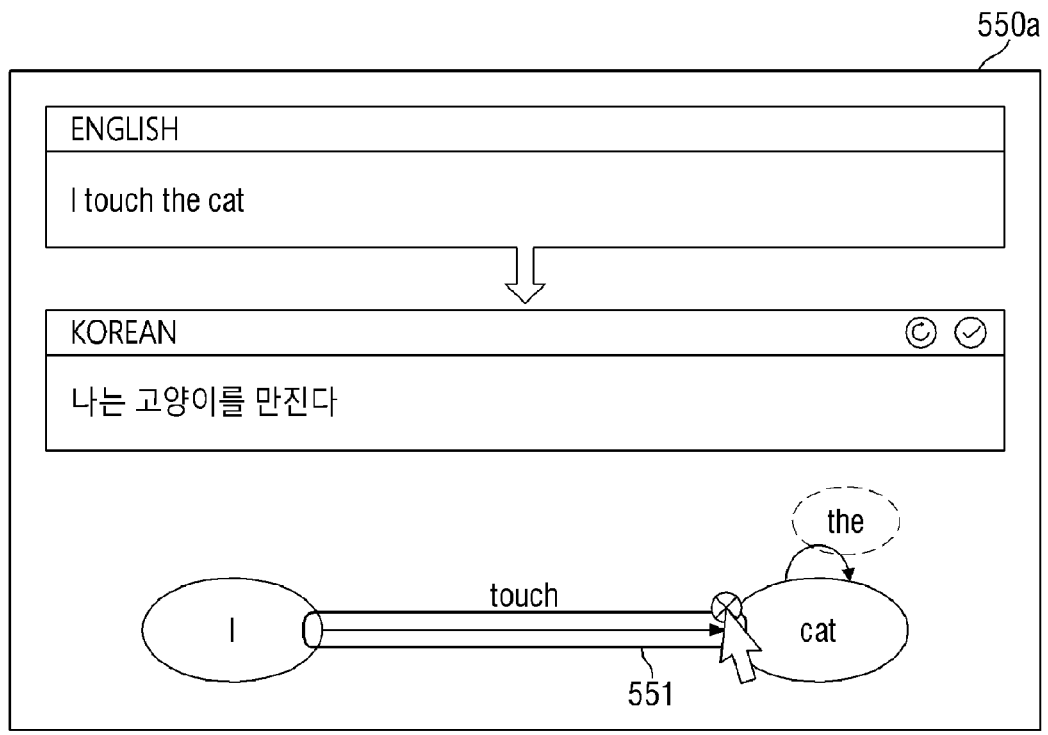
FIG. 34 is a diagram for describing a method of visualizing and translating a sentence using a GUI including a UI for deleting an edge of a sentence visualized in a graph according to an embodiment of the present invention.
Figure 34:
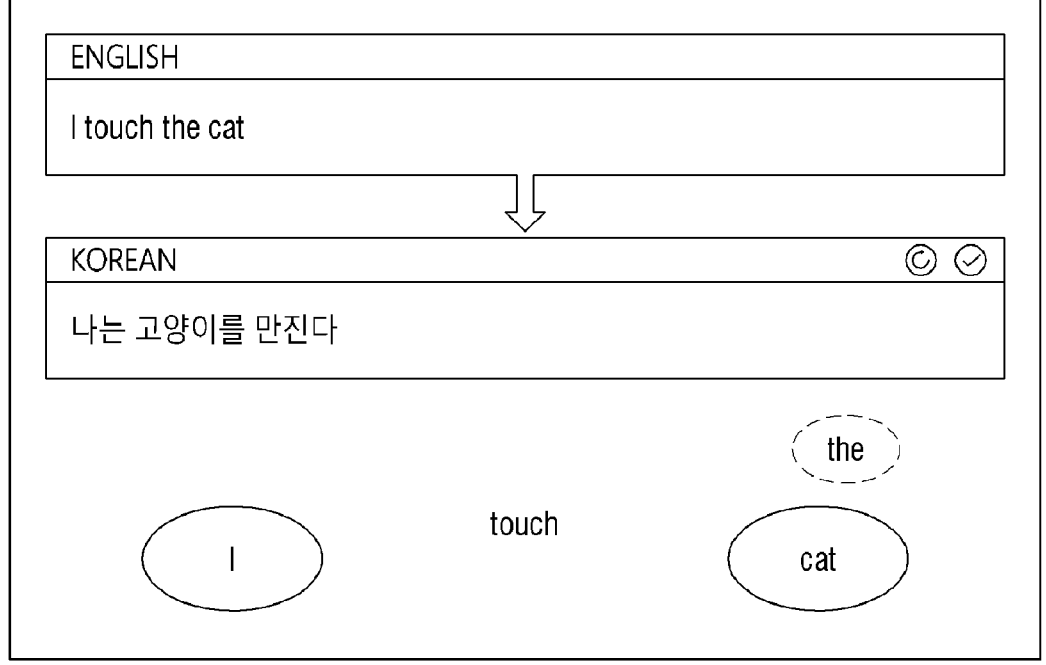

Also, referring to FIG. 34, when the user does not want to display the edge in the graph, the edge may not be displayed according to a designated user input 551 that may delete the corresponding edge. The deleted edge may be an edge selected by a user or may be all edges present in the graph.

The user may modify the translation result of the sentence in more detail by deleting some or all of the edges.

Figure 35:
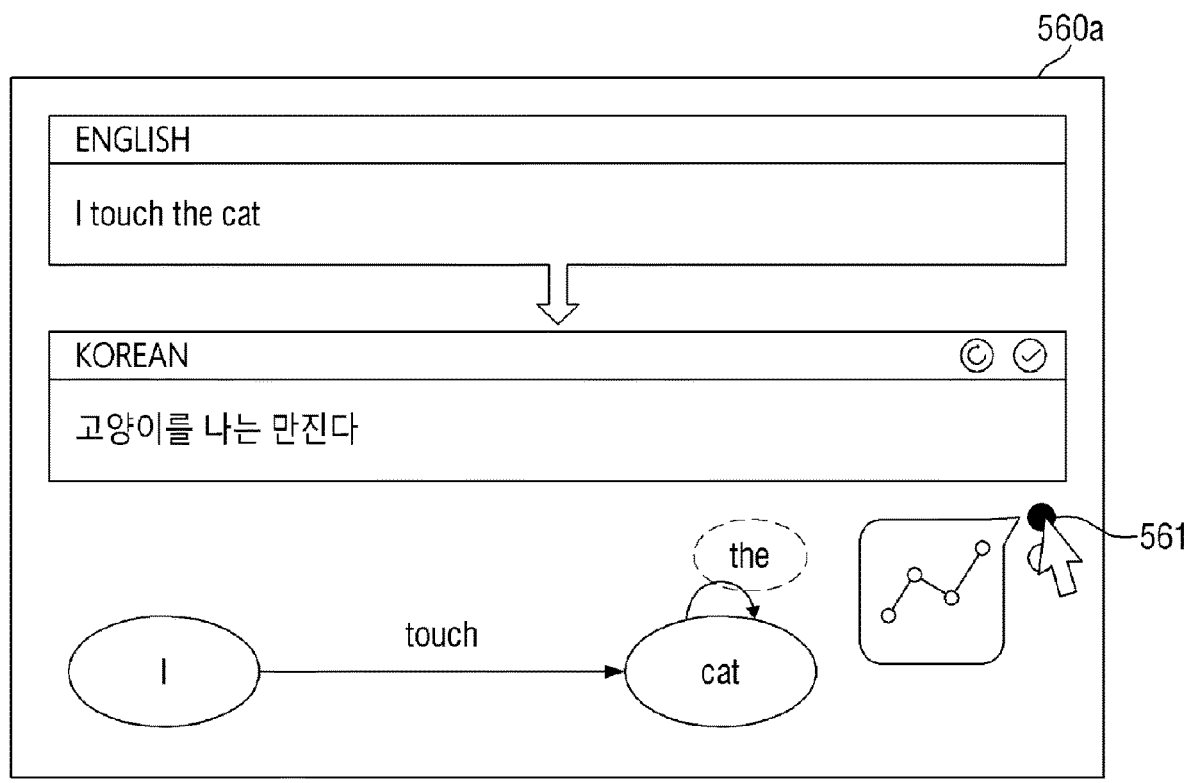
FIGS. 35 and 36 are diagrams for describing a method of visualizing and translating a sentence using a GUI including a UI for changing a shape of a graph in which the sentence is visualized according to an embodiment of the present invention.
Figure 36:
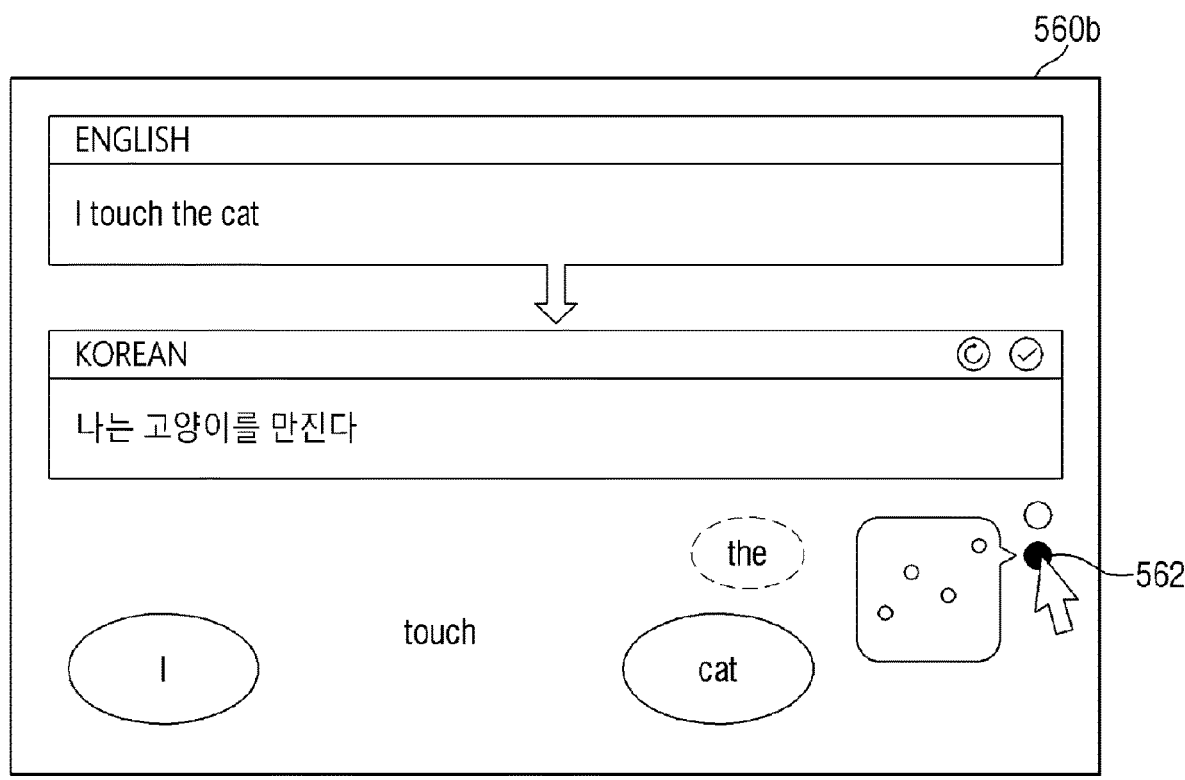

Also, referring to FIGS. 35 and 36, a graph display method may be changed according to a user's selection.

In FIG. 35, when the user wants to display the edge 561 of the graph or when the correction of the edge of the graph is frequent when considering the user's past translation correction record, the graph may be displayed in the form of displaying all edges and nodes (560a).

On the other hand, in FIG. 36, when the user does not want to display the edge 562 of the graph or when there is no correction of the edge of the graph when considering the user's past translation correction record, the graph may be the form of not displaying the edge (560b).

However, without being limited thereto, some or all of the graphs may also be displayed depending on the user's translation record and user's settings, such as the form of the graph without the display of the morpheme corresponding to the self-loop edge, or the form in which only phrases with ambiguous meaning are displayed in a graph.

Hereinafter, a method of performing translation using a GUI including a UI for changing an interpretation method of a word having an ambiguous meaning will be described with reference to FIGS. 37 to 39.

In the case of a word or phrase having an ambiguous meaning, the user's correction feedback may be input so that the translation is performed in the user's intended direction.

Figure 37:
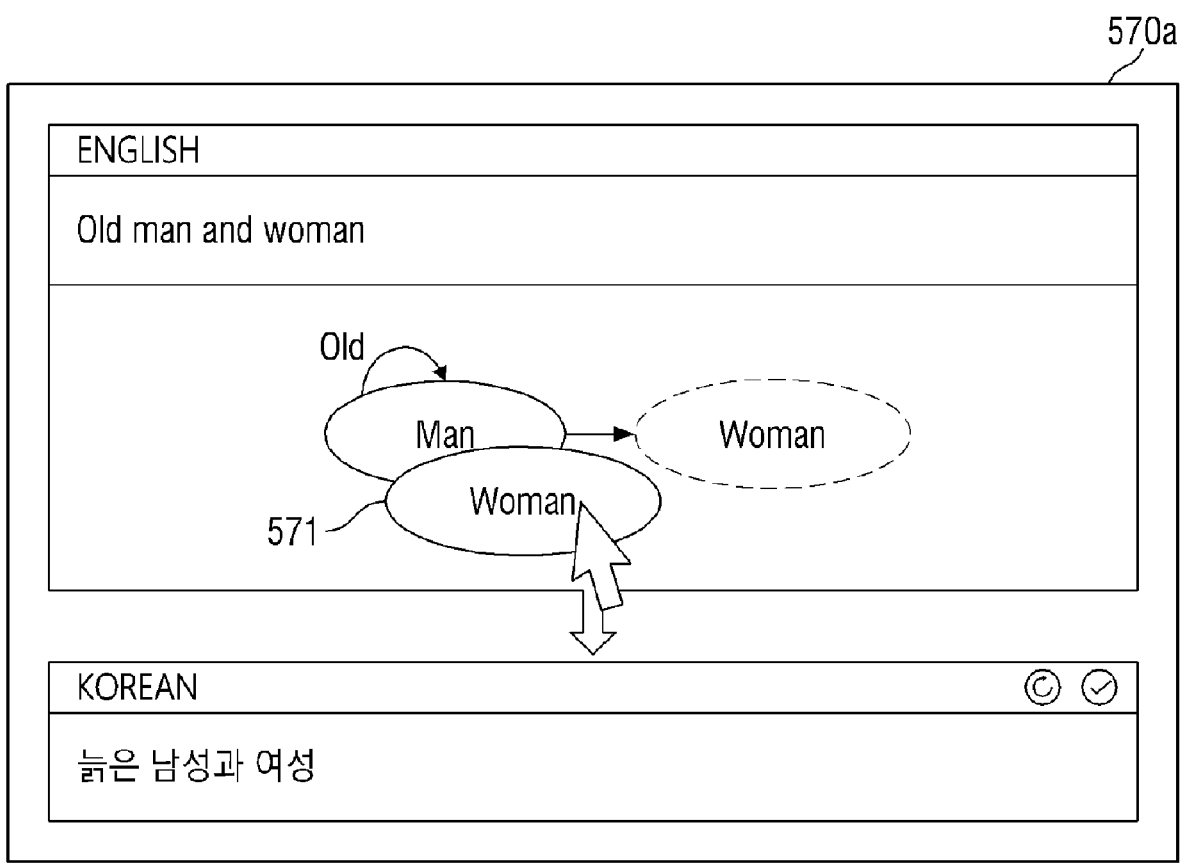
FIGS. 37 to 39 are diagrams for describing a method of visualizing and translating a sentence using a GUI including a UI for changing an interpretation method of a word having an ambiguous meaning according to an embodiment of the present invention.

For example, when the translation of the sentence "old man and woman" is performed when referring to FIG. 37, a self-loop edge corresponding to "old" may point to a node corresponding to "man" (570a). In this case, the sentence translated in Korean is interpreted as "an old man and an (not old, normal) woman." When the user wants to obtain a translation result as "old man and old woman" for the interpretation result, the user may modify the graph to obtain the desired translation result.

Even when the user does not know Korean, "old" in the graph does not indicate "woman," so the user may know that the translated Korean sentence is incorrect.

Figure 38:
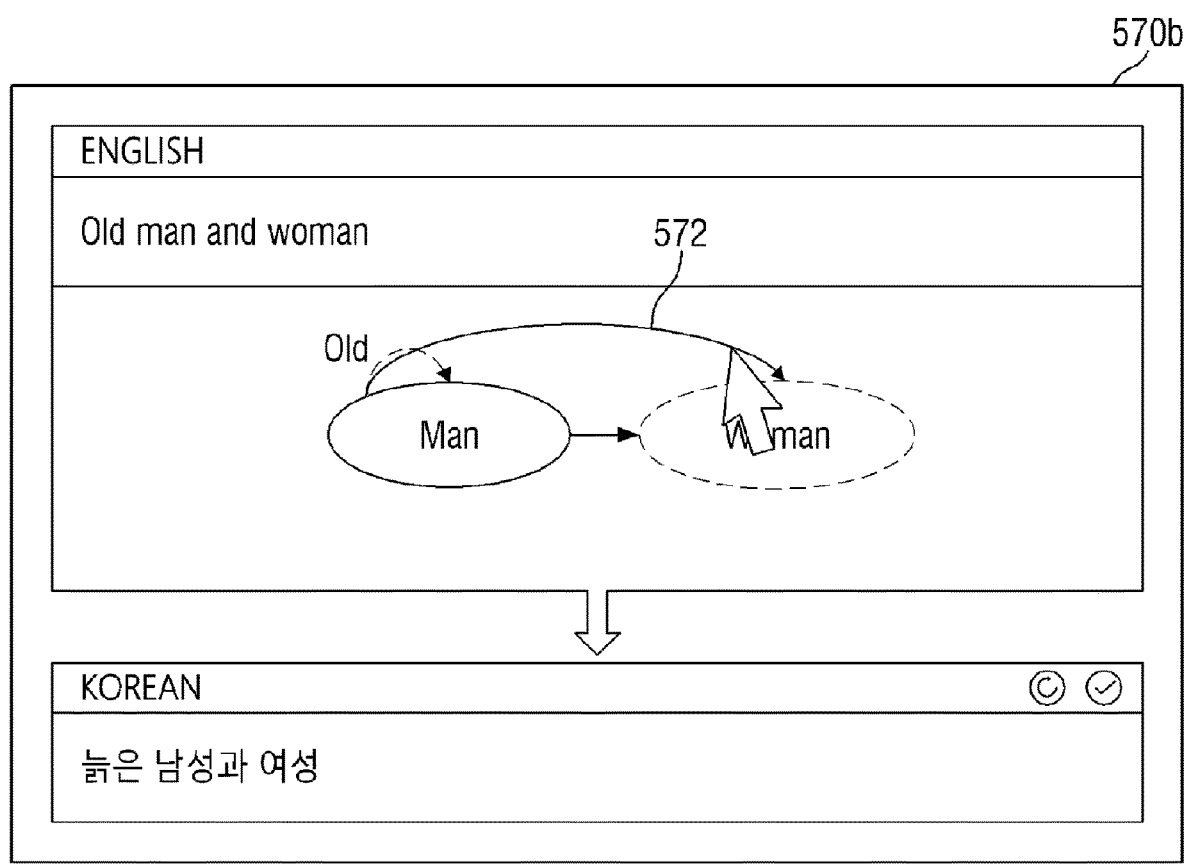

Therefore, as illustrated in FIG. 38, a drag and drop input 571 may be applied to a node corresponding to "woman" to be concatenated to an edge corresponding to "Old." However, the drag and drop is only an example of the user input, and the user input method is not limited thereto, and may be various methods.

Also, as illustrated in FIG. 38, the translation result may be corrected through the input 572 for the edge corresponding to "Old" (570b).

Figure 39:
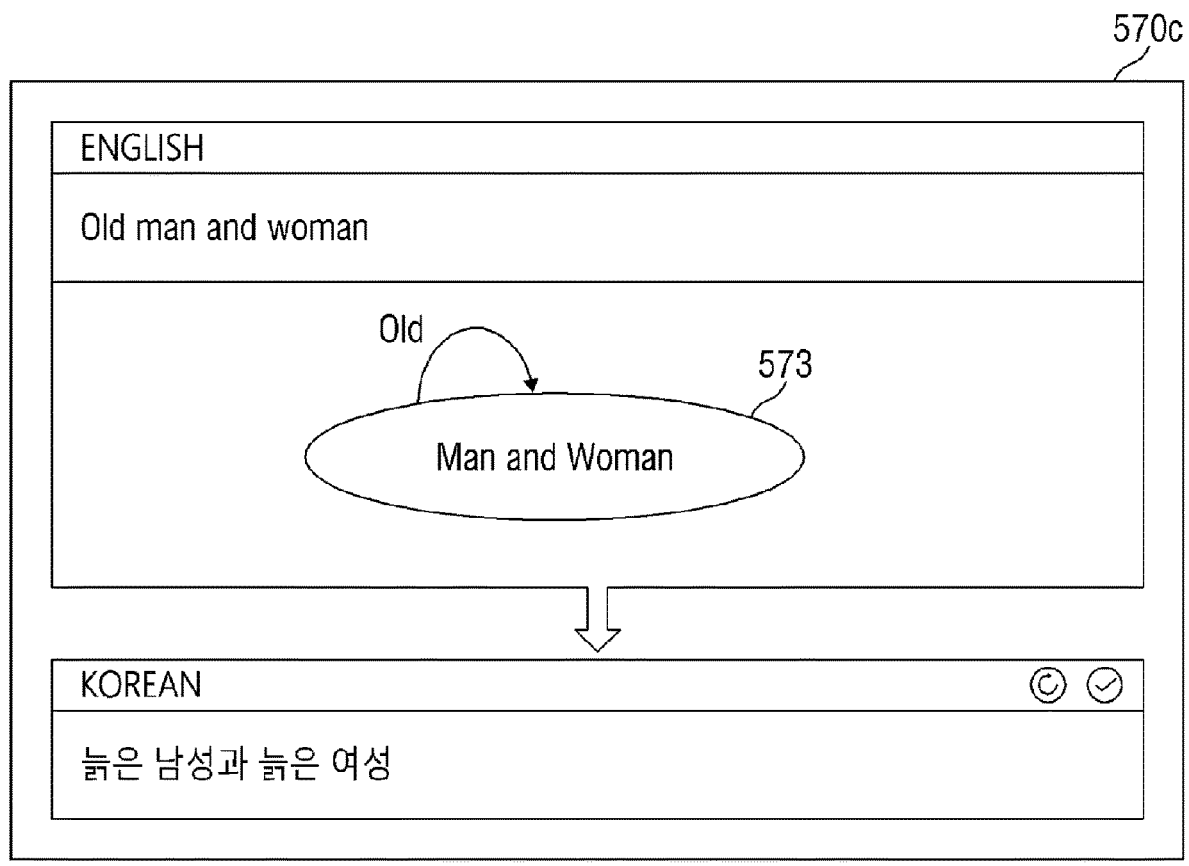

Through this, when the graph as illustrated in FIG. 39 is generated (570c), since the edge corresponding to "Old" points to a node 573 corresponding to "Man and Woman," the Korean sentence as the translation result may be corrected into "Old man and old woman."

Also, according to another embodiment of the present invention, the edges of the graph may be merged or segmented. For example, when there are a plurality of edges starting from a designated node and arriving at another designated node, the plurality of edges may be merged into one edge. When edges corresponding to a plurality of morphemes are merged into one, the merged edge may be again segmented into a plurality of edges in response to the user input to segment the edge. In addition, it is natural that the sources and destinations of each edge may be changed in response to the user input for each of the plurality of edges.

Figure 40:
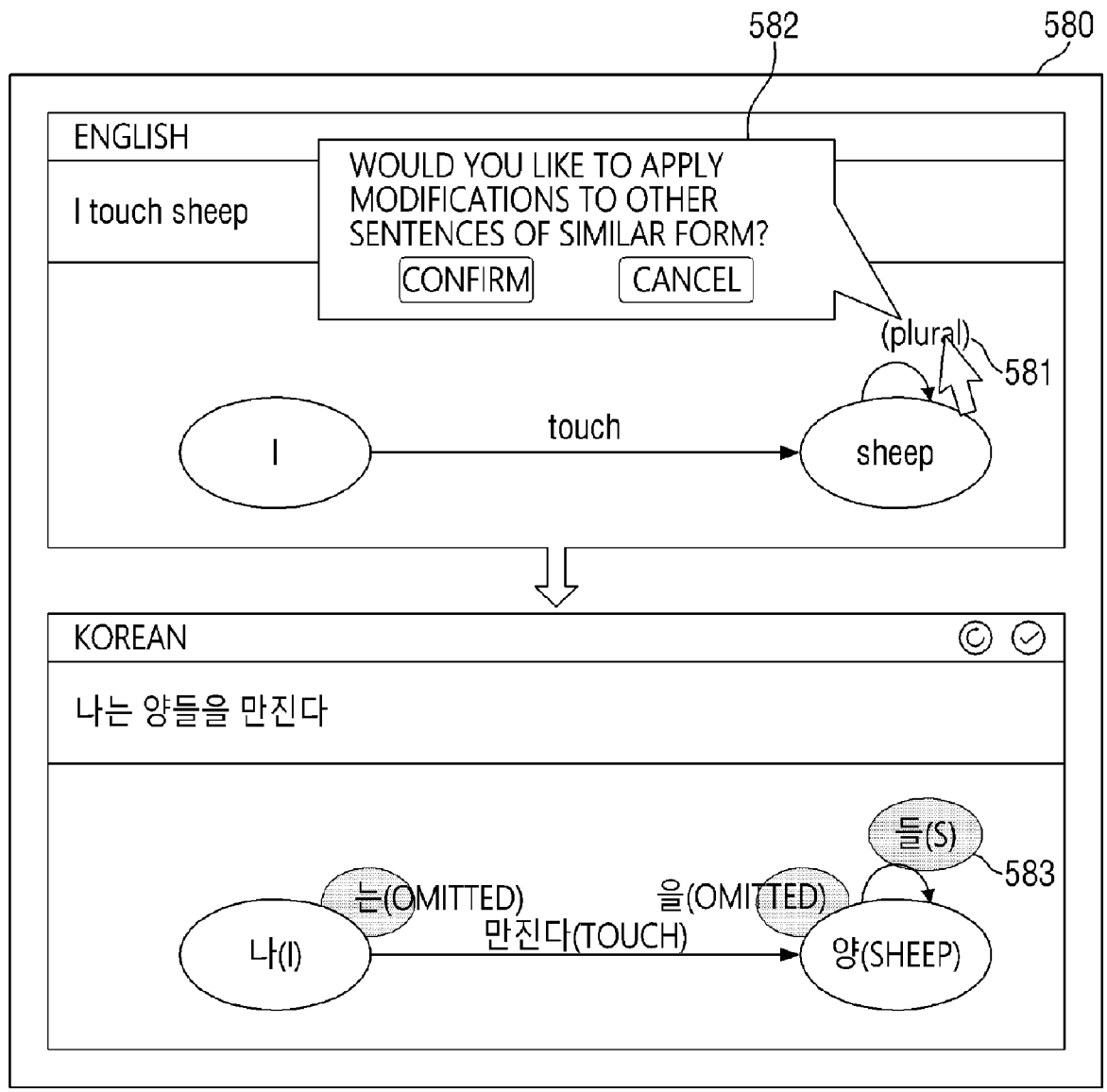
FIG. 40 is a diagram for describing a method of visualizing and translating a sentence using a GUI including a UI for correcting an interpretation of an omitted morpheme according to an embodiment of the present invention.
Figure 41:
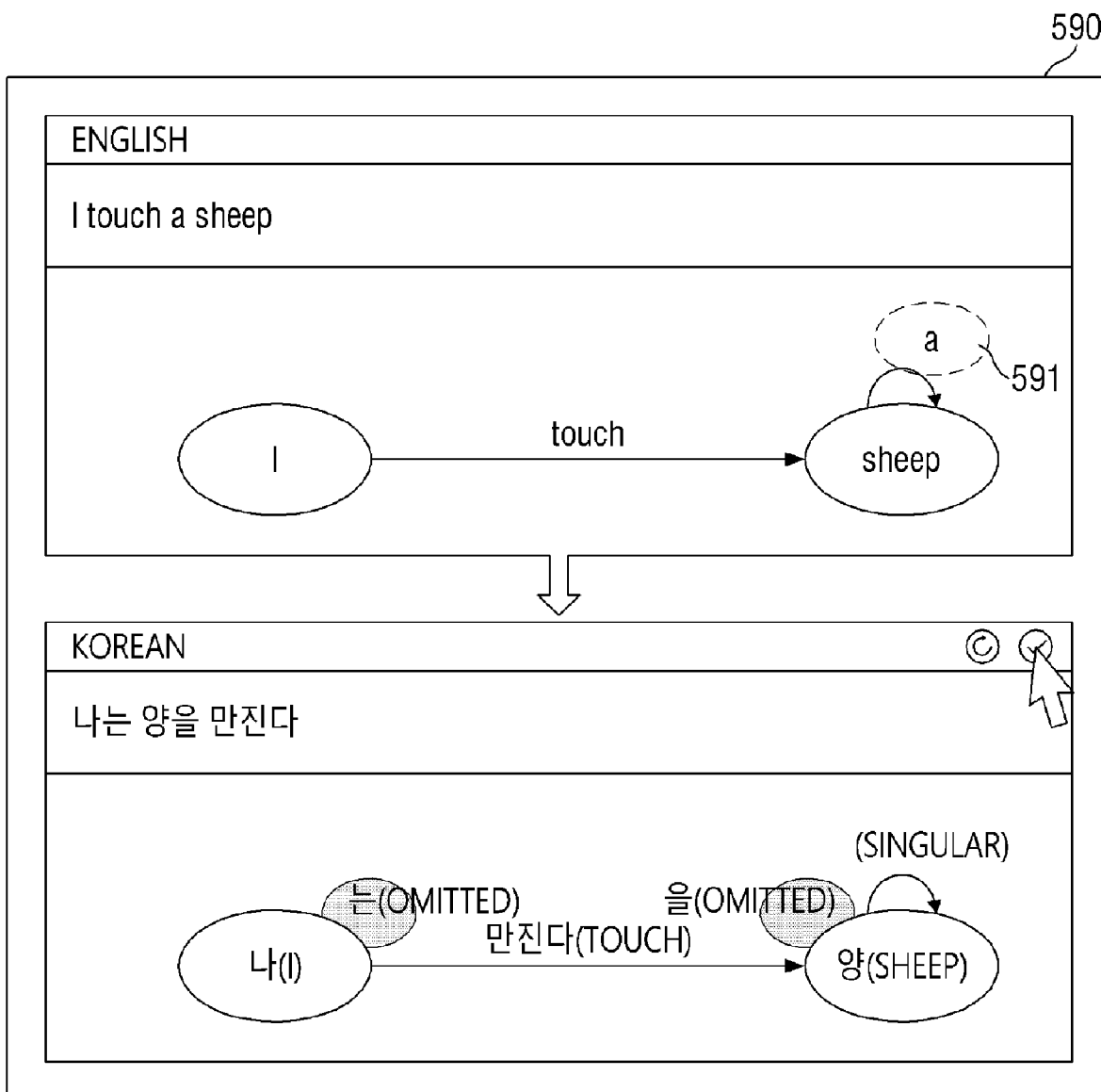
FIG. 41 is a diagram for describing a method of visualizing and interpreting a second sentence including a sentence component not specified in a first language according to an embodiment of the present invention.

In addition, with reference to FIG. 40, according to another embodiment of the present invention, the user may easily correct the misinterpretation of the word with the ambiguous meaning.

For example, in the case of the English word "sheep," since the singular form and the plural form are the same, the translation result different from the user's intention may be generated (580) during the translation process. According to some embodiments of the present invention, since the information on whether the noun morpheme is singular or plural may be further displayed on the graph, the translation result may be corrected according to a user's previously designated input 581.

Figure 46:
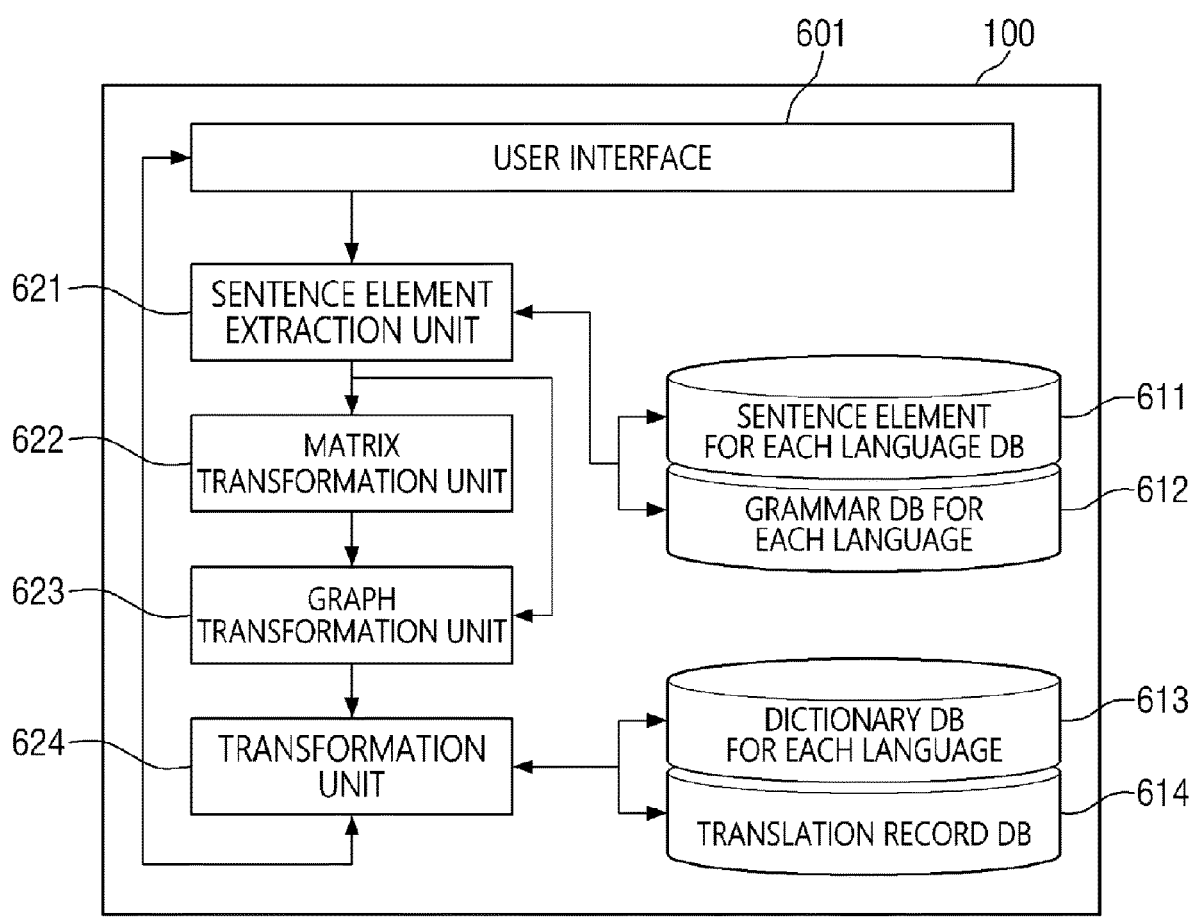
FIG. 46 is a hardware configuration diagram illustrating an embodiment of an apparatus for performing a translation method according to embodiments of the present invention.

When the English sentence "I touch sheep" is translated into a Korean sentence, it can be translated as "I touch the sheep." In contrast, when the user's intended sheep was singular, the user may obtain the corrected translation result as illustrated in FIG. 46 through an input 581 for "(plural)" meaning a plurality of sheep or an input 583 for Korean "들" corresponding thereto. Accordingly, in FIG. 41, "(plural)" is corrected to "a," and thus, "sheep" is a singular form, and a Korean translation sentence such as "나는 양을 만진다" may be acquired.

Figure 42:
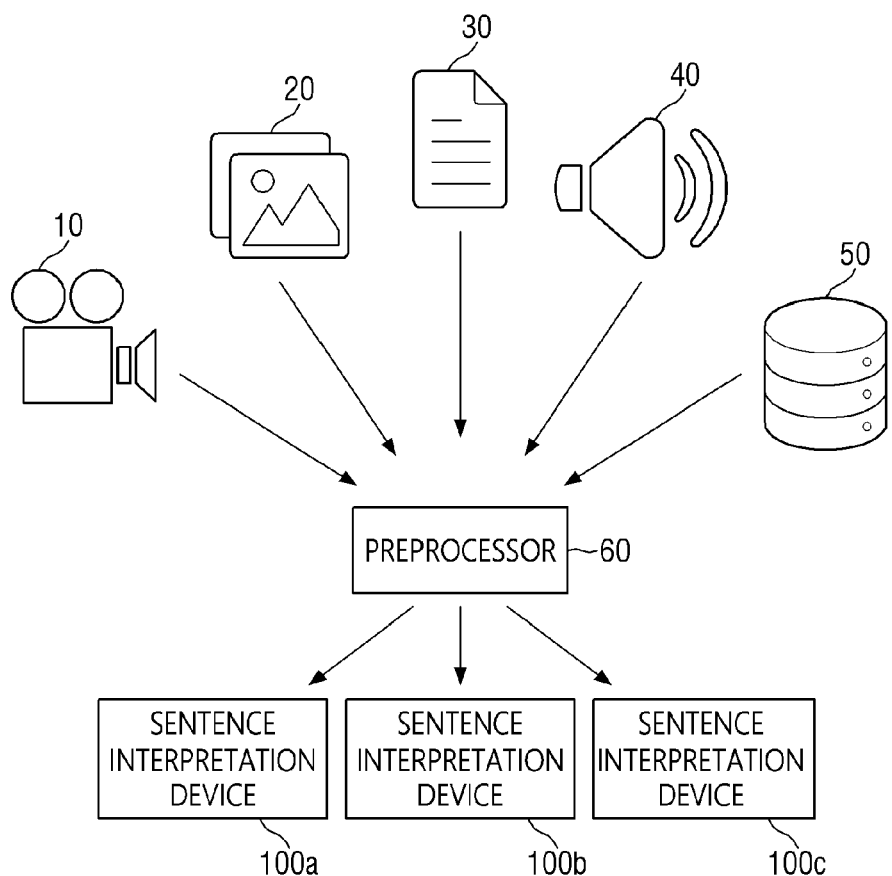
FIG. 42 is a block diagram of a sentence translation system visualized in a graph according to an embodiment of the present invention.

Hereinafter, a sentence interpretation system according to an embodiment of the present invention will be described in detail with reference to FIG. 42.

Therefore, according to some embodiments of the present invention, sentence interpretation devices 100a, 100b, and 100c may interpret a sentence in the form of a text acquired by preprocessing (60) various types of data 10, 20, 30, 40, and 50. In addition, according to some embodiments of the present invention, the acquired sentence may be translated into a representation of a language desired by a user. In addition, when the user wants to correct the translated sentence, the user can easily and clearly edit the sentence by inputting the graph.

In addition, each of the sentence interpretation devices 100a, 100b, and 100c may separately manage a corresponding one translation record to further store information such as a translation pattern for each user and a context before and after a translation target sentence. Through this, the user may obtain a customized sentence interpretation result or translation result.

Specifically, a method of performing translation using local storage for each translation task will be described with reference to FIGS. 43 to 45.

Figure 43:
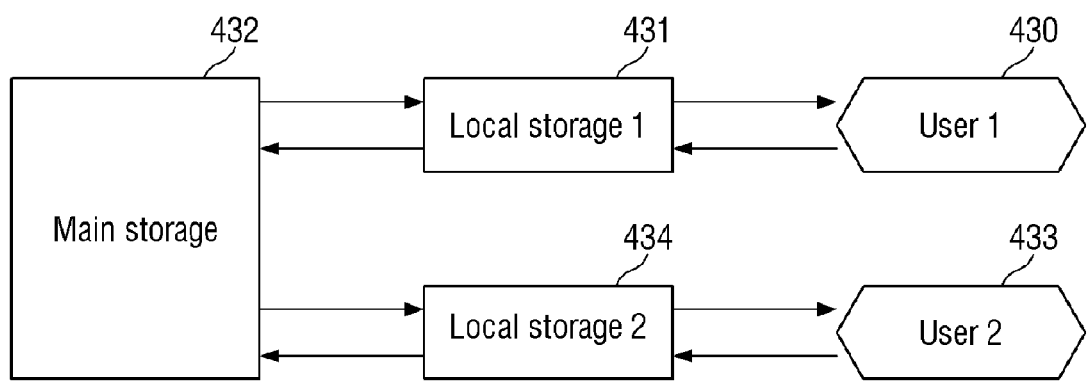
FIGS. 43 to 45 are diagrams for describing a method of visualizing and translating a sentence using a previous translation record according to an embodiment of the present invention.

Referring to FIG. 43, according to an embodiment, different local storages may be used to perform translation for each user. For example, a local storage 431, which stores information on a translation record previously used by a user 1 (430) or a sentence previously translated in the same translation process, and a local storage 434 that stores a translation record of a user 2 (433) may be different.

Also, according to another embodiment of the present invention, the local storages 431 and 434 may include only information on previous translation records in the same task. For example, when translating a large amount of text composed of a plurality of paragraphs, the translation may be performed using information stored in the local storage only in the corresponding task with reference to the translation record of the previous sentence.

The information stored in the local storage may include one or more of word order information, preference information for merging or segmenting nodes or edges, the number of sentence elements or words or morphemes, similarity of the number of preferred syllables, similarity of international phonetic symbols, attribute information on respectful or semi-verbal language, information on gender, preference for written or colloquial language, whether foreign words are used, preference for sentence voice (e.g., passive voice and active voice), and information on a tone of a sentence, such as a location of punctuation marks or an end of a sentence.

By managing the translation records differently for each user, it is possible to generate a translation record desired by the user according to a preferred translation method and preferred sentence order. Also, according to another embodiment, a main storage 432 shared by all users may exist. The main storage 432 may store, for example, all information on dictionary meanings of a plurality of languages, characteristics of each language, a commonly preferred translation method, and common feedback on a translation result.

With such a distinction between local storage and main storage, terminologies in specialized fields may be translated naturally, and in the case of book translation, more natural translation is possible by using information on different styles for each author. Although not limited thereto, by storing and managing individualized information for each translation, natural and professional translation results may be acquired compared to simple statistical-based translation that does not divide fields and tasks.

For example, when translating a Korean patent specification into an English patent specification, the word "drawing" may be briefly indicated in as "FIG" in the conventional translation technology, but when "FIG" of the English patent specification is translated into Korean, according to some embodiments of the present invention, more information on the patent field may be added to be translated as a "drawing" rather than a "fig."

Also, in the field of book translation, depending on the style, the sentence "In my younger and more vulnerable years" may be interpreted as various sentences such as "When I was younger than I am now and my heart was soft," "When I was young and didn't know the world," or "When I was young, I was much softer and weaker than I am now." According to some embodiments of the present invention, a natural style similar to the preceding style may be translated using the translation record of the previous sentence.

Figure 44:
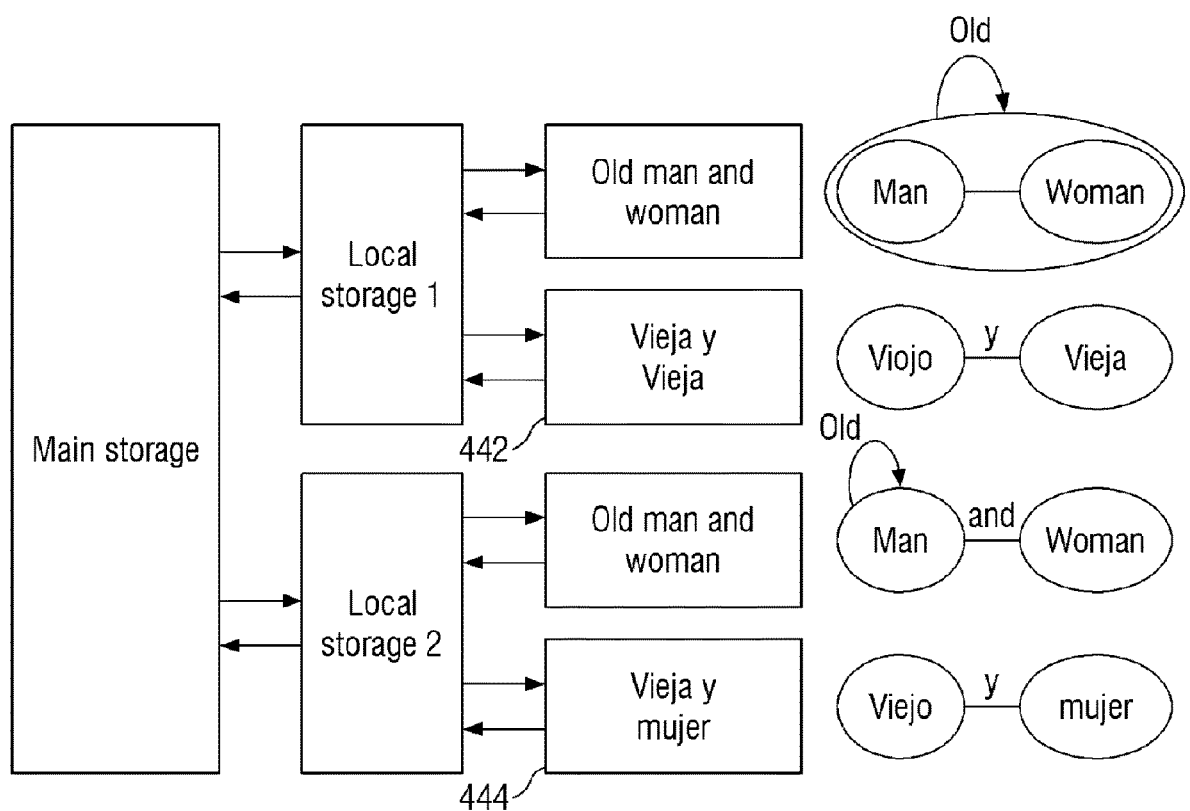
Figure 45:
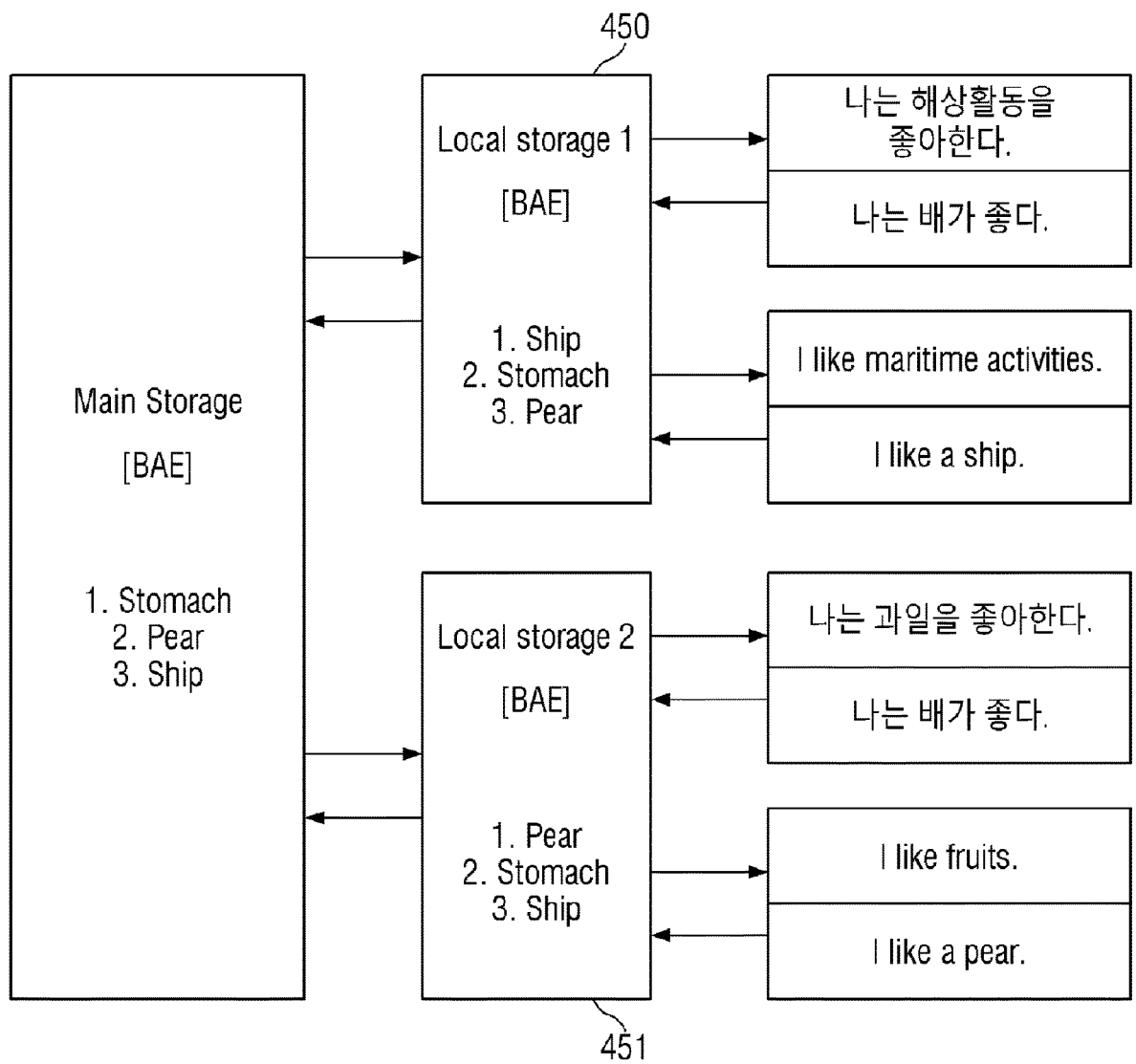

For example, referring to FIG. 44, even in the same English sentence "old man and woman," when "old" is interpreted as meaning modifying both "man and woman" in consideration of the user's previous translation record, "old" may be translated as "Viejo y Vieja" 442, meaning "old man and old woman" in Spanish.

On the other hand, considering the user's previous translation record, when a specific adjective is often interpreted as modifying only a noun following the adjective, it may be interpreted as "Viejo y mujer" (444), meaning "old man and (normal) woman" in Spanish. As described above, according to the present embodiment, it is possible to extract the translation result intended by the user even for the same sentence by using the user's previous translation record.

As such, even the same sentence may be translated using a record in which the user has previously performed a translation or a record requested as feedback for the extracted translation result. The feedback on the translation result may be, for example, information on merged or separated nodes and edges.

For example, when there are many records of merging a graph element corresponding to a subject and a graph element corresponding to a preposition, a sentence that may be interpreted as "The woman saw a man with binoculars" may be interpreted as "The woman looked at the man with binoculars" when there are many records of merging the graph element corresponding to the subject and the graph element corresponding to the object according to the user. In a similar embodiment, in the case of a user who does not prefer the self-loop edge of the graph, a graph in which the self-loop edge and the corresponding node are merged may be generated.

Hereinafter, when a plurality of sentences are translated with reference to FIG. 45, a method of performing translation in consideration of contexts of the plurality of sentences will be described. In the case of homonym words having various meanings, accurate translation is possible only when a sentence including the word and a context before and after the sentence is understood. For example, the Korean word "배|bae|" may mean "a part of a body of a person or animal," it may mean "a kind of fruit," or mean "a vehicle that floats on water." According to the present embodiment, all dictionary meanings of the "배|bae|" may be extracted from the main storage.

However, when the translation of the sentence "I love bae" is performed, a problem arises that a user has no idea what the "bae" means. In order to solve the problem of the present invention, in order to understand the meaning of a specific word, the meaning of the "bae" is understood using a sentence including the specific word and a plurality of sentences existing before and after the sentence.

For example, when a plurality of sentences "I like maritime activities. I like bae" are input, among a plurality of meanings of "bae," "a vehicle floating on water" most closely related to the sentence "I like sea activities" may be understood as the meaning of the "bae." Accordingly, the plurality of sentences may be interpreted as "I like fruits. I like a pear."

On the other hand, when the plurality of sentences "I like fruits. I like a bae." are input, among the plurality of meanings of "bae," "a kind of fruits" most closely related to the sentence "I like fruits" may be understood as the meaning of the "bae." Accordingly, the plurality of sentences may be interpreted as "I like fruits. I like a pear."

The determination of the relevance between the specific sentence and the specific word may be calculated using a vast translation record, and the machine learning learned using a set of various words and example sentences may be used.

Hereinafter, an exemplary hardware configuration of an apparatus for performing a translation method according to embodiments of the present invention will be described with reference to FIG. 46.

The translation apparatus 100 includes a graph transformation unit 623, a translation unit 624, and a translation record DB 614 and, in some embodiments, may further include a user interface 601, a sentence component extraction unit 621, a matrix transformation unit 622, a sentence component DB 611 for each language, a grammar DB 612 for each language, and a dictionary DB 613 for each language.

The user interface 601 may obtain a sentence to be translated from a user or an external server, and may output a matrix in which the sentence is transformed, a graph, and a translated sentence. The acquired sentence may be transmitted to the sentence component extraction unit 621. Also, the translated sentence may be received from the translation unit 624. Also, the feedback on the translation result input from the user may be transmitted to the translation unit 624.

The sentence component extraction unit 621 may segment the sentence to be translated into morpheme units. Accordingly, the sentence may be segmented by collecting information on morpheme for each language from the sentence component DB 611 for each language and the grammar DB 612 for each language. The sentence segmented into morpheme units may be transmitted to the matrix transformation unit 622 or the graph transformation unit 623.

The matrix transformation unit 622 may transform the sentence segmented into morpheme units into a matrix form. In addition, the sentence transformed into a matrix form may be transmitted to the graph transformation unit 623.

The graph transformation unit 623 may transform a sentence segmented into morpheme units or a sentence in a matrix form into a graph. Also, a graph and a sentence corresponding to the graph may be transmitted to the translation unit 624.

The translation unit 624 may interpret a sentence corresponding to each node and edge of the graph. A word order of the interpreted sentence may be determined according to a traverse order of a graph corresponding to the sentence. The order of traversing the graph may be an order determined based on a past translation record, an order acquired through machine learning, or an order designated by a user.

Specifically, a translation result optimized for a user or context may be generated using the dictionary DB 613 for each language and the translation record DB 614. Also, the translation unit 624 may generate a new translation result by using the user's feedback information on the translation result received from the user interface 601 and transmit information on the generated translation result to the translation record DB 614 so that the information is stored in the translation record DB 614.

Figure 47:
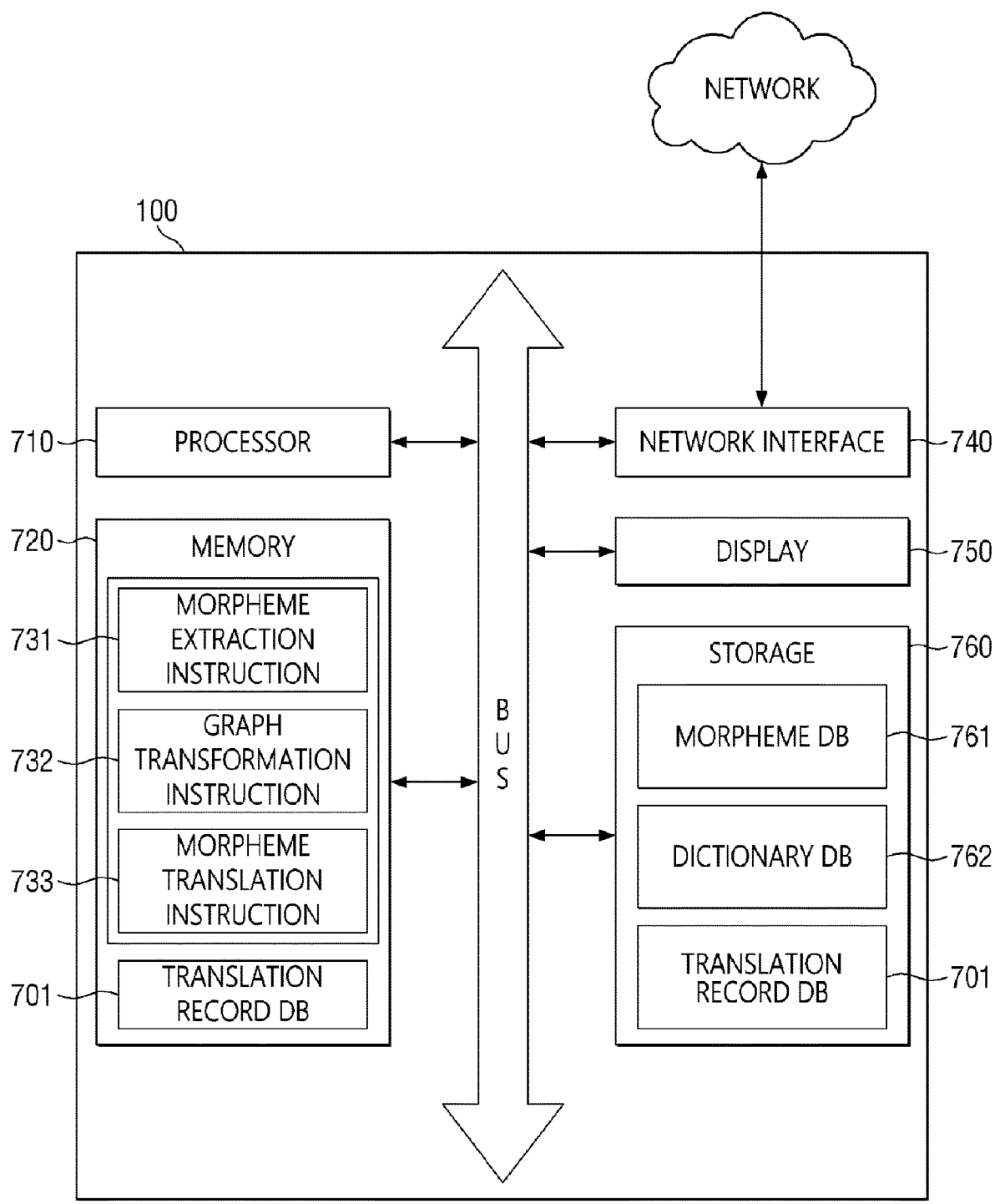
FIG. 47 is a hardware configuration diagram illustrating another embodiment of an apparatus for performing a translation method according to embodiments of the present invention.

FIG. 47 is a hardware configuration diagram illustrating another embodiment of an apparatus for performing a translation method according to embodiments of the present invention. In FIG. 47, a computing device 100 includes a processor 710, a memory 720, a display 750, and storage 760 and, in some embodiments, may further include a network interface 740 and a system bus.

One or more instructions 731, 732, and 733 loaded and stored in the memory 720 are executed through the processor 710. Note that the computing device 100 performing the translation method according to the present embodiment may perform the translation method described with reference to FIGS. 1 to 47 even when there is no separate description.

The network interface 740 may receive a morpheme DB 761 and a dictionary DB 762 from an external server. The received information may be stored in the storage 760.

The storage 760 may store the morpheme DB 761, the dictionary DB 762, and the translation record DB 701.

The one or more instructions may include a morpheme extraction instruction 731 that segments a sentence into morpheme units, a graph transformation instruction 732 that generates a graph corresponding to the sentence, and a morpheme translation instruction 733 that performs translation for each morpheme of the sentence.

In an embodiment, the morpheme extraction instruction 731 may segment the sentence into morpheme units and classify the sentences into a noun morpheme and other morphemes that is not the noun morpheme.

In an embodiment, the graph transformation instruction 732 may generate nodes and edges of the graph to correspond to the noun morpheme and other morphemes.

In an embodiment, the morpheme translation instruction 733 may translate and display the noun morpheme and each component of a graph corresponding to other morphemes into a language to be translated.

2. Method of Correcting and Visually Correlating Translation Result Using Visible Representation Component In this section, various embodiments related to a method of correcting a translation result using a sentence component and a visible representation component representing the relationship between the sentence components and visually associating the visible representation component with each phrase of the translation result are further disclosed. Hereinafter, related embodiments will be described in detail with reference to FIGS. 48 to 63.

Figure 48:
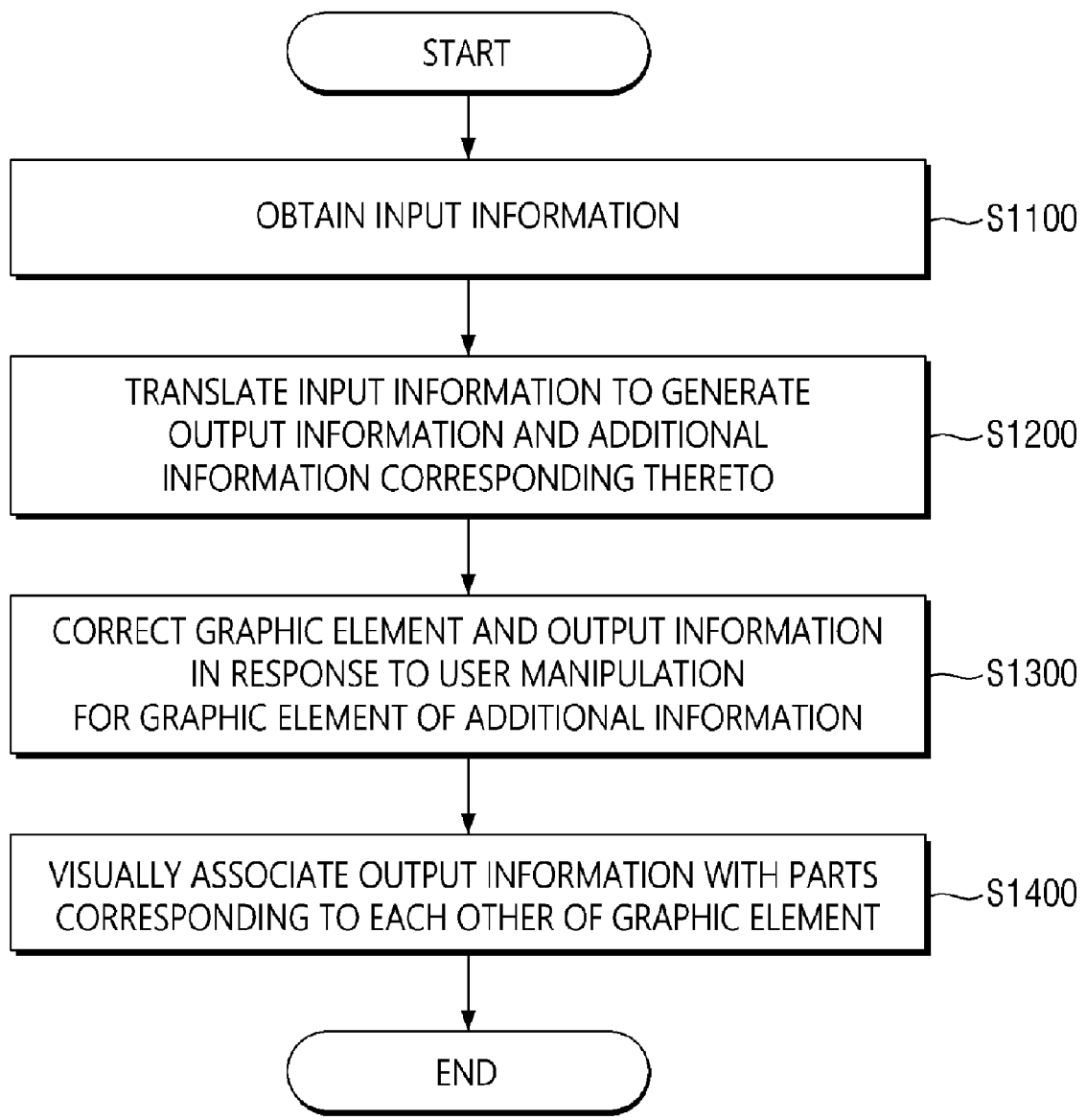
FIG. 48 is a flowchart illustrating a translation method using additional information according to an embodiment of the present invention.

FIG. 48 is a flowchart illustrating a translation method for correcting a translation result using a visible representation component and visually associating the visible representation component with each phrase of the translation result according to an embodiment of the present invention. Referring to FIG. 48, a translation method in which input information is translated and a result thereof is provided as output information and the content of the output information is represented as a graphic element will be described.

In operation S1100, the translation apparatus acquires input information to be translated. The input information may be text written in the first language (e.g., Korean) or a document including the same.

In operation S1200, the translation apparatus translates the acquired input information to generate output information corresponding to the input information. In this case, the output information is text written in a second language (e.g., English) or a document including the same and may be information indicating a translation result of input information. In addition, the translation apparatus generates additional information including graphic elements corresponding to the output information. Additional information is information such as a picture or video that graphically represents the meaning (or linguistic meaning) of the output information. Even users who do not know the second language can easily understand the meaning of the output information by viewing the additional information. Those will be additionally described with reference to FIG. 49.

Figure 49:
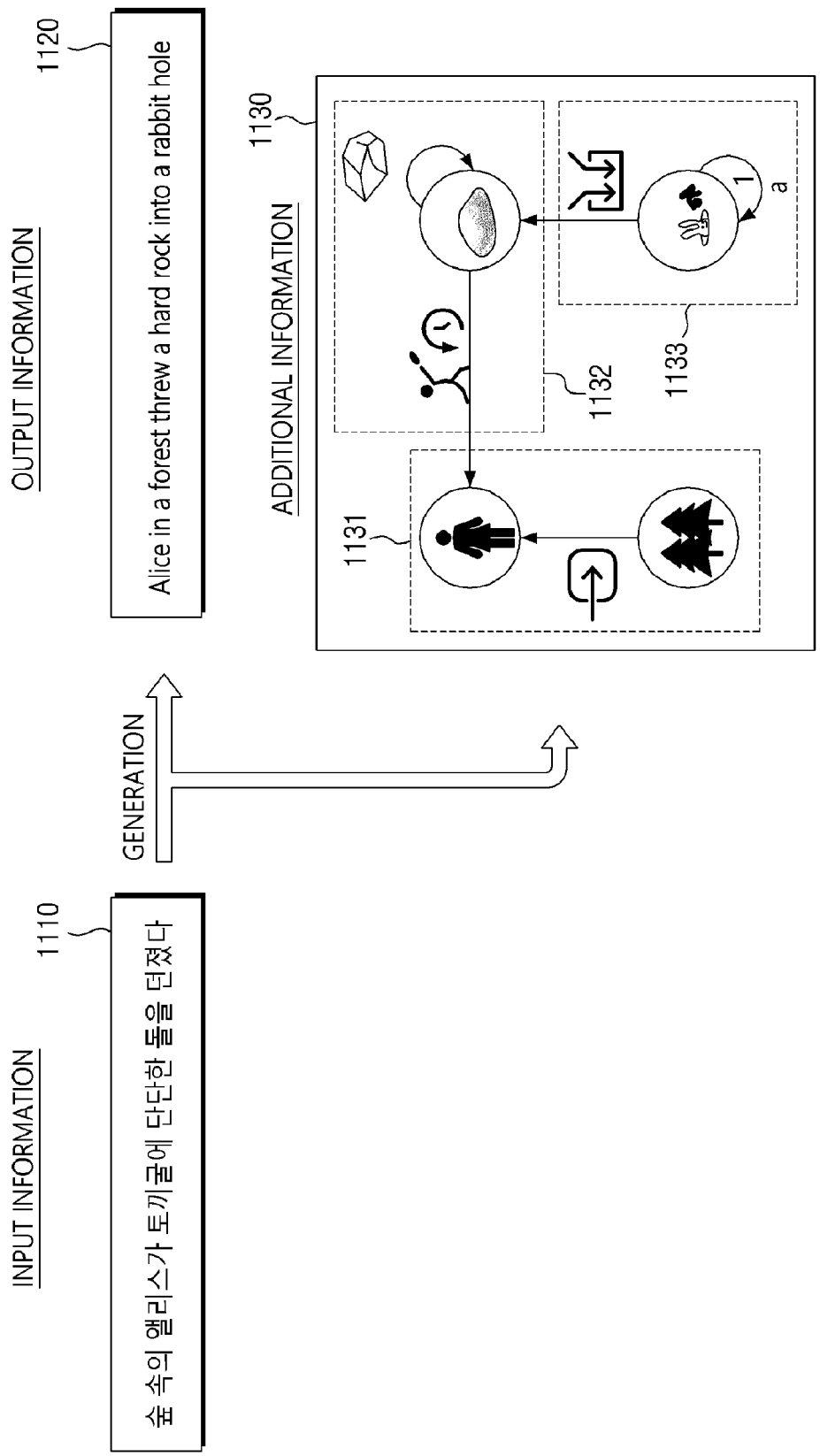
FIG. 49 is a diagram conceptually illustrating a method of generating output information and additional information by translating input information.

FIG. 49 is a diagram conceptually illustrating a method of generating output information and additional information by translating input information. In FIG. 49, when "숲 속의 앨리스가 토끼굴에 단단한 돌을 던졌다" is input as the input information 110, the translation result "Alice in a forest threw a hard rock into a rabbit hole" is output as the output information 120. In addition, the additional information 1130 corresponding to the output information 120 is displayed together to graphically represent the meaning of the output information 1120. Referring to FIG. 49, through a graphic element 1131 corresponding to "Alice in a forest," a graphic element 1132 corresponding to "threw a hard rock," and a graphic element 1133 corresponding to "into a rabbit hole" as the additional information 1130, even a user who does not know the language (here, English) of the output information 1120 may easily confirm the meaning of the output information 1120 through the additional information 1130.

In operation S1300, the translation apparatus corrects the graphic element in response to a user manipulation of the graphic element of the additional information and corrects the output information to correspond to the change of the graphic element. This will be further described with reference to FIGS. 50 to 53.

First, an embodiment in which the graphic element of the additional information 1130 is replaced or corrected with another graphic element will be described with reference to FIGS. 50 and 51.

In the additional information 1130, a picture depicting "Alice in a forest threw a hard rock into a rabbit hole" is shown, but assume that the user's original translation intent was to translate "stone" as "pebble" rather than "rock." In this case, the user may know that the translation is performed differently from his/her original intention by looking at the graphic element 1132 of the additional information 1130, and the user replaces or corrects the graphic element 1132 corresponding to the mistranslated part into another graphic element 1132 that matches the original intention, thereby correcting the translation errors.

Figure 50:
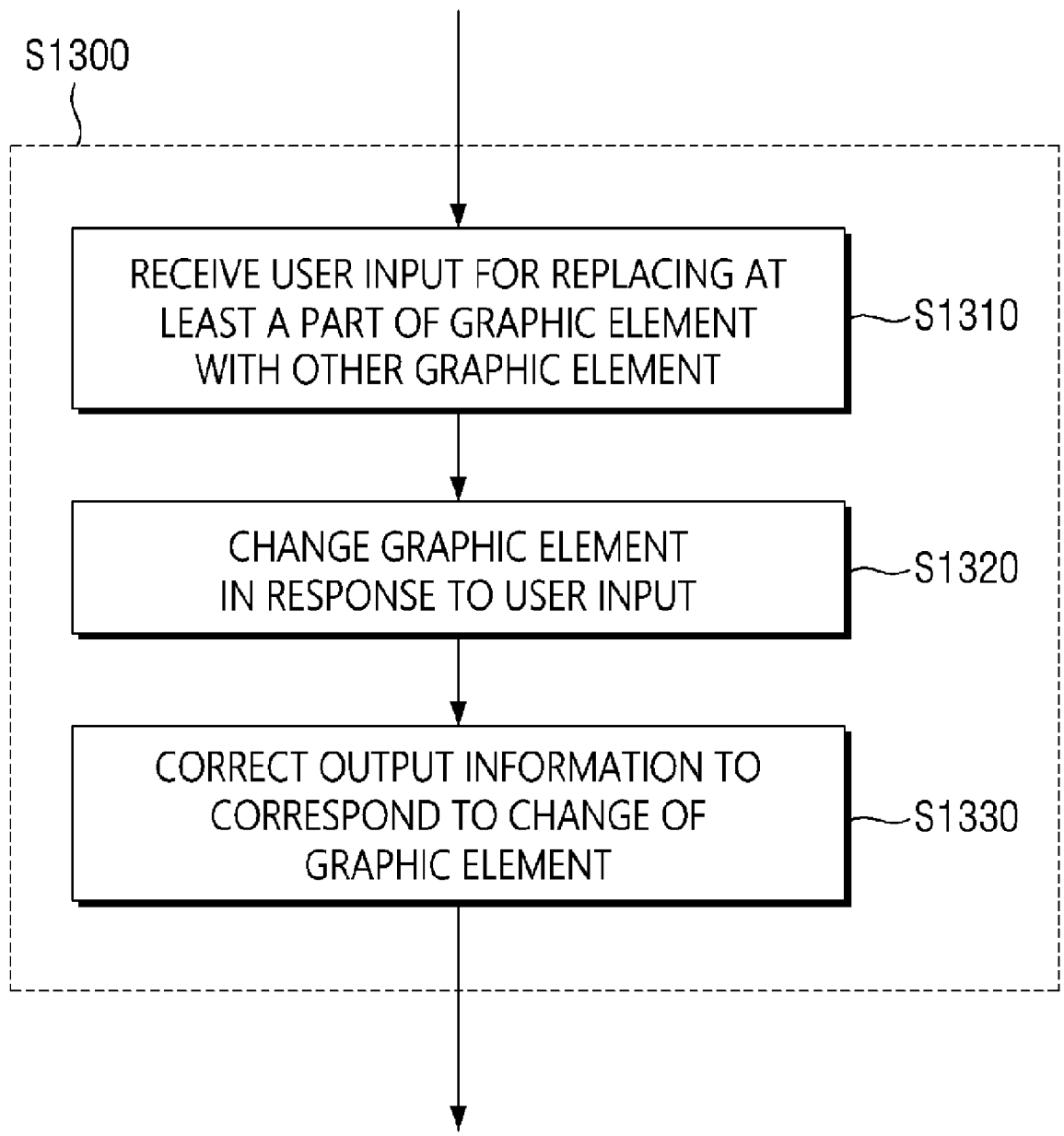
FIG. 50 is a flowchart illustrating an embodiment in which operation S1300 illustrated in FIG. 48 is further detailed.
Figure 51:
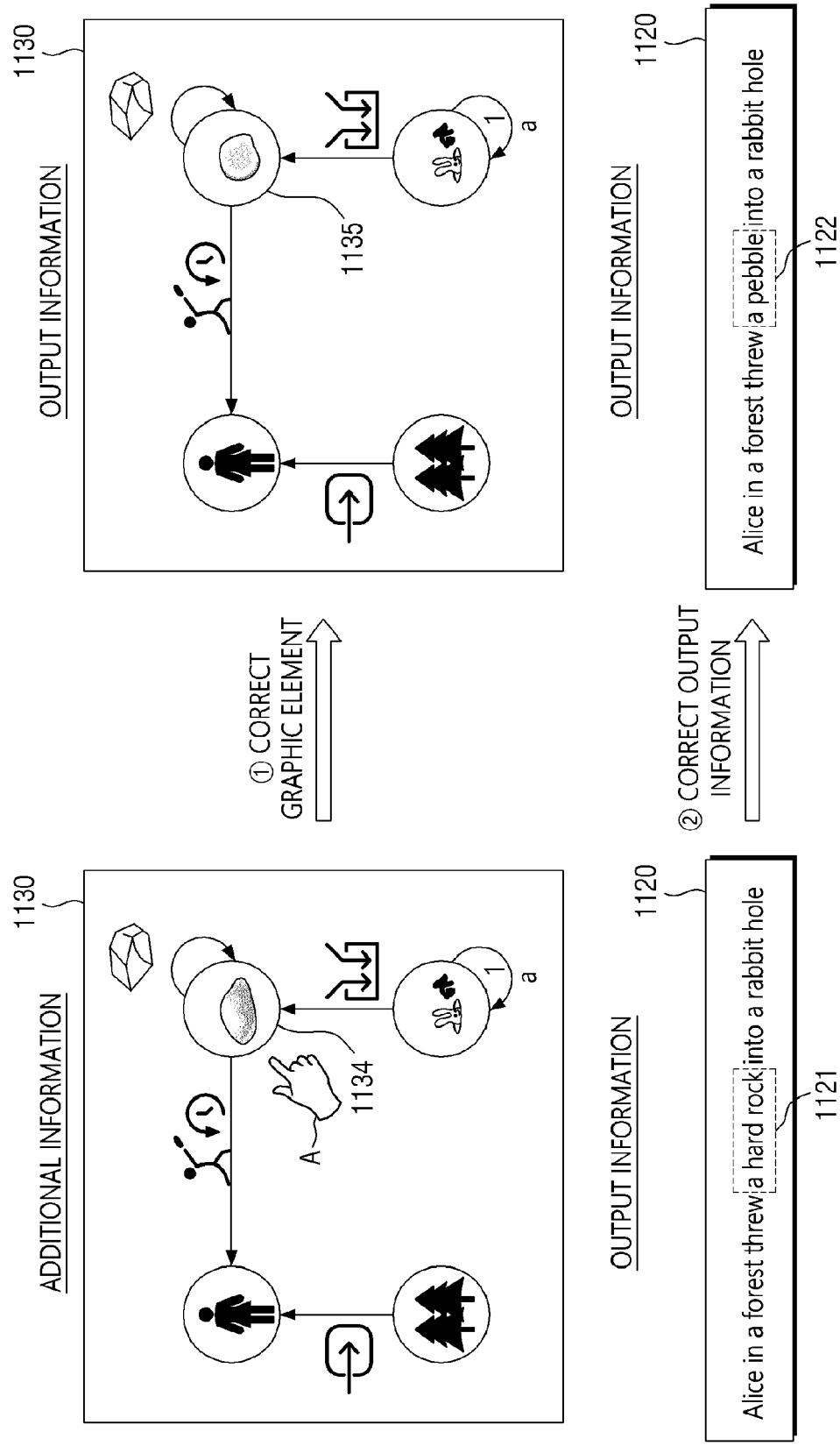
FIG. 51 is a diagram conceptually describing a method of correcting a translation result by replacing or correcting a graphic element with another graphic element.

Referring to FIGS. 50 and 51, in operation S1310, the translation apparatus receives a user input for replacing at least a portion (a part corresponding to a mistranslated part) of a graphic element with another graphic element. For example, in FIG. 51, the user sees the additional information 1130 and understands the meaning of the output information 1120, and when it is determined that the graphic element 1134 representing "a hard rock" 1121 is represented differently from the original intention, a user manipulation A is applied to correct the different representation. In this case, the translation apparatus receives a user input according to the user manipulation.

In operation S1320, the translation apparatus changes the graphic element in response to the received user input. For example, in FIG. 51, when the user manipulation for correcting the graphic element 1134 is applied (A), the translation apparatus displays another graphic element (e.g., a pebble picture) that may replace the corresponding graphic element 1134, and responds to the user input for selecting the graphic element, and thus the corresponding graphic element 1134 is replaced and selected with the selected graphic element. Referring to the right figure of FIG. 51, it can be seen that the graphic element 1135 in the additional information 1130 is changed to a pebble in response to the user selecting the pebble picture.

In operation S1330, the translation apparatus corrects the output information to correspond to the changed content of the graphic element. For example, referring to FIG. 51, a graphic element 1134 indicating "a hard rock" of the additional information 1130 is changed to a graphic element 1134 indicating "a pebble" by the user manipulation A, and therefore, the output information 1120 also reflects the change of the additional information 1130 so that "a hard rock" 1121 is corrected to "a pebble" 1122.

Accordingly, even when the user does not know the language of the output information, the user may easily understand the meaning of the output information and confirm the mistranslated part, and easily correct the mistranslated part through the user manipulation of the graphic element.

Next, an embodiment of adding another graphic element to the graphic element of the additional information 1130 will be described with reference to FIGS. 52 and 53.

In the additional information 1130, a picture depicting "Alice in a forest threw a hard rock into a rabbit hole" was shown, and there is no particularly mistranslation here, but suppose some representations are added. In this case, the user may add another graphic element representing the representation to be added to the graphic element of the additional information 1130 so that the representation to be added may be reflected in the translation of the output information 1120.

Figure 52:
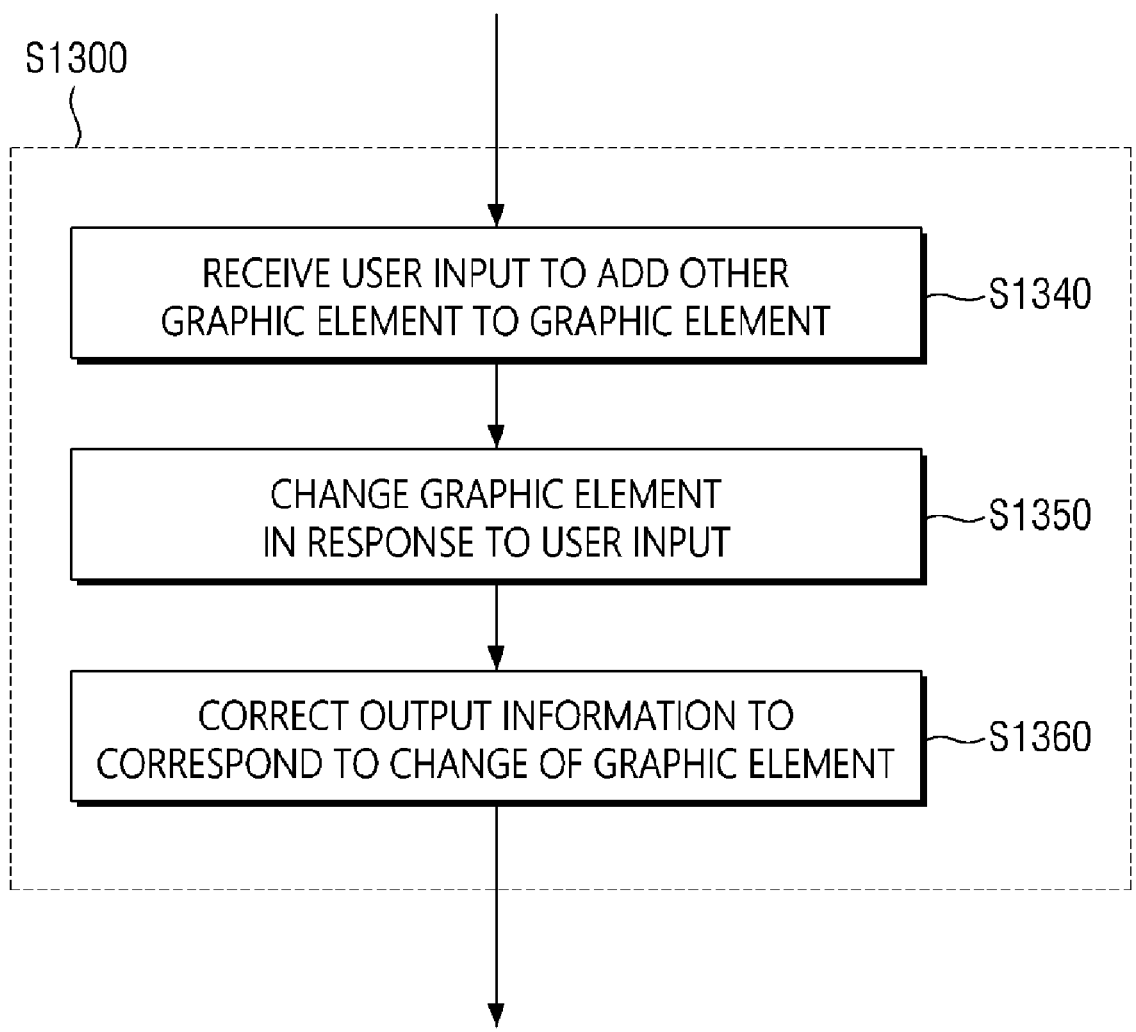
FIG. 52 is a flowchart illustrating another embodiment in which operation S1300 illustrated in FIG. 48 is further detailed.
Figure 53:
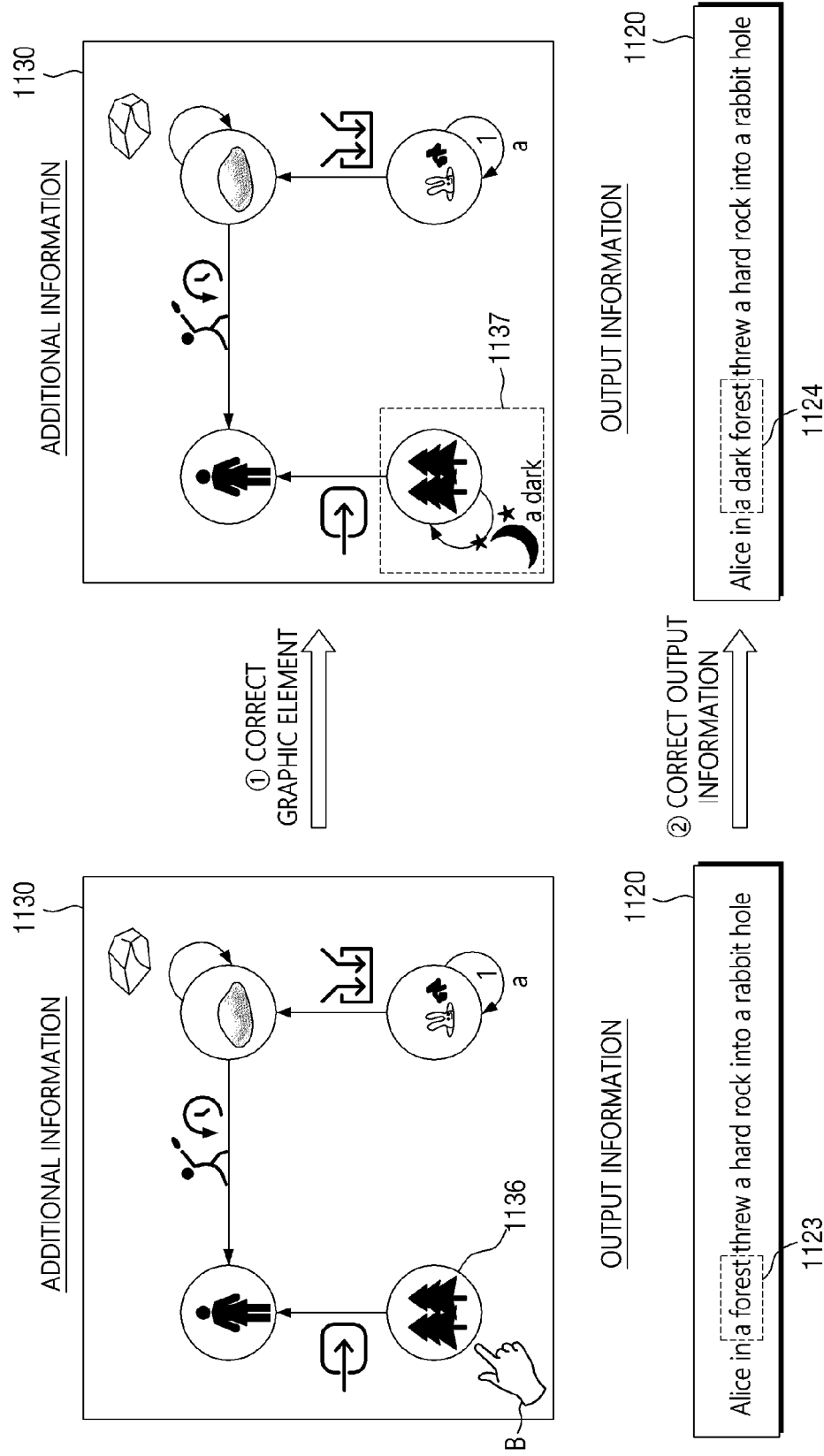
FIG. 53 is a diagram conceptually describing a method of correcting a translation result by adding another graphic element to a graphic element.

Referring to FIGS. 52 and 53, in operation S1340, the translation apparatus receives a user input for adding another graphic element to a graphic element. For example, in FIG. 53, after viewing the additional information 1130 and understanding the meaning of the output information 1120, the user may think that he wants to add a representation that decorates "a forest" 1123. In this case, the user applies a user manipulation B to the graphic element 1136 related to the representation to be added. Then, the translation apparatus receives a user input according to the user manipulation. The translation apparatus receives a user input according to the user manipulation.

In operation S1350, the translation apparatus changes the graphic element in response to the received user input. For example, in FIG. 53, when the user manipulation for correcting the graphic element 1136 is applied (A), the translation apparatus displays another graphic element (e.g., a pebble picture) that may replace the corresponding graphic element 1136 and responds to the user input for selecting the graphic element, and thus the corresponding graphic element 1136 is replaced and selected with the selected graphic element. Referring to the right of FIG. 53, it can be seen that the graphic element 1137 in the additional information 1130 is added with star and moon pictures in response to the user selecting pictures of a star and a moon representing darkness.

In operation S1360, the translation apparatus corrects the output information to correspond to the changed content of the graphic element. For example, referring to FIG. 53, since a change in which "a picture of a star and a moon indicating darkness" is added to the graphic element 1136 indicating "a forest" of the additional information 1130 is performed by the user manipulation B, the output information 1120 also reflects the changed graphic element 1137, and thus "a forest" 1123 is corrected to "a dark forest" 1124.

According to this, even when the user does not know the language of the output information, it is possible to easily understand the meaning of the output information and add a desired representation, thereby deriving the translation result with a richer representation.

Referring back to FIG. 48, in operation S1400, the translation apparatus visually associates the output information with the corresponding portions of the graphic element in the additional information. This is to understand step by step how the translation was performed by visually displaying in which figure a specific word of the output information is represented in the graphic element and visually displaying the correlation between the output information and the graphic element. This will be described below in more detail in the embodiment of FIGS. 61 and 62.

According to various embodiments of the present invention described above, by visualizing the meaning of the output information, which is the translation result, through the additional information, even a user who does not know the language (second language) of the output information may easily confirm the meaning and correct the mistranslation.

Figure 54:
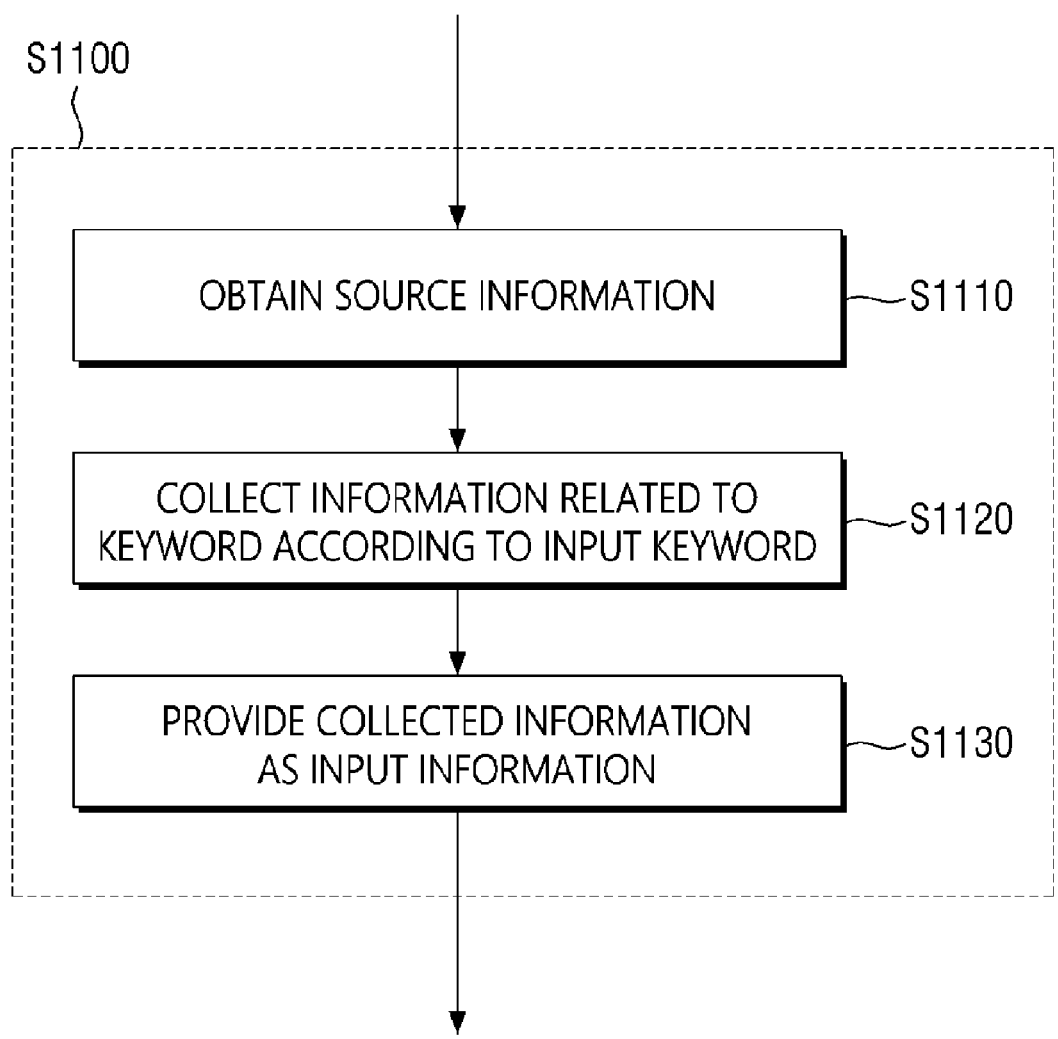
FIG. 54 is a flowchart illustrating an embodiment in which operation S1100 illustrated in FIG. 48 is further detailed.

FIG. 54 is a flowchart illustrating an embodiment in which operation S1100 illustrated in FIG. 48 is further detailed. FIG. 54 illustrates a method of acquiring input information by searching for source information based on a keyword as an additional embodiment of the present invention.

In operation S1110, the translation apparatus acquires source information. In this case, the source information may be a document or file including various types of text or information. The source information may be imported by a user or may be automatically collected through crawling or the like.

In operation S1120, the translation apparatus receives a keyword from a user, searches for source information according to the input keyword, and collects keyword-related information.

In operation S1130, the translation apparatus provides the collected information as the input information to subsequent operations. In this case, the translation apparatus may format the collected information according to a predetermined standard and provide the formatted information.

Figure 55:
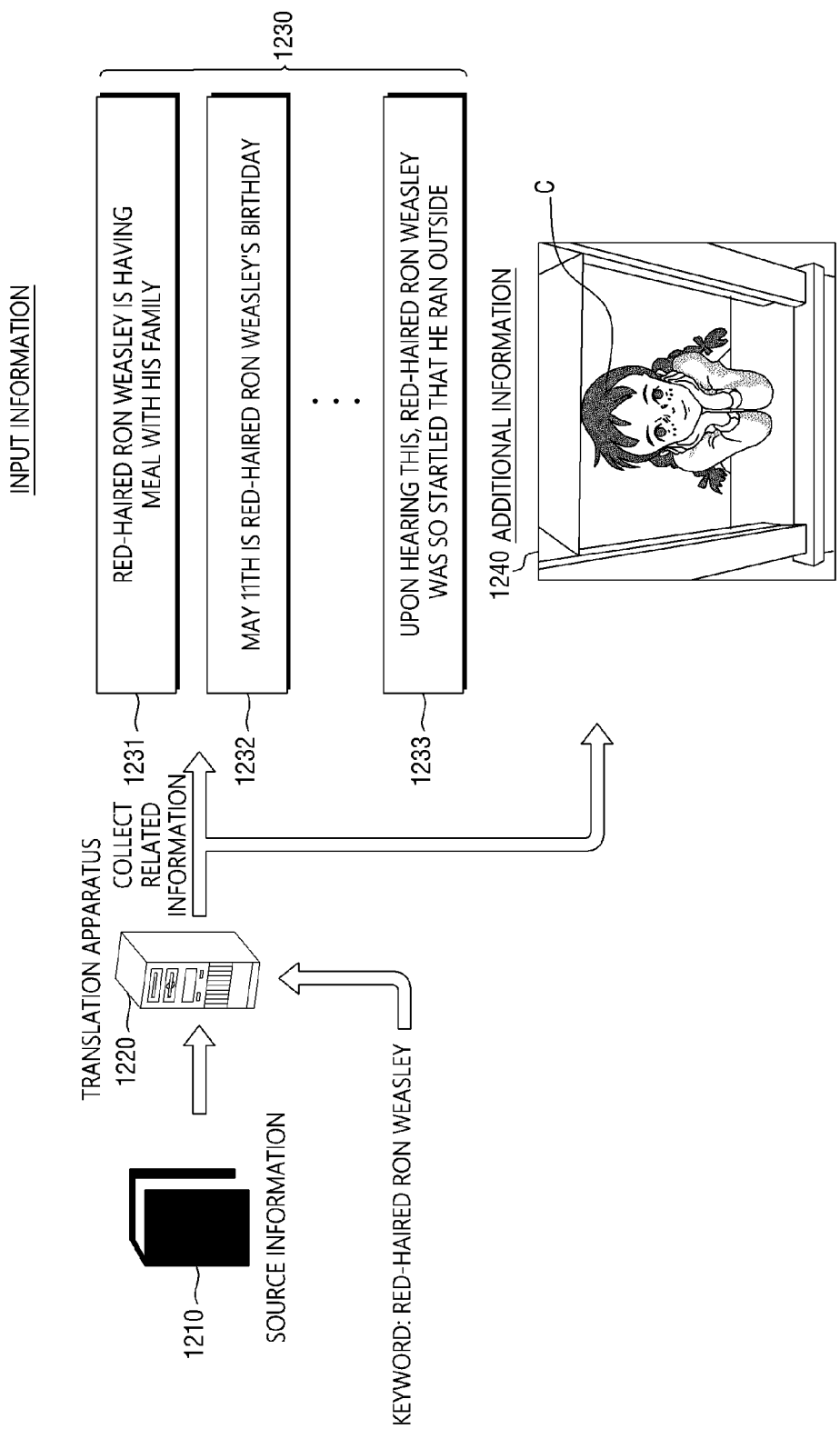
FIG. 55 is a diagram for conceptually describing each operation illustrated in FIG. 54.

For a detailed understanding of the present embodiment, it will be further described with reference to FIG. 55. Referring to FIG. 55, each operation described in FIG. 54 is conceptually schematically described. Source information 1210 is input to the translation apparatus 1220, and the translation apparatus 1220 receives the keyword from the user. In this case, when the keyword is "Red-haired Ron Weasley," the translation apparatus 1220 searches for the source information 1210 and extracts contents 1231, 1232, and 1233 related to "Red-haired Ron Weasley" to configure input information 1230. The input information 1230 thus configured is provided for subsequent operations of the translation method according to the present invention.

In this case, the translation apparatus 1220 may generate and display the additional information 1240 representing the contents of the keyword as a graphic element to the user. In addition, the user may change the keyword by applying a user operation to the graphic element of the additional information 1240 or may collectively change representations related to the keyword of the input information 1230. For example, when the user looks at the additional information 1240 and applies a user manipulation to change a graphic element C representing the hair color from "red" to "black," the translation apparatus 1220 may search for the source information 1210 again by changing the keyword to "black-haired Ron Weasley" to correspond to the change or collectively change the representation of "Red-haired Ron Weasley" of the previously configured input information 1230 to "Black-haired Ron Weasley."

Figure 56:
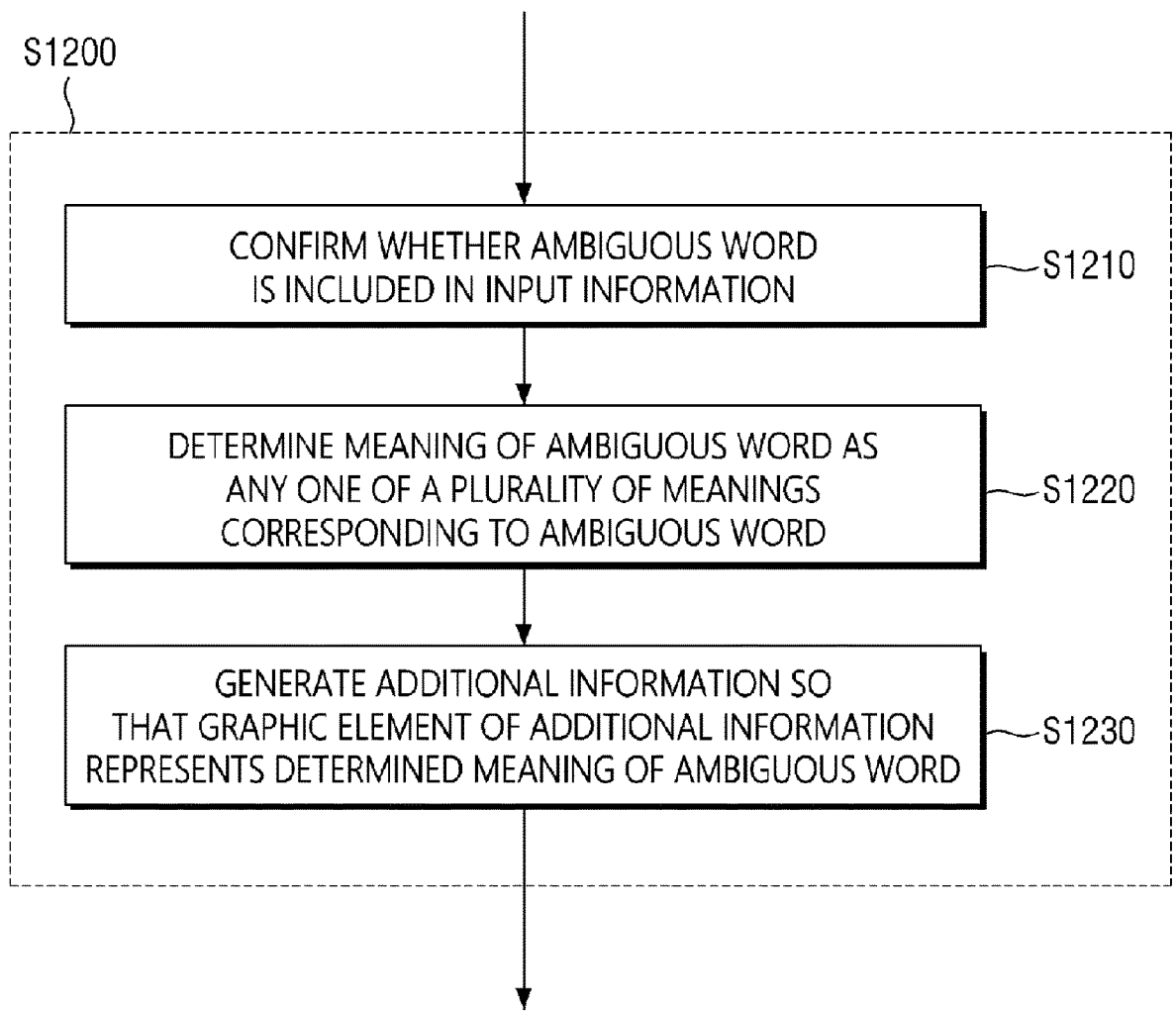
FIG. 56 is a flowchart illustrating an embodiment in which operation S1200 illustrated in FIG. 48 is further detailed.

FIG. 56 is a flowchart illustrating an embodiment in which operation S1200 illustrated in FIG. 48 is further detailed. In FIG. 56, as another additional embodiment of the present invention, when the ambiguous representation is included in the input information, an embodiment of generating output information and additional information for the ambiguous representation will be described.

In operation S1210, the translation apparatus confirms whether the ambiguous representation is included in the input information. In this case, the ambiguous representation means a representation in which word or phrase may be understood in multiple meanings and is a concept including representations that may represent ambiguous meaning within the sentence structure as well as individual words with ambiguous meanings such as homophones or polyphonic words.

Describing this as an example, "old man and woman" may be an ambiguous representation that is interpreted differently depending on whether a part that "old" modifies is only "male" or "male and female." When "old" modifies "male" only, "old man and woman" is understood as "one old man and the other woman," but when "old" modifies "male and female," "old man and woman" is understood as "one old man and the other old woman." When applying this to the translation, "old man and woman" corresponds to an ambiguous representation that may be translated into a plurality of meanings of "a grandfather and a woman" and "a grandfather and a grandmother" when translated into English.

Similarly, "I saw the cat under the table" and "He opened a can of worms" may be ambiguous representations. When translated into Korean, "I saw the cat under the table" may be interpreted as a plurality of meanings, such as "I saw a cat under the table" or "I saw a cat at a lower part of the table," and similarly, "He opened a can of worms" may be interpreted as a plurality of meanings of "He opened a worm can" or "He made more trouble" when translated into Korean. Accordingly, phrases having the ambiguous meaning within the sentence structure are also included in the ambiguous representation defined in the present invention.

In operation S1220, when it is confirmed that the ambiguous representation is included in the input information, the translation apparatus confirms a plurality of meanings corresponding to the ambiguous representation and determines the meaning of the ambiguous representation as any one of the plurality of meanings. As an embodiment, in this case, after the translation apparatus displays graphic elements corresponding to the plurality of meanings of the confirmed ambiguous representation, and receives the user's selection therefor, the translation apparatus may determine the meaning of the ambiguous representation as corresponding to the graphic element selected by the user.

In operation S1230, the translation apparatus generates a result of translating the input information according to the meaning of the previously determined ambiguous representation as the output information and generates the additional information corresponding to the generated output information. In this case, the generated additional information includes the graphic element representing the meaning of the previously determined ambiguous representation.

Figure 57:
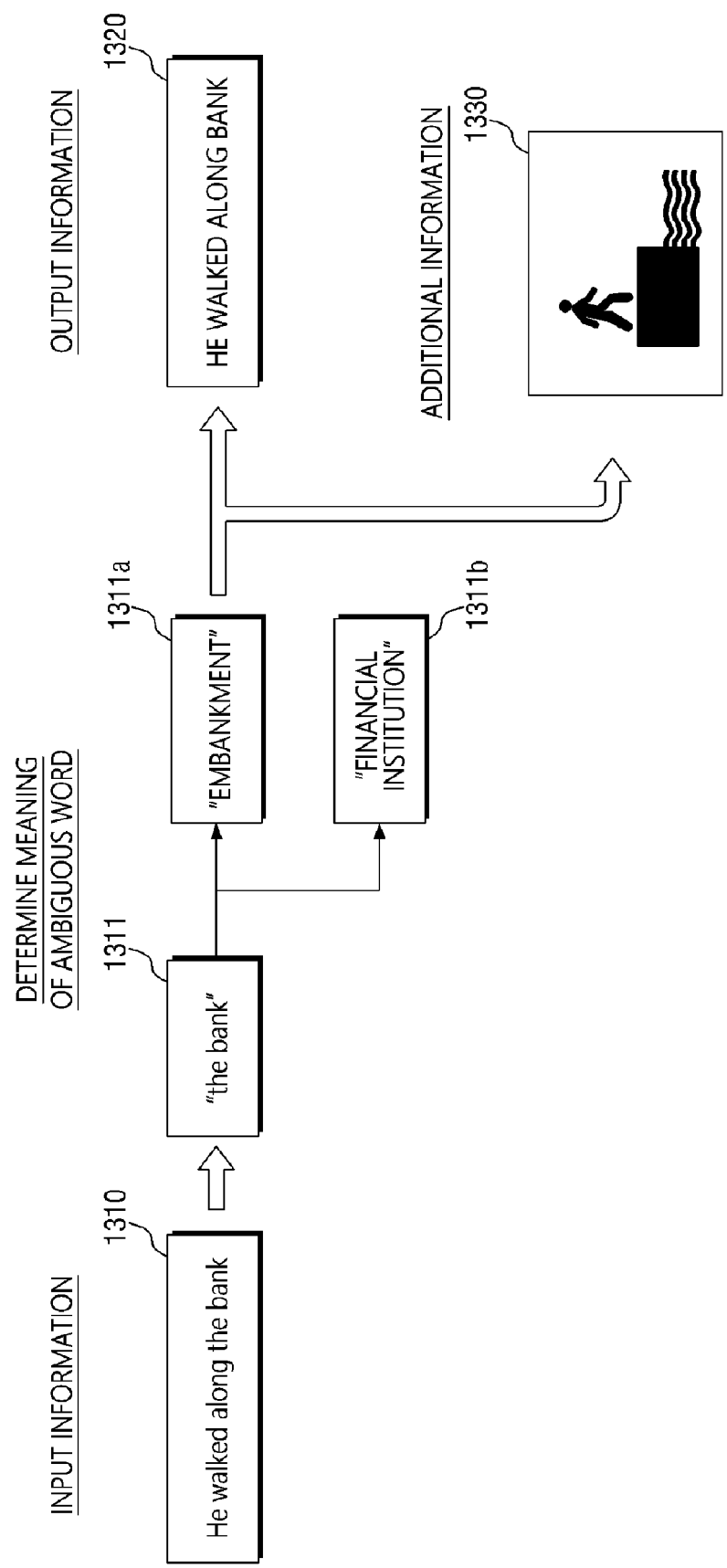
FIG. 57 is a diagram for conceptually describing each operation illustrated in FIG. 56.

For a detailed understanding of the present embodiment, it will be further described with reference to FIG. 57. Referring to FIG. 57, each operation described in FIG. 56 is conceptually schematically described. The translation apparatus analyzes the input information 1310 and confirms whether the input information 1310 includes an ambiguous representation. For example, when the input information 1310 is "He walked along the bank," "the bank" 1311 corresponds to an ambiguous representation that may be interpreted as a plurality of meanings such as "embankment" or "financial institution." In this case, the translation apparatus confirms a plurality of meanings 1311$a$ and 1311$b$ corresponding to "the bank" 1311 and determines the meaning of the corresponding ambiguous representation by any one of the plurality of meanings. Then, the translation apparatus generates output information 1320 according to the determined meaning of the ambiguous representation, and also generates additional information 1330 corresponding thereto. For example, as illustrated in FIG. 57, the translation apparatus may determine "embankment" 1311$a$ as the meaning of "the bank" 1311 among the plural meanings of "the bank" (1311) and thus generates the output information 1320 as "He walked along the bank," while generating the additional information 1330 to include a graphic element representing the meaning of the output information 1320.

As an embodiment, in this case, the translation apparatus may display graphic elements representing a plurality of meanings 1311$a$ and 1311$b$ of "the bank" 1311 to the user and may determine the meaning of "the bank" 1311 according to the user's selection therefor. For example, when the translation apparatus displays a graphic element representing the "embankment" 1311$a$ and a graphic element representing the "financial institution" 1311$b$, and the user selects a graphic element representing the "embankment" 1311$a$ from the graphic elements, the translation apparatus may determine the meaning of "the bank" 1311 as "embankment" 1311$a$ and generate output information 1320 and additional information 1330 as illustrated in FIG. 57.

According to this embodiment of the present invention, it is possible to easily confirm whether the ambiguous representation is translated into a correct meaning by graphically representing various meanings of the ambiguous representation in the translation of the ambiguous representation which is prone to translation errors.

Figure 58:
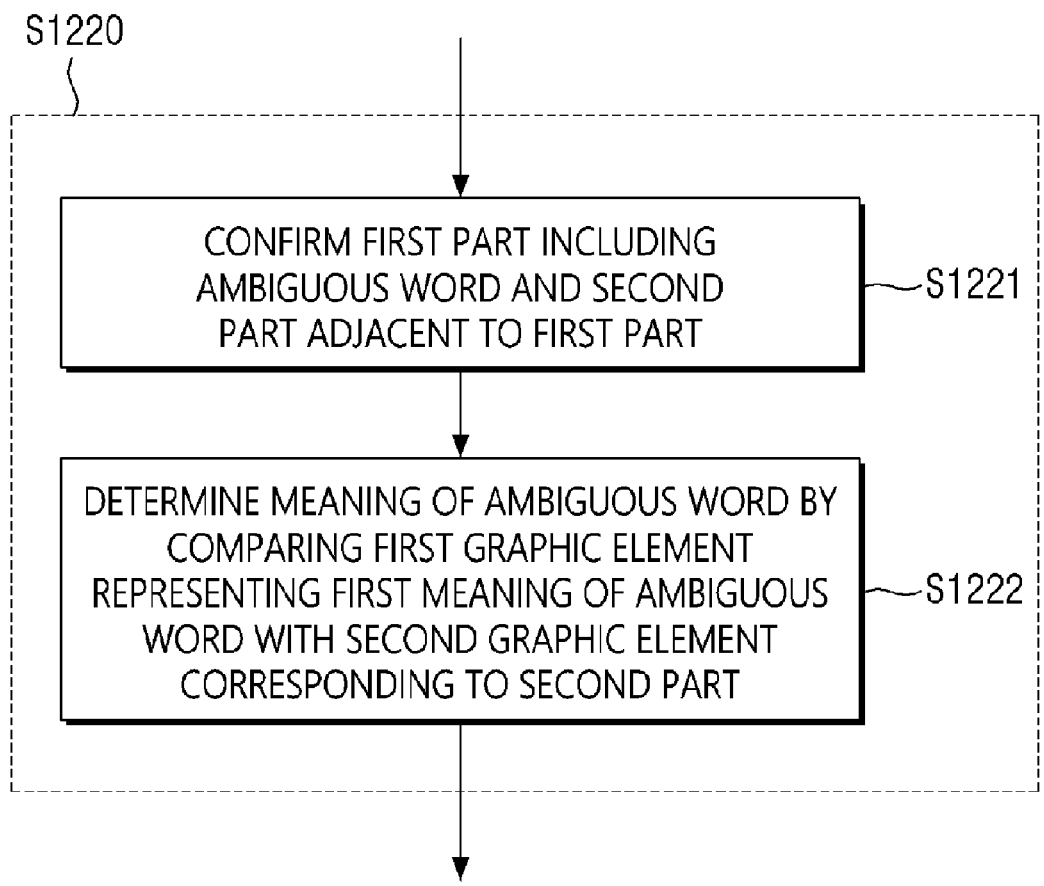
FIG. 58 is a flowchart illustrating an embodiment in which operation S1220 illustrated in FIG. 56 is further detailed.

FIG. 58 is a flowchart illustrating an embodiment in which operation S1220 illustrated in FIG. 56 is further detailed. In FIG. 58, as one of methods for determining the meaning of the ambiguous representation, a method of determining the meaning of the ambiguous representation based on the overall context is described. This will be described in detail with reference to FIGS. 58 and 59.

In operation S1221, the translation apparatus confirms a first part including the ambiguous representation and a second part adjacent to the first part among the input information. In this case, the first part and the second part may be parts divided by sentence units, but the present invention is not limited thereto. For example, the first part may be a sentence or paragraph including an ambiguous representation, and the second part may be a sentence or paragraph adjacent to the first part.

In operation S1222, the translation apparatus determines the meaning of the ambiguous representation by comparing the first graphic element representing the meaning of the ambiguous representation with the second graphic element representing the meaning of the second part. By focusing on the fact that parts adjacent to each other in context generally include contents that are associated with each other, the method looks at the graphic element of the second part adjacent to the first part and determines the meaning having a graphic element similar thereto as the meaning of the ambiguous representation to understand the meaning the ambiguous representation included in the first part.

Figure 59:
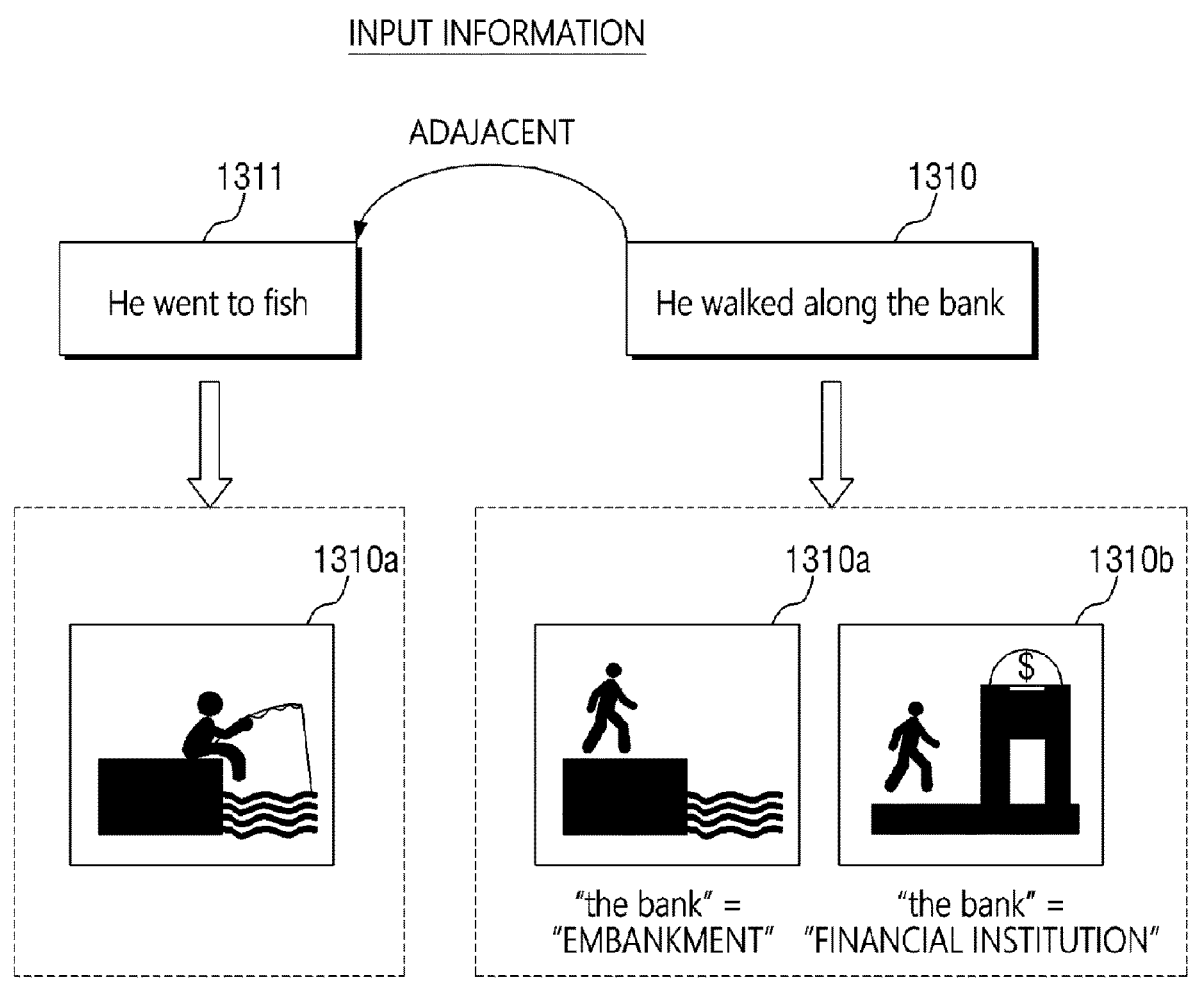
FIG. 59 is a diagram for conceptually describing each operation illustrated in FIG. 58.

Those will be further described with reference to FIG. 59. FIG. 59 is a diagram for conceptually describing each operation illustrated in FIG. 58.

Referring to FIG. 59, input information includes a first part 1310 and a second part 1311 adjacent thereto. The first part 1310 includes "the bank" which is the ambiguous representation. In this case, the translation apparatus confirms the first part 1310 including "the bank" and the second part 1311 adjacent thereto and compares graphic elements 1310*a* and 1310*b* corresponding to a plurality of meanings (e.g., "embankment" or "financial institution") of "the bank" with the graphic element 1311*a* corresponding to the second part. By scoring the similarity between the graphic elements, the meaning of "the bank" is determined as the meaning of the graphic element corresponding to the highest score. For example, when the similarity score between the graphic element 1310*a* corresponding to "embankment" and the graphic element 1311*a* corresponding to the second part is 100 points and the similarity score between the graphic element 1310*b* corresponding to "financial institution" and the graphic element 1311*a* corresponding to the second part is 50 points, the translation apparatus considers "embankment" corresponding to a higher similarity score to be closer to the meaning of "the bank" in the context and determines "embankment" as the meaning of "the bank." In this case, as a method of calculating the similarity between the graphic elements, various methods based on machine learning may be used, and detailed contents of such methods are widely known in the art, and therefore, a description thereof will be omitted here.

Figure 60:
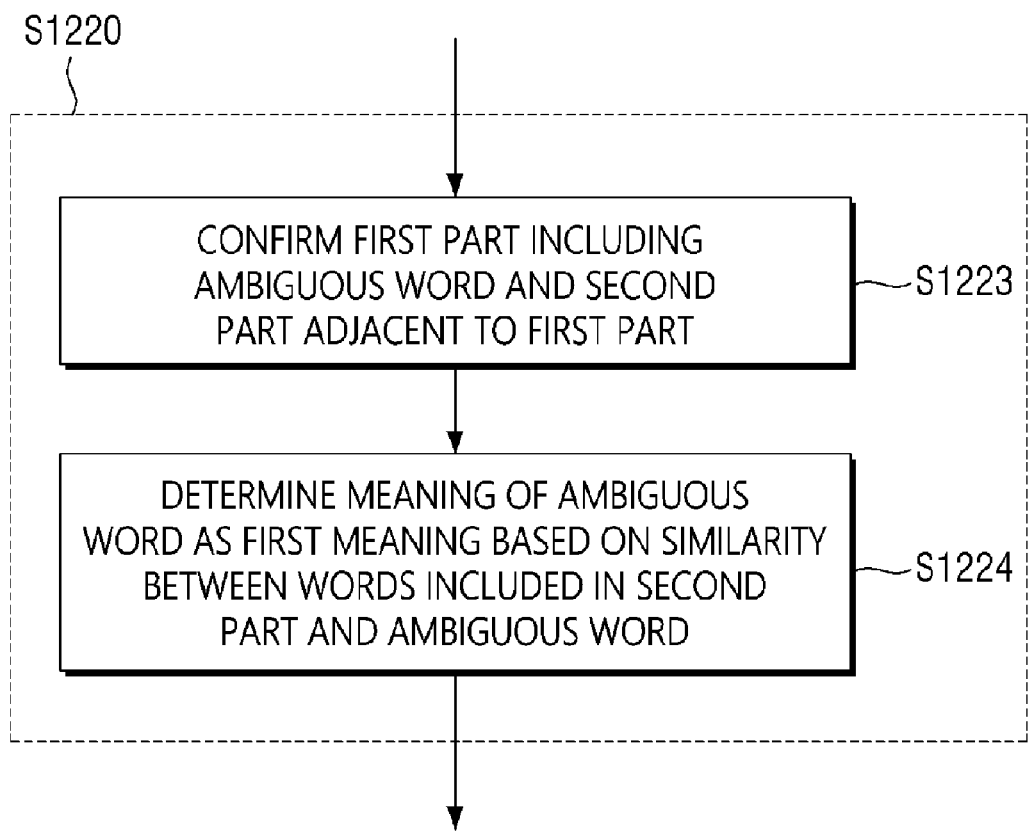
FIG. 60 is a flowchart illustrating an embodiment in which operation S1220 illustrated in FIG. 56 is further detailed.

FIG. 60 is a flowchart illustrating an embodiment in which operation S1220 illustrated in FIG. 56 is further detailed. In FIG. 60, as one of methods for determining the meaning of the ambiguous representation, a method of determining the meaning of the ambiguous representation based on the overall context is described. However, here, unlike FIG. 58, a method for determining the meaning of the ambiguous representation based on the text similarity of words will be described.

In operation S1223, the translation apparatus confirms a first part including the ambiguous representation and a second part adjacent to the first part among the input information. In this case, the first part and the second part may be parts divided by sentence units, but the present invention is not limited thereto. For example, the first part may be a sentence or paragraph including an ambiguous representation, and the second part may be a sentence or paragraph adjacent to the first part.

In operation S1224, the translation apparatus extracts words included in the second part, calculates similarities with the previously extracted words of the second part for each of the plurality of meanings of the ambiguous representation, and calculates determines the meaning with the highest similarity among the similarities as the meaning of the ambiguous representation. In this case, as a method of calculating the similarity, a method of calculating similarity based on a vector distance between words, for example, a method using a machine learning algorithm such as Word2Vec, may be used. Specific details of such methods are widely known in the art, and therefore, a description thereof will be omitted here.

Figure 61:
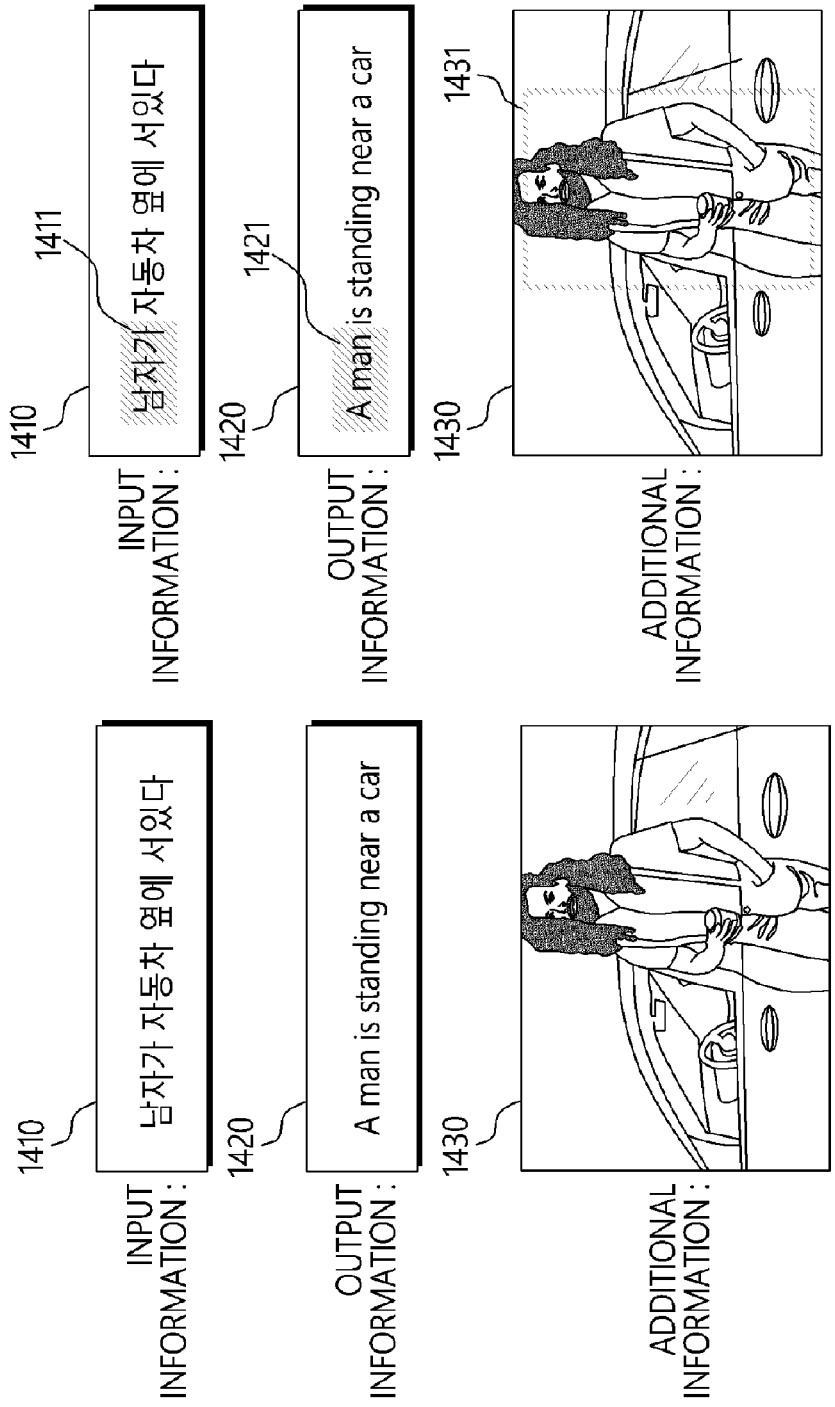
FIG. 61 is a diagram for additionally describing operation S1400 illustrated in FIG. 48 through a detailed example.

Next, a method of visually associating the corresponding parts of the graphic element in the output information and the additional information described in operation S1400 of FIG. 48 will be described. FIG. 61 is a diagram for additionally describing operation S1400 illustrated in FIG. 48 through a detailed example. Referring to FIG. 61, an example in which elements, which correspond to each other, of input information 1410, output information 1420, and additional information 1430 are highlighted with the same graphic means (e.g., color or pattern) is illustrated.

Even when the meaning of the output information 1420 may be understood through the additional information 1430 corresponding to the output information 1420, it may be difficult for a user to intuitively understand which part of the input information 1410 is translated into which part of the output information 1420 only by understanding the meaning of the output information. Accordingly, by visually associating the corresponding elements of the input information 1410, the output information 1420, and the additional information 1430 with each other, it is necessary to confirm which part of the input information 1410 or the additional information 1430 match with which part of the output information 1420.

Referring to FIG. 61, the input information 1410, the output information 1420 translating the input information, and the additional information 1430 graphically representing the meaning of output information 1420 are illustrated. In this case, by visually associating the corresponding elements of the input information 1410, the output information 1420, and the additional information 1430 using the same graphic means, the user may more intuitively and clearly understand the correlation therebetween.

For example, as illustrated in FIG. 61, by highlighting and displaying "남자가" 1411 of the input information 1410, "A man" 1421 of the output information 1420, and a main FIG. 1431 of the additional information 1430 with the same color or pattern, the user may quickly and intuitively know that the word "남자가" 1411 of the input information 1410 corresponds to "A man" 1421 and the man FIG. 1431, respectively.

Meanwhile, although the graphic means for visually associating the corresponding elements of the input information 1410, the output information 1420, and the additional information 1430 is illustrated as a color or a pattern, the scope of the present invention is not limited thereto. For example, instead of correlating with the color or pattern, the corresponding elements of the input information 1410, the output information 1420, and the additional information 1430 blink at the same period to indicate that the elements correspond to each other.

Figure 62:
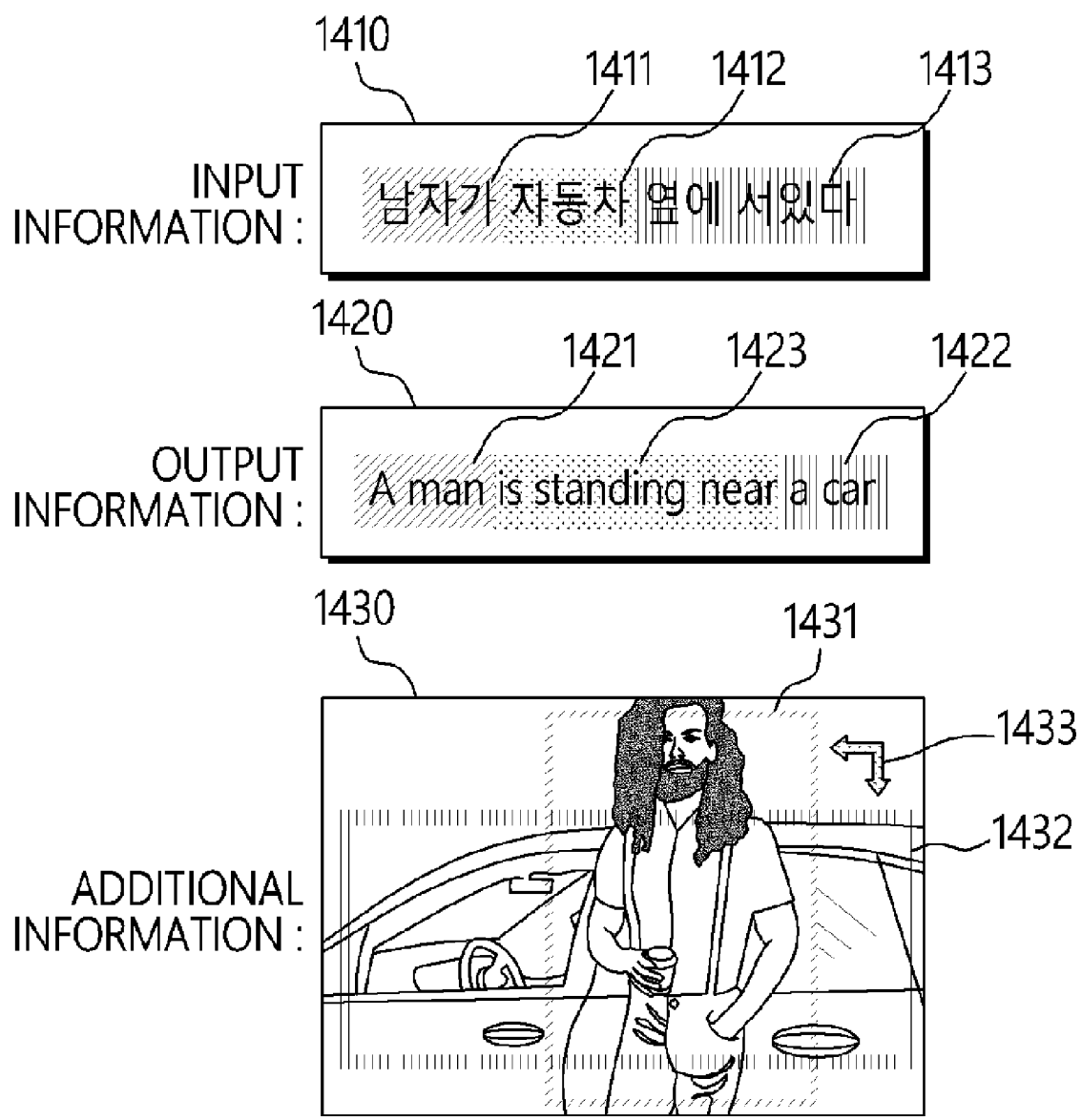
FIG. 62 is a diagram for describing an embodiment of visually representing a process and method in which translation is performed according to each word and a word order of a phrase in the embodiment of FIG. 61.

FIG. 62 is a diagram for describing an embodiment of visually representing a process and method in which translation is performed according to each word and a word order of a phrase in the embodiment of FIG. 61. In FIG. 61, an embodiment in which one specific word is associated with each other among the input information 1410, the output information 1420, and the additional information 1430 has been described, but in FIG. 62, an embodiment in which a plurality of words or phrases are visually associated with elements corresponding to each other according to word order will be described. This will hereinafter be descried with reference to FIG. 62.

In FIG. 62, input information 1410 includes a plurality of words 1411, 1412, and 1413, and the words 1411, 1412, and 1413 are each associated with the corresponding elements of the output information 1420 and the additional information 1430 by the same graphical means. For example, "남자가" 1411 of the input information 1410 is highlighted and displayed with the same color or pattern as "A man" 1421 and the man FIG. 1431, and "자동차" 1412 of the input information 1410 is highlighted and displayed with the same color or pattern as "a car" 1422 and the car figure 1432, and "옆에 서있다" 1413 of the input information 1410 is highlighted and displayed with the same color or pattern as "is standing near" 1423. Through this, it is possible to clearly identify which part the output information 1420 and the additional information 1430 each word or phrase of the input information 1410 correspond to.

Meanwhile, in the present embodiment, each pair of elements of the input information 1410, the output information 1420, and the additional information 1430 corresponding to each other may be sequentially highlighted or displayed according to the word order. For example, when matching elements corresponding to each other of the input information 1410, the output information 1420, and the additional information 1430 in FIG. 62, a total of three pairs, a first pair of "남자가" 1411-"A man" 1421-a man FIG. 1431, a second pair of " 자동차 " 1412-"a car" 1422-car FIG. 1432, and a third pair of "옆에 서있다" 1413-"is standing near" 1423-adjacent markers 1433 are derived. In this case, when each pair is sequentially displayed or highlighted according to the word order, the user may easily check in which word order the input information 1410 is translated.

For example, in FIG. 62, when the first pair is displayed or highlighted first, the second pair is displayed or highlighted, and ultimately the third pair is displayed or highlighted, the user may intuitively confirm that the verb phrase 1423 appears before the object 1422 in the English word order of the output information 1420, unlike the Korean word order of the input information 1410. Meanwhile, in this case, each pair may be highlighted or displayed in a color different from that of the other pairs in order to facilitate visual identification from each other.

According to the above-described embodiments of the present invention, since the process and the method are graphically represented together with the translation result, the user can easily understand the translation method step by step.

Hereinafter, another exemplary computing device 1500 capable of implementing the devices described in various embodiments of the present invention will be described with reference to FIG. 63.

Figure 63:
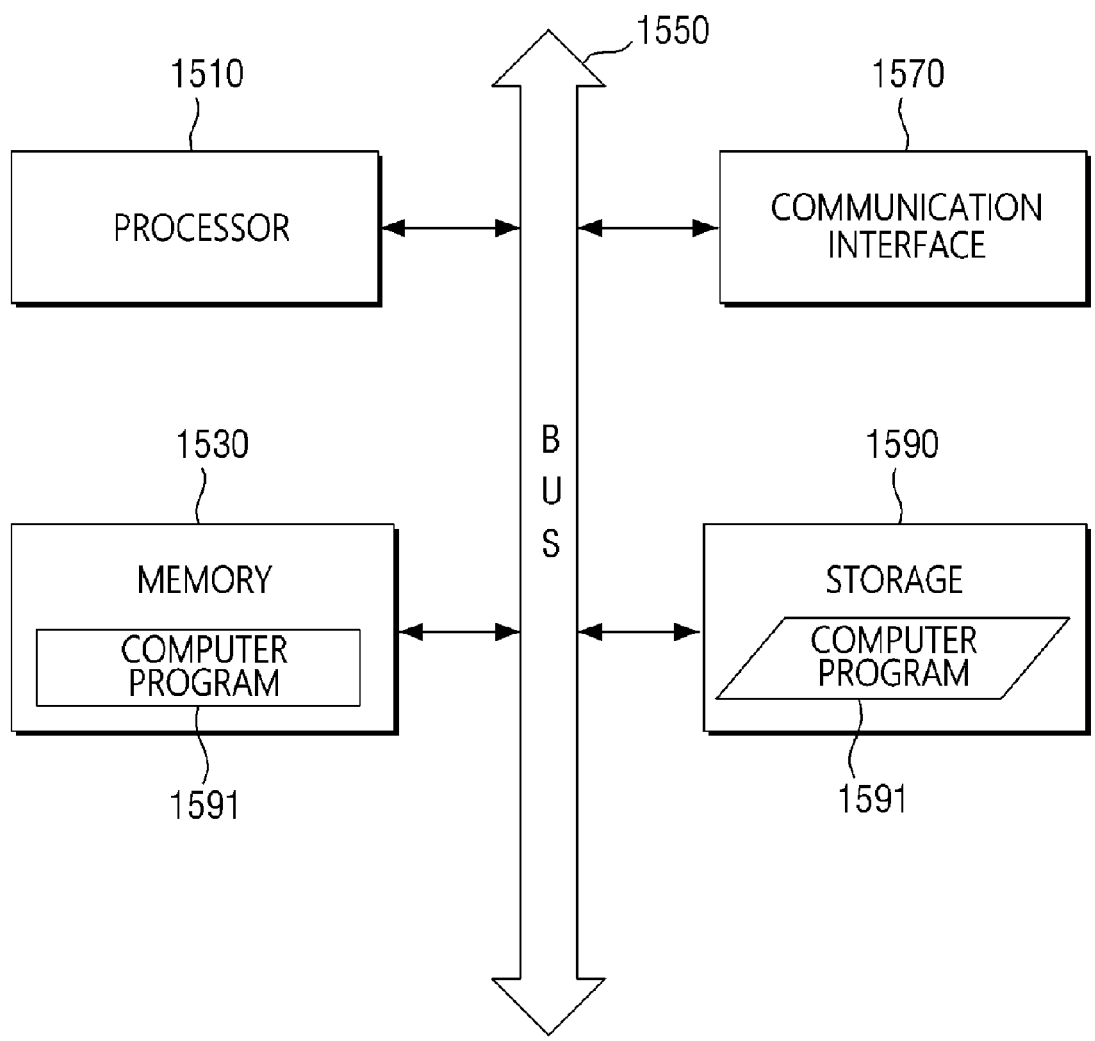
FIG. 63 is a hardware configuration diagram illustrating another embodiment of an apparatus for performing a translation method according to embodiments of the present invention.

FIG. 63 is a hardware configuration diagram illustrating another embodiment of an apparatus for performing a translation method according to embodiments of the present invention.

As shown in FIG. 63, the computing device 1500 may include one or more processors 1510, a bus 1550, a communication interface 1570, a memory 1530, which loads a computer program 1591 executed by the processors 1510, and a storage 1590 for storing the computer program 1591. However, FIG. 63 illustrates the components related to the embodiment of the present disclosure. It will be appreciated by those skilled in the art that the present disclosure may further include other general purpose components in addition to the components shown in FIG. 63.

The processor 1510 may control overall operations of each component of the computing device 1500. The processor 1510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 1510 may perform calculations on at least one application or program for executing a method/operation according to various embodiments of the present disclosure. The computing device 1500 may have one or more processors.

The memory 1530 may store various data, instructions and/or information. The memory 1530 may load one or more programs 1591 from the storage 1590 to execute methods/operations according to various embodiments of the present disclosure. An example of the memory 1530 may be a RAM, but may not be limited thereto.

The bus 1550 may provide communication between components of the computing device 1500. The bus 1550 may be implemented as various types of bus such as an address bus, a data bus and a control bus.

The communication interface 1570 may support wired and wireless internet communication of the computing device 1500. The communication interface 1570 may support various communication methods other than internet communication. To this end, the communication interface 1570 may be configured to include a communication module based on hardware and/or software well known in the art of the present disclosure.

The storage 1590 can non-temporarily store one or more computer programs 1591. The storage 1590 may be configured to include a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 1591 may include one or more instructions, on which the methods/operations according to various embodiments of the present disclosure may be implemented. Based on the computer program 1591 being loaded on the memory 1530, the processor 1510 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, and being used in the other computing device.

Although embodiments of the present invention have been described above with reference to the accompanying drawings, those of ordinary skill in the art to which the present invention pertains can practice the present invention in other specific forms without changing the technical idea or essential features.

The disclosed embodiments of the disclosure may be used in a generic and descriptive sense and not for purposes of limitation. The scope of protection of the present disclosure should be interpreted by the following claims, and all technical ideas within the scope equivalent thereto should be construed as being included in the scope of the technical idea defined by the present disclosure.

The invention claimed is:

1. A translation method performed by a computing device, comprising:
    acquiring data of a first sentence in a first language, the first sentence including a first morpheme of a first type and a second morpheme of a second type different from the first type;
    generating a first graph representing the first sentence, a first node of the first graph corresponding to the first morpheme of the first type of the first sentence, a first edge of the first graph corresponding to the second morpheme of the second type of the first sentence, and each node and each edge of the first graph being concatenated to each other so that the first sentence is completed when representations corresponding to each node and each edge of the first graph are concatenated while traversing the first graph in a first order;
    replacing the representations of the first language corresponding to each node and each edge of the first graph with representations of a second language;
    acquiring a second sentence of the second language by concatenating the representations of the second language corresponding to each node and each edge of the first graph while traversing the first graph in a second order at least in part different from the first order;
    generating additional information including a graphic element; and
    displaying the second sentence as a translation result of the first sentence into the second language, along with the graphic element,
    wherein the generating of the first graph includes generating the first graph including a self-loop edge or a connected edge corresponding to the second morpheme as a determination result by determining whether the second morpheme is an adjective, a determiner, a verb, or a preposition,
    the self-loop edge is an edge where a node of a destination and a node of a source are the same, and the connected edge is an edge that concatenates different nodes, and
    the generating of the first graph includes generating the first graph including the self-loop edge corresponding to the second morpheme when the second morpheme is any one of the adjective and the determiner.

2. The translation method of claim 1, wherein the first type is a noun type, and
    the second type is a type that is not a noun.

3. The translation method of claim 1, wherein the generating of the first graph includes generating the first graph including the connected edge corresponding to the second morpheme when the second morpheme is any one of the verb and the preposition.

4. The translation method of claim 1, wherein the generating of the first graph includes changing any one or more of a source and a destination of the first edge in response to a previously designated user input for the first edge of the first graph.

5. The translation method of claim 1, wherein the generating of the first graph includes merging the first node with another node in response to a previously designated user input for the first node of the first graph.

6. The translation method of claim 1, wherein the generating of the first graph includes segmenting the first node in response to a previously designated user input for the first node of the first graph.

7. The translation method of claim 6, wherein the generating of the first graph includes segmenting the first node and replacing the segmented first node with two or more new nodes in response to the previously designated user input for the first node of the first graph.

8. The translation method of claim 6, wherein the generating of the first graph includes segmenting the first node and replacing the segmented first node with one or more nodes and one or more edges in response to the previously designated user input for the first node of the first graph.

9. The translation method of claim 1, wherein the generating of the first graph includes merging the first node with the first edge and replacing the merged first node with a new node in response to a previously designated user input for any one of the first edge and the first node of the first graph.

10. The translation method of claim 1, wherein the acquiring of the second sentence of the second language includes acquiring the second sentence of the second language by concatenating the representations of the second language corresponding to each node and each edge of the first graph while traversing the first graph in the second order that is at least in part different from the first order and designated using a previous user's translation record.

11. The translation method of claim 1, wherein the acquiring of the second sentence of the second language includes acquiring the second sentence of the second language by concatenating the representations of the second language corresponding to each node and each edge of the first graph while traversing the first graph in a third order that is at least in part different from the second order in response to receiving a previously designated user input.

12. A computing device comprising:
    a memory in which a sentence translation program is loaded; and
    a processor configured to execute the sentence translation program loaded in the memory,
    wherein the sentence translation program includes:
    an instruction configured to obtain data of a first sentence in a first language, the first sentence including a first morpheme of a first type and a second morpheme of a second type different from the first type;
    an instruction configured to generate a first graph representing the first sentence, a first node of the first graph corresponding to the first morpheme of the first type of the first sentence, a first edge of the first graph corresponding to the second morpheme of the second type of the first sentence, and each node and each edge of the first graph being concatenated to each other so that the first sentence is completed when representations corresponding to each node and each edge of the first graph are concatenated while traversing the first graph in a first order;

an instruction configured to replace the representations of the first language corresponding to each node and each edge of the first graph with representations of a second language, respectively;

an instruction configured to obtain a second sentence of the second language by concatenating the representations of the second language corresponding to each node and each edge of the first graph while traversing the first graph in a second order at least in part different from the first order;

an instruction configured to generate additional information including a graphic element; and an instruction configured to display the second sentence as a translation result of the first sentence into the second language, along with the graphic element, wherein the instruction configured to generate the first graph includes an instruction configured to generate the first graph including a self-loop edge or a connected edge corresponding to the second morpheme as a determination result by determining whether the second morpheme is an adjective, a determiner, a verb, or a preposition, the self-loop edge is an edge where a node of a destination and a node of a source are the same, and the connected edge is an edge that concatenates different nodes, and the first graph includes the self-loop edge corresponding to the second morpheme when the second morpheme is any one of the adjective and the determiner.

13. The translation method of claim 1, further comprising:
receiving a user input to replace or correct the graphic element into another graphic element; and
correcting the second sentence based on the user input.

14. The translation method of claim 10, further comprising:
storing the previous user's translation record in a local storage, which is accessible only to a particular user, wherein different users' translation records are stored in different local storages; and
storing information to be shared by all users in a main storage, which are accessible to all users.

15. The translation method of claim 10, wherein the acquiring the second sentence of the second language is performed by using data acquired by performing a machine learning based on data of the previous user's translation record.

16. The computing device of claim 12, wherein the sentence translation program further includes
an instruction configured to correct the second sentence based on a user input to replace or correct the graphic element into another graphic element.

17. The computing device of claim 12, wherein the sentence translation program further includes:
an instruction configured to store a previous user's translation record in a local storage, which is accessible only to a particular user, wherein different users' translation records are stored in different local storages; and
an instruction configured to store information to be shared by all users in a main storage, which are accessible to all users.

18. The computing device of claim 12, wherein the sentence translation program further includes:
an instruction configured to acquire the second sentence of the second language by using data acquired by performing a machine learning based on data of a previous user's translation record.

* * * * *